(12) United States Patent
Andersen et al.

(10) Patent No.: US 7,386,368 B2
(45) Date of Patent: Jun. 10, 2008

(54) METHODS AND SYSTEMS FOR MANUFACTURING OPTIMIZED CONCRETE

(75) Inventors: Per Just Andersen, Santa Barbara, CA (US); Simon K. Hodson, Santa Barbara, CA (US)

(73) Assignee: Icrete, LLC, Beverly Hills, CA (US)

( * ) Notice: Subject to any disclaimer, the term of this patent is extended or adjusted under 35 U.S.C. 154(b) by 0 days.

(21) Appl. No.: 11/858,610

(22) Filed: Sep. 20, 2007

(65) Prior Publication Data

US 2008/0009976 A1 Jan. 10, 2008

Related U.S. Application Data

(62) Division of application No. 11/471,293, filed on Jun. 19, 2006.

(60) Provisional application No. 60/691,916, filed on Jun. 17, 2005.

(51) Int. Cl.
*G05B 21/00* (2006.01)

(52) U.S. Cl. ................................... 700/265

(58) Field of Classification Search ............... 700/117, 700/173, 265

See application file for complete search history.

(56) References Cited

U.S. PATENT DOCUMENTS

| | | | |
|---|---|---|---|
| 3,186,596 A * | 6/1965 | Badgett | 222/14 |
| 3,609,316 A | 9/1971 | Brossett et al. | |
| 4,097,287 A | 6/1978 | Ito et al. | |
| 4,318,177 A * | 3/1982 | Rapp et al. | 700/265 |
| 4,654,802 A | 3/1987 | Davis | |
| 5,027,267 A | 6/1991 | Pitts et al. | |
| 5,265,247 A | 11/1993 | Wienck et al. | |
| 5,452,213 A * | 9/1995 | Ito et al. | 700/117 |

(Continued)

FOREIGN PATENT DOCUMENTS

CN 1395008 2/2003

(Continued)

OTHER PUBLICATIONS

Altinkok, Necat, Modelling of the prediction of tensile and density properties in particle reinforced metal matrix composites by using neural networks, Materials and Design, V. 27, n. 8, 2006, p. 625-631.

(Continued)

*Primary Examiner*—Albert DeCady
*Assistant Examiner*—Chad Rapp
(74) *Attorney, Agent, or Firm*—Workman Nydegger

(57) ABSTRACT

Design optimization methods can be used to design concrete mixtures having optimized properties, including desired strength and slump at minimal cost. The design optimization methods use a computer-implemented process that is able to design and virtually "test" millions of hypothetical concrete compositions using mathematical algorithms that interrelate a number of variables that affect strength, slump, cost and other desired features. The design optimization procedure utilizes a constant K (or K factor) within Feret's strength equation that varies (e.g., logarithmically) with concrete strength for any given set of raw material inputs and processing equipment. That means that the binding efficiency or effectiveness of hydraulic cement increases with increasing concentration so long as the concrete remains optimized. The knowledge of how the K factor varies with binding efficiency and strength is a powerful tool that can be applied in multiple circumstances. A concrete manufacturing process may include accurately measuring the raw materials to minimize variation between predicted and actual strength, as well as carefully controlling water content throughout the manufacturing and delivery process.

25 Claims, 18 Drawing Sheets

U.S. PATENT DOCUMENTS

| | | | |
|---|---|---|---|
| 5,452,954 | A | 9/1995 | Handke et al. |
| 5,453,310 | A * | 9/1995 | Andersen et al. ........... 428/34.4 |
| 5,505,987 | A | 4/1996 | Jennings et al. |
| 5,527,387 | A | 6/1996 | Andersen et al. |
| 5,676,905 | A * | 10/1997 | Andersen et al. ........... 264/426 |
| 5,754,423 | A | 5/1998 | Teutenberg et al. |
| 5,853,475 | A | 12/1998 | Liskowitz et al. |
| 5,943,234 | A | 8/1999 | Martinez et al. |
| 6,033,102 | A | 3/2000 | Morihira et al. |
| 6,113,256 | A * | 9/2000 | Bonissone et al. .............. 366/8 |
| 6,120,172 | A * | 9/2000 | Chen et al. ..................... 366/8 |
| 6,120,173 | A * | 9/2000 | Bonissone et al. .............. 366/8 |
| 6,227,039 | B1 | 5/2001 | Te'eni |
| 6,256,600 | B1 | 7/2001 | Bolton et al. |
| 6,379,031 | B1 | 4/2002 | Weingart et al. |
| 6,535,795 | B1 * | 3/2003 | Schroeder et al. .......... 700/266 |
| 6,546,352 | B2 | 4/2003 | Jahn |
| 6,687,559 | B2 | 2/2004 | Radjy et al. |
| 6,817,230 | B2 | 11/2004 | James et al. |
| 6,826,498 | B2 | 11/2004 | Birkner et al. |
| 6,876,904 | B2 * | 4/2005 | Oberg et al. ................ 700/265 |
| 6,959,270 | B2 | 10/2005 | Marchand et al. |
| 7,035,703 | B2 | 4/2006 | Martinez et al. |
| 7,308,339 | B2 * | 12/2007 | Bonissone et al. .......... 700/265 |
| 2002/0048212 | A1 | 4/2002 | Hill et al. |
| 2003/0084791 | A1 | 5/2003 | Trenhaile et al. |
| 2004/0039467 | A1 * | 2/2004 | Martinez et al. .............. 700/97 |
| 2004/0128032 | A1 * | 7/2004 | Nakamura ................. 700/265 |
| 2004/0260504 | A1 | 12/2004 | Bienvenu et al. |
| 2005/0016291 | A1 | 1/2005 | Martinez et al. |
| 2005/0021285 | A1 | 1/2005 | Troxler et al. |
| 2005/0192693 | A1 | 9/2005 | Martinez et al. |
| 2006/0131236 | A1 | 6/2006 | Belfort et al. |
| 2006/0155403 | A1 | 7/2006 | Martinez et al. |

FOREIGN PATENT DOCUMENTS

| | | |
|---|---|---|
| EP | 0199884 | 5/1986 |
| RU | 2242743 | 12/2004 |
| WO | 2004113834 | 12/2004 |

OTHER PUBLICATIONS

Andersen, P., "Control and Monitoring of Concrete Production ... a Study of Parrticle Packing and Rheology", The Danish Academy of Technical Sciences, 1990.

Grutzeck, M.W., Computer simulation of interfacial packing in concrete, Journal of Materials Science, V. 28, n. 13, Jul. 1, 1993, p. 3444-3450.

Johansen, V. et. al., "Particle Packing and Concrete Properties", Materials Science of Concrete II, The American Ceramic Society, Inc., pp. 111-147, 1999.

Julio, E., et al., Feret coefficients for white self-compacting concrete, Materials and Structures (2006), 39:585-591.

Shilstone, Sr., J., et al., "Concrete Mixtures and Construction Needs", Concrete International, Dec. 1989.

Shilstone, Sr., J., "Concrete Mixture Optimization", Concrete International, Jun. 1990.

Stroeven, Pier, Assessment of packing characteristics by computer simulation, Cement and Concrete Research, V. 29, n. 8, Aug. 1999, p. 1201-1206.

Yamamoto, T., et al., "Pozzolanic reactivity of fly ash—API method and K-value", Fuel 85 (2006), 2345-2351.

Yeh, I-Cheng, Analysis of Strength of Concrete using Design of Experiments and Neural Networks, Journal of Materials in Civil Engineering, vol. 18, No. 4, Jul./Aug. 2006, pp. 597-604, Civil Engineering Database.

* cited by examiner

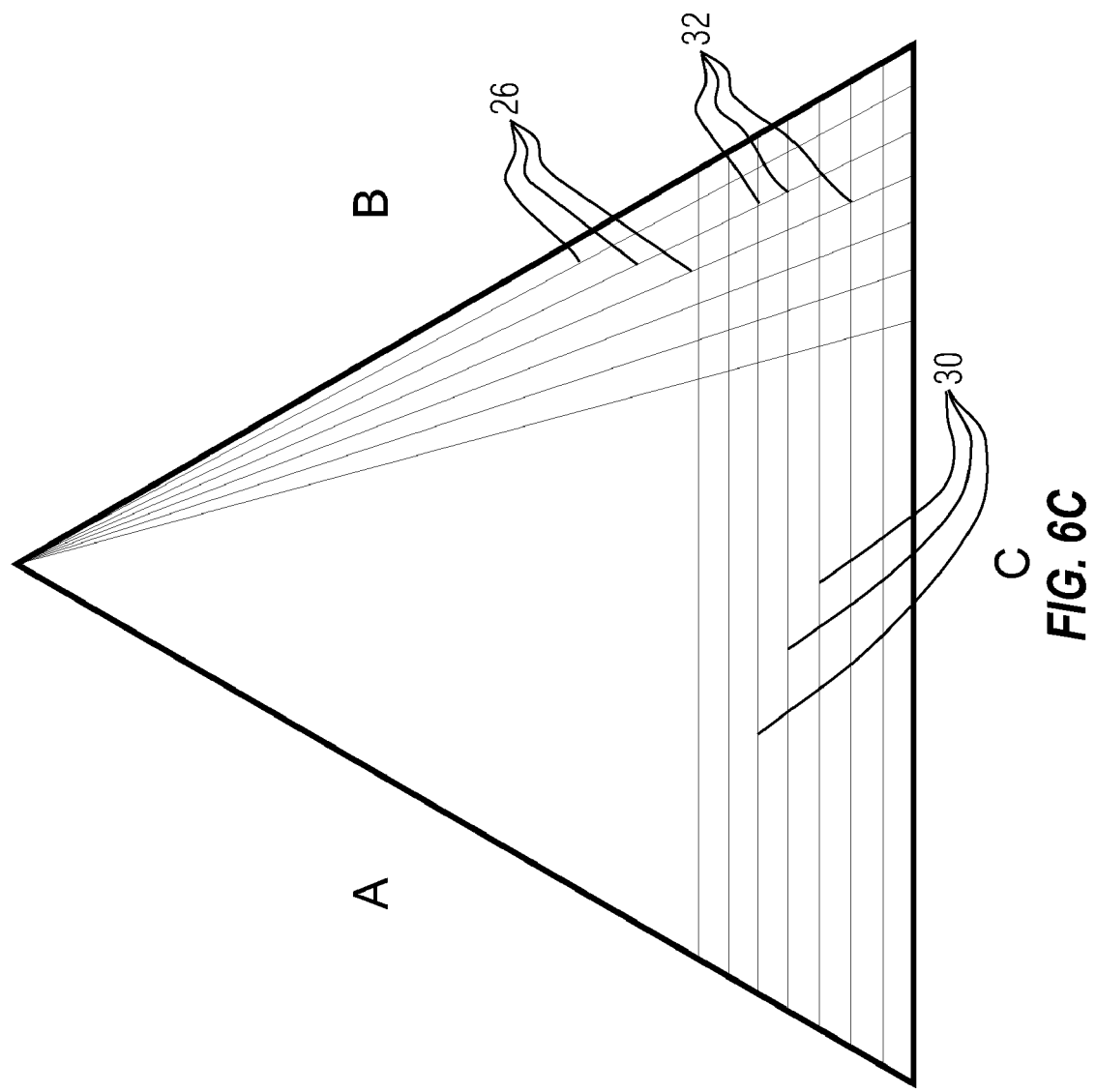

ND SYSTEMS FOR
METHODS AND SYSTEMS FOR MANUFACTURING OPTIMIZED CONCRETE

CROSS-REFERENCE TO RELATED APPLICATION

This application is a division of U.S. application Ser. No. 11/471,293, filed Jun. 19, 2006, which claims the benefit under 35 U.S.C. § 119(e) of U.S. Provisional Application Ser. No. 60/691,916, filed Jun. 17, 2005. This application also claims the benefit of earlier filed and co-pending International Application No. PCT/US06/23863, filed Jun. 19, 2006, which claims the benefit of U.S. Provisional Application Ser. No. 60/691,916, filed Jun. 17, 2005. The disclosures of the foregoing applications are incorporated herein in their entirety.

BACKGROUND OF THE INVENTION

1. The Field of the Invention

The invention is in the field of concrete compositions, more particularly in the design-optimization of concrete compositions based on factors such as performance and cost. The invention more particularly relates to the design and manufacture of concrete using improved methods that more efficiently utilize all the components from a performance and cost standpoint and minimize strength variability, as well as unique methods for redesigning an existing concrete mix design and upgrading the batching, mixing and/or delivery system of an existing concrete manufacturing plant.

2. The Relevant Technology

Concrete is a ubiquitous building material. Finished concrete results from the hardening of an initial cementitious mixture that typically comprises hydraulic cement, aggregate, water, and optional admixtures. The terms "concrete", "concrete composition" and "concrete mixture" shall mean either the finished, hardened product or the initial unhardened cementitious mixture depending on the context. It may also refer to the "mix design", which is the formula or recipe used to manufacture a concrete composition. In a typical process for manufacturing transit mixed concrete, the concrete components are added to and mixed in the drum of a standard concrete delivery truck, typically while the truck is in transit to the delivery site. Hydraulic cement reacts with water to form a binder that hardens over time to hold the other components together.

Concrete can be designed to have varying strength, slump, and other materials characteristics, which gives it broad application for a wide variety of different uses. The raw materials used to manufacture hydraulic cement and concrete are relatively inexpensive and can be found virtually everywhere although the characteristics of the materials can vary significantly. This allows concrete to be manufactured throughout the world close to where it is needed. The same attributes that make concrete ubiquitous (i.e., low cost, ease of use, and wide availability of raw materials) have also kept it from being fully controlled and its full potential developed and exploited.

Concrete manufacturing plants typically offer and sell a number of different standard concrete compositions that vary in terms of their slump and strength. Each concrete composition is typically manufactured by following a standard mix design, or recipe, to yield a composition that has the desired slump and that will harden into concrete having the desired strength. Unfortunately, there is often high variability between the predicted (or design) strength of a given mix design and the actual strength between different batches, even in the absence of substantial variability in the quality or characteristics of the raw material inputs. Part of this problem results from a fundamental disconnect between the requirements, controls and limitations of "field" operations in the concrete batch plant and the expertise from research under laboratory conditions. Whereas experts may be able to design a concrete mixture having a predicted strength that closely reflects actual strength when mixed, cured and tested, experts do not typically prepare concrete compositions at concrete plants for delivery to customers. Concrete personnel who batch, mix and deliver concrete to job sites inherently lack the ability to control the typically large variation in raw material inputs that is available when conducting laboratory research. The superior knowledge of concrete by laboratory experts is therefore not readily applicable or transferable to the concrete industry in general.

In general, concrete mixtures are designed based on such factors as (1) type and quality of hydraulic cement, (2) type and quality of aggregates, (3) quality of water, and (4) climate (e.g., temperature, humidity, wind, and amount of sun, all of which can cause variability in slump, workability, and strength of concrete). To guarantee a specific minimum strength and slump as required by the customer (and avoid liability in the case of failure), concrete manufacturers typically follow a process referred to as "overdesign" of the concrete they sell. For example, if the 28 day field strength of a particular concrete mix design is known to vary between 2500 psi and 4000 psi when manufactured and delivered, a manufacturer must typically provide the customer with a concrete composition based on a mix design that achieves a strength of 4000 psi under controlled laboratory conditions to guarantee the customer a minimum strength of 2500 psi through the commercial process. Failure to deliver concrete having the minimum required strength can lead to structural problems, even failure, which, in turn, can leave a concrete plant legally responsible for such problems or failure. Thus, overdesigning is self insurance against delivering concrete that is too weak, with a cost to the manufacturer equal to the increased cost of overdesigned concrete. This cost must be absorbed by the owner, does not benefit the customer, and, in a competitive supply market, cannot easily be passed on to the customer.

Overdesigning typically involves adding excess hydraulic cement in an attempt to ensure a minimum acceptable strength of the final concrete product at the desired slump. Because hydraulic cement is typically the most expensive component of concrete (besides special admixtures used in relatively low amounts), the practice of overdesigning concrete can significantly increase cost. However, adding more cement does not guarantee better concrete, as the cement paste binder is often a lower compressive strength structural component compared to aggregates and the component subject to the greatest dynamic variability. Overcementing can result in short term microshrinkage and long term creep. Notwithstanding the cost and potentially deleterious effects, it is current practice for concrete manufacturers to simply overdesign by adding excess cement to each concrete composition it sells than to try and redesign each standard mix design. That is because there is currently no reliable or systematic way to optimize a manufacturer's pre-existing mix designs other than through time-consuming and expensive trial and error testing to make more efficient use of the hydraulic cement binder and/or account for variations in raw material inputs.

The cause of observed strength variability is not always well understood, nor can it be reliably controlled using existing equipment and following standard protocols at typical ready-mix manufacturing plants. Understanding the interrelationship and dynamic effects of the different components within concrete is typically outside the capability of concrete manufacturing plant employees and concrete truck drivers using existing equipment and procedures. Moreover, what experts in the field of concrete might know, or believe they know, about concrete manufacture, cannot readily be transferred into the minds and habits of those who actually work in the field (i.e., those who place concrete mixtures into concrete delivery trucks, those who deliver the concrete to a job site, and those who place and finish the concrete at job sites) because of the tremendous difference in controls and scope of materials variation. The disconnect between what occurs in a laboratory and what actually happens during concrete manufacture can produce flawed mix designs that, while apparently optimized when observed in the laboratory, may not be optimized in reality when the mix design is scaled up to mass produce concrete over time.

Besides variability resulting from poor initial mix designs, another reason why concrete plants deliberately overdesign concrete is the inability to maintain consistency of manufacture. There are four major systemic causes or practices that have historically lead to substantial concrete strength variability: (1) the use of materials that vary in quality and/or characteristics; (2) the use of inconsistent batching procedures; (3) overcementing; and (4) adding insufficient batch water initially and later making slump adjustments at the job site, typically by the concrete truck driver adding an uncontrolled amount of water to the mixing drum. The total variation in materials and practices can be measured by standard deviation statistics.

The first cause of variability between theoretical and actual concrete strengths for a given mix design is variability in the supply of raw materials. For example, the particle size, size distribution, morphology, and particle packing density of the hydraulic cement and aggregates (e.g., course, medium, and fine) may vary from batch to batch. Even slight differences can greatly affect how much water must be added to yield a composition having the required slump. Because concrete strength is highly dependent on the water-to-cement ratio, varying the water content to account for variations in the solid particle characteristics to maintain the required slump causes substantial variability in concrete strength. Unless a manufacturer can eliminate variations in raw material quality, overdesigning is generally the only available way to ensure that a concrete composition having the required slump also meets the minimum strength requirements.

Even if a concrete manufacturer accounts for variations in raw materials quality, overdesigning is still necessary using standard mix design tables. Standardized tables are based on actual mix designs using one type and morphology of aggregates that have been prepared and tested. They provide slump and strength values based on a wide variety of variables, such as concentration of cement, aggregates, water, and any admixtures, as well as the size of the aggregates. The use of standardized tables is fast and simple but can only approximate actual slump and strength even when variations in raw materials are measured. That is because the number of standardized mix designs is finite though the variability in the type, quality and concentration (i.e., ratio) of raw materials is virtually infinite. Because standardized tables can only approximate real world raw material inputs, there can be significant variability between predicted and actual strength when using mix designs from standardized tables. Because of this variability, the only two options are (1) time consuming and expensive trial and error testing to find an optimal mix design for every new batch of raw materials or (2) overdesigning. Manufacturers typically opt for overdesigning, especially in light of factors other than mix design that cause variations between design and actual strength.

The second cause of strength variability is the inability to accurately deliver the components required to properly prepare each batch of concrete. Whereas modern scales can theoretically provide very accurate readings, sometimes to within 0.05% of the true or actual weight, typical hoppers and other dispensing equipment used to dispense the components into the mixing vessel (e.g., the drum of a concrete mixer truck) are often unable to consistently open and shut at the precise time in order to ensure that the desired quantity of a given component is actually dispensed into the mixing vessel. To many concrete manufacturers, the perceived cost of upgrading or properly calibrating their metering and dispensing equipment is higher than simply overdesigning the concrete, particularly since most manufacturers have no idea how much the practice of overdesigning concrete actually costs and because it is thought to be a variable cost rather than a capital cost.

Overdesigning often leads to the third cause of strength variability, which is overcementing. Overcementing involves increasing the amount of hydraulic cement in an attempt to achieve or guarantee a minimum strength by overcoming the effect on strength by randomly adding water after batching to adjust slump. This, however, can lead to increases in strength variability, as hardened cement paste is typically weaker as a structural element compared to the aggregate components. While adding more cement may increase the binding strength provided by the cement paste that holds the aggregates together, more cement can also weaken concrete by displacing stronger aggregate materials with the weaker cement paste as a structural component of the hardened concrete. Strength variability occurs as a result of the foregoing effects working in opposite directions, but in differing amounts between different batches of concrete (e.g., due to differences in the water-to-cement ratio, quality and characteristics of the hydraulic cement, aggregates and water, and how the concrete is handled when delivered to a job site).

Overcementing can also cause microshrinkage, particularly on or near the surface due to water evaporation, which reduces the strength and durability of the concrete surface. Microshrinkage caused by overcementing and poor component distribution can cause cracks and crazing within 1-2 years of manufacture. Overcementing can also cause creep, which is the dynamic (and usually undesirable) growth of concrete masses due to continued long term hydration and growth of hydration products of the cement grains, The fourth cause of concrete strength variability is the practice by concrete truck drivers of adding water to concrete after batching in an attempt to improve or modify the concrete to make it easier to pour, pump, work, and/or finish. In many cases, concrete is uniformly designed and manufactured to have a standard slump (e.g., 3 inch) when the concrete truck leaves the lot, with the expectation that the final slump requested by the customer will be achieved on site through the addition of water. This procedure is imprecise because concrete drivers rarely, if ever, use a standard slump cone to actually measure the slump but simply go on "look and feel". Since adding water significantly decreases final concrete strength, the concrete plant must build in a corresponding amount of increased initial strength to offset the possible or expected decrease in strength resulting from subsequent water addition. Because strength can be decreased by varying amounts depending on the actual amount of water added by the driver, the manufacturer must assume a worst-case scenario of maximum strength loss when designing the concrete in order to ensure that the concrete meets or exceeds the required strength.

Given the foregoing variables, which can differ in degree and scope from day to day, a concrete manufacturer may believe it to be more practical to overdesign its concrete compositions rather than account and control for the variables that can affect concrete strength, slump and other properties. Overdesigning, however, is not only wasteful as an inefficient use of raw materials, sometimes providing concrete that is substantially stronger than what is required can also be dangerous. For example, because stronger concrete is often more brittle than weaker concrete, it can fail before the weaker concrete when subjected to the forces of an earthquake.

In an effort to more efficiently design concrete compositions and take into account variations in the particle size, particle size distribution, morphology, and packing densities of the various solid components between different batches of cement and aggregates, the inventors previously developed a design optimization process that greatly improved upon traditional methods for designing concrete mixtures. This process is described in U.S. Pat. No. 5,527,387 to Andersen et al., entitled "Design Optimized Compositions and Computer Implemented Processes for Microstructurally Engineering Cementitious Mixtures" (hereinafter "Andersen patent"). For brevity, the design optimization process disclosed in the Andersen patent will be referred to as the "DOC program" (the term "DOC" being an acronym for "design optimized concrete").

The DOC program mathematically relates the properties of strength, slump and other aspects, such as cost, cohesiveness and durability, based on the concentrations and qualities of the various raw material inputs. The DOC program is able to design and virtually "test" millions of different hypothetical mix designs in seconds using a computer. This greatly reduces the amount of time required to carry out trial-and-error testing that would otherwise be necessary to identify a concrete mixture that is optimized for strength, slump, cost and/or other desired features. The goal of the DOC program is to identify an optimal mix design, from among a large number of hypothetical mix designs, based on such desired features as slump, strength, and cost. The DOC program fills in gaps inherent in standardized tables, which include a relatively small number of mix designs given the variability of raw material inputs. The DOC program can design and virtually "test" millions of different mix designs, including those falling between the gaps of standardized tables, in much less time than it takes to design and test one mix design using conventional trial-and-error methods.

First, the raw materials are carefully tested to determine characteristics that affect the slump, strength, cost, and/or other desired features of cementitious compositions made therefrom. These include, for example, the particle size and packing density of the various aggregate components (e.g., large, medium and small aggregates) and hydraulic cement particles, and the effect of one or more optional admixtures (e.g., fly ash, water reducers, fillers, etc.). Once the raw materials have been characterized with the required degree of accuracy, their characteristics are input into a computer used to carry out the optimization process of the DOC program.

Thereafter, the DOC program designs a large number of hypothetical concrete mixtures, each having a theoretical slump and strength, by varying the concentrations of cement, aggregate, water, and optional admixtures. The predicted slump and strength of each hypothetical concrete mixture is determined by inputting the variables (e.g., the concentration and characteristics of the raw materials) into a system of interrelated mathematical equations. One of the equations utilized in the DOC program is a variation of Feret's strength equation, which states that the compressive strength of the final hardened concrete composition is proportional to the square of the volumetric ratio of hydraulic cement to cement paste, which consists of cement, water and air:

$$\sigma = K \cdot \left( \frac{V_C}{V_C + V_W + V_A} \right)^2$$

The constant "K" within this equation provides proper strength units and magnitude. The strength equation can be modified as follows to predict the strength of concrete that additionally includes other binders, such as class F fly ash, as part of the cement paste:

$$\sigma = K \cdot \left( \frac{V_C + 0.3 V_{FA}}{V_C + 0.3 V_{FA} + V_W + V_A} \right)^2$$

The DOC program can be carried out in an iterative manner in which each iteration yields a hypothetical concrete mixture having a predicted slump and strength that is closer to the desired slump and strength than each previous iteration. In addition to slump and strength, the DOC program can optimize concrete for other desired features, such as cost, workability, or cohesion. Thus, in the case where a number of different concrete mixtures may have the desired slump and strength, the DOC program can identify which of the mixtures is "optimal" according to one or more other criteria (e.g., cost, workability and/or cohesion).

Notwithstanding the foregoing, the DOC program, when initially invented, was based on the assumption, well-accepted in the art, that the constant K (or "K factor") within Feret's strength equation is a true constant and does not vary as long as the same type of mixing apparatus and source of raw materials are used each time. It has been well-accepted in the art that if such variables are kept constant, the K factor remains constant regardless of variations in hydraulic cement concentration and concrete strength. As a result of this well-accepted assumption, the DOC program required significant post-design corrections, even significant testing and redesign of concrete compositions made using one or more of the "optimal" mix designs generated by the program. Thus, the inability of the DOC program to account for dynamic variability of the K factor limited the practical application of an otherwise powerful design optimization tool.

SUMMARY OF THE INVENTION

It has now been discovered that the constant K (or "K factor") within Feret's strength equation is not a constant but varies depending on the efficiency with which hydraulic cement is able to bind or glue the aggregate particles together. That is true even if the mixing apparatus, aggregate strength, and other factors that affect strength are kept constant. The K factor, which dynamically varies with the binding efficiency of the hydraulic cement binder, can be empirically determined based on concrete strength. Knowing the dynamic variability of the K factor allows for more accurate predictions of concrete strength when performing a design optimizing procedure compared to an optimization procedure that assumes the K factor remains constant so long as the mixing apparatus and raw materials also remain constant. The inventive optimization procedure (hereinafter "improved DOC process") efficiently identifies one or more optimized mix designs with less trial and error testing since using the correct K factor in the first instance naturally reduces the need to correct for errors that would otherwise arise by using an incorrect K factor to predict concrete strength.

Although the binding efficiency of hydraulic cement, and therefore the K factor, cannot be readily measured directly, the K factor for a given concrete composition can be determined indirectly. By rearranging Feret's equation, one can solve for K by knowing the compressive strength, hydraulic cement volume and cement paste volume. By testing a range of standard concrete compositions sold by various manufacturers and then solving for K, the inventors surprisingly found that the K factor varied with actual concrete strength, more particularly, that the K factor of properly prepared concrete increased with increasing compressive strength and follows a logarithmic curve. The logarithmic curve has a theoretical limit corresponding to a concrete composition having perfect component distribution and binding efficiency of the paste system, which only occurs at very high strength (e.g., containing the most optimal paste to aggregate ratio and a water-to-cement ratio of about 0.17 and having perfect distribution of paste and aggregates throughout the concrete composition). At lower strengths representative of typical manufacturing needs and specifications, the K factor lies below the theoretical limit. This indicates that hydraulic cement is not able to realize its highest theoretical binding efficiency at lower strengths, but only approaches it at higher strengths.

Knowing how the K factor, and therefore the binding efficiency of hydraulic cement, varies with strength greatly increases the accuracy by which an optimization procedure that utilizes an appropriate strength equation can predict concrete strength for a large number of hypothetical mix designs. On the other hand, the K factor is independent of changes in slump caused by changing water concentration and/or variations in the size and/or morphology of aggregates. Using the foregoing principles regarding K factor, the improved DOC process can more accurately identify one or more optimized mix designs from among many hypothetical mix designs. The improved DOC process efficiently yields optimized concrete compositions that guarantee a specific minimum slump and strength at the lowest cost and with minimum variability due to poor design. The improved DOC process is more efficient than the original DOC program because knowing in advance how the K factor varies with strength minimizes the amount of post design corrections (e.g., through trial-and-error testing) that might otherwise be required.

One goal of the improved DOC process is to yield optimized mix designs that substantially reduce concrete overdesign compared to conventional mix designs used by concrete manufacturers. In one aspect of the invention, the improved DOC process can be used to create one or more optimized mix designs that guarantee concrete having a specific minimum slump and strength while also reducing the wasted cost caused by overdesign. Another aspect involves dynamically optimizing concrete mix designs based on feedback regarding variations in different batches of raw materials. In yet another aspect, the improved DOC process can be used to re-design one or more existing mix designs of a concrete manufacturer. Identifying variations between the actual (or apparent) design K factor of an existing mix design and the optimal or theoretical K factor corresponding to the design strength can be used to determine the existence and degree of concrete overdesign. Improving the mix design to better utilize the hydraulic cement and optimize binding efficiency of the cement paste can by itself reduce strength variability and the need to overdesign to account for such variability.

In addition to providing optimized mix designs, improving the correlation between predicted strength and actual strength can be further enhanced by upgrading and/or recalibrating plant equipment to better ensure that a manufacturer is able to accurately measure and dispense the raw materials used to manufacture concrete. Such upgrades may not be economically practical in the case where a plant uses poor mix designs. Perfectly calibrated equipment cannot manufacture concrete that is any better than a poor mix design will allow. The use of optimized mix designs therefore allows the manufacturer to obtain the full benefit of any capital equipment upgrades. Because improving plant equipment alone may not yield much benefit, and because optimized mix designs cannot by themselves overcome variability imparted by faulty equipment, improving plant equipment and optimizing mix designs allows both improvements to realize their full potential, thus indicating a synergistic relationship.

In one embodiment, the present invention provides improved methods for designing and manufacturing optimized concrete mix designs utilizing a strength equation that employs a unique K factor value, which varies and is selected depending on the inherent efficiency of component use of the resulting concrete composition (e.g., as empirically predicted by the desired minimum, or "design strength"), all other things being equal. Knowing how the K factor varies with concrete strength greatly improves the ability to accurately and efficiently design an optimized concrete composition because it reduces or minimizes variability between design and actual strength. Minimizing variability between the design strength and actual strength reduces the amount of trial-and-error testing that might otherwise be required to identify a concrete mix design that is truly optimized for slump and strength at minimum cost.

As compared to conventional methods for designing concrete using standardized tables, the improved DOC process more precisely considers the actual characteristics of raw materials utilized by a concrete manufacturer. Standardized tables only roughly approximate actual slump and strength because the characteristics of raw materials presumed in the tables rarely, if ever, reflect the true characteristics of raw materials actually used by a concrete manufacturer. Each concrete manufacturing plant utilizes raw materials that are unique to that plant, and it is unreasonable to expect standardized tables to accurately account for materials variability among different plants. The improved DOC process is able to virtually "test" mix designs that more accurately reflect the raw materials actually utilized by the plant at a given time. By accounting for variations in the quality of raw materials, the improved DOC process is able to substantially reduce the degree of overdesigning of concrete compositions that might otherwise occur using standardized mix design tables and methods.

Another aspect of the invention involves the redesigning of one or more pre-existing mix designs used by a manufacturing plant to manufacture its commercial concrete compositions. In one embodiment, the method first involves, as a threshold matter, determining whether and by how much an existing concrete composition is overdesigned. Every concrete composition has a design strength, which is typically determined by the minimum strength that must be guaranteed for that composition, and an actual strength that can be measured by properly preparing concrete under absolute controls based on the mix design and testing its strength. Because of the tendency of manufacturers to overdesign to account for expected strength variabilities from batch to batch, there can be a substantial difference between the apparent design K factor based on the guaranteed minimum strength of a concrete mix design and the actual or "true" K factor based on the actual strength of the concrete when properly manufactured according to the mix design.

The extent to which an existing concrete mix design is overdesigned can be ascertained by: (1) properly preparing a concrete test sample according to the existing mix design; (2) allowing the concrete composition to harden; (3) measuring the actual strength of the hardened concrete composition; and (4) comparing the actual strength of the concrete composition with the design strength of the existing mix design. The amount by which the actual strength deviates from the design strength corresponds to the degree by which the existing mix design is overdesigned. The foregoing process requires an amount of time that is necessary for the concrete composition to cure sufficiently in order to accurately measure actual strength.

The degree of overdesign can alternatively be determined in a more expedited fashion by: (1) determining an apparent design K factor of the existing concrete mix design based on the design strength and ratio of components within a concrete composition made according to the existing mix design; (2) identifying an optimal theoretical K factor corresponding to the design strength; and (3) comparing the apparent design K factor of the existing concrete mix design with the optimal K factor that corresponds to the design strength. The amount by which the apparent design K factor deviates from the optimal K factor corresponds to the degree by which the existing mix design is overdesigned. Knowledge of how the optimal K factor varies with concrete strength can therefore be used as a diagnostic tool to determine whether and by how much a pre-existing mix design is overdesigned without waiting for a concrete test sample to harden.

After determining that a pre-existing mix design is overdesigned, an optimized concrete mix design can be designed using the improved DOC process. After selecting a design strength representing the guaranteed specified minimum strength, a revised or corrected K factor corresponding to the design (or desired) strength is selected and used in the improved DOC process. An iterative optimization process utilizing one or more algorithms, including Feret's equation employing the revised design K factor, designs and virtually tests a number of hypothetical concrete compositions in order to identify one or more mix designs optimized for a specified minimum strength and slump having the lowest cost or other desired factors. An optimized mix design reduces variability between design strength and actual strength compared to the pre-existing concrete mix design, thereby reducing overdesign and cost of the resulting concrete composition. By correctly readjusting the relative concentrations of the various components, the improved DOC process improves the binding efficiency of the hydraulic cement binder and reduces how much cement is required to ensure the specified strength requirement. Overcementing can be greatly reduced or eliminated.

In summary, by utilizing correct K factors selected based on design strength, the improved DOC program can accurately and efficiently redesign each standard pre-existing concrete mix design utilized by the manufacturing plant in order to improve the binding efficiency of the cement binder. This reduces or eliminates overdesigning and reduces cost. An existing concrete manufacturing plant can be upgraded simply by providing optimized concrete mix designs even without upgrading and/or recalibrating the manufacturing plant equipment.

Variations between actual strength and design strength can be further minimized by properly controlling the preparation and handling of the concrete compositions. Some retooling may be necessary to ensure that the batching and weighing equipment meets standard ASTM-94 requirements. Thus, according to another aspect of the invention, affirmative steps can be taken to better control the measuring and dispensing of the components used to manufacture concrete. According to one embodiment, the components are preferably weighed or measured with an accuracy of about ±2.0%, more preferably with an accuracy of about ±1.0%, and most preferably with an accuracy of about ±0.5%. The amount of water included in the concrete composition is carefully controlled so that it does not significantly change from the time the composition is first made within the concrete truck and when it is used at the job site. In order to prevent decreases in actual strength due to human error, on-site slump adjustments can be made to wet concrete compositions through the use of special admixtures instead of by increasing the water content.

In order to account for all water inputs, the moisture content of the solid components (e.g., hydraulic cement and aggregates) can be continuously monitored using moisture sensors (e.g., microwave sensors that measure absorption of microwave energy by any moisture present). Through an information feed-back mechanism, which can be advantageously controlled by a computer, the amount of batch water that is added to the mixing vessel can be varied to account for variations in the moisture content of the solid components. In this way, the total water content within a batch of concrete can be more accurately controlled, thereby reducing variations in strength and/or slump that might otherwise occur.

In some cases it may be desirable to quickly redesign an already optimized mix design in order to adjust the slump without significantly changing the strength. This can be done without creating a whole new mix design from scratch. To maintain the same strength, while varying the slump, the same water-to-cement ratio of the paste is maintained, and only the volume of paste is altered to adjust slump. Adding more paste to a design optimized concrete composition increases slump, while adding less paste decreases slump. Thus, the overall ratio of paste to aggregate is adjusted to change the slump. Because the water-to-cement ratio of the paste remains the same, the strength remains essentially the same according to Feret's equation. In some cases, the ratio of fine to coarse aggregates may remain the same. In other cases, this ratio can be altered somewhat depending on the desired effect on other properties of altering the ratio of paste to aggregate (e.g., cohesiveness, durability, etc.). Once the concentrations of the various components have been adjusted to provide the correct slump, the overall yield can be corrected by adjusting the quantities of the aggregates to provide a desired volume of concrete.

Each of the foregoing embodiments, individually and collectively, contribute to a reduction in concrete strength variability, including differences between design and actual strength and also differences in strength between different batches made using the same mix design. By reducing or eliminating large differences between design and actual strength, and/or strength variability between different batches of concrete, the inventive methods and systems greatly reduce the overdesign of concrete.

Like the DOC program disclosed in the Andersen patent, the improved DOC process can be implemented, at least in part, using a computing system (i.e., a computer) in order to design and virtually test a large number (e.g., thousands or millions) of hypothetical mix designs in a relatively short time period in order to identify one or more mix designs that are optimized based on desired criteria (e.g., strength, slump and cost). Briefly stated, the improved DOC process is able to design and virtually "test" different mix designs by altering the relative concentrations of all the raw materials and then calculating, using one or more algorithms (e.g., those set forth in the Andersen patent), the slump and strength of each virtual concrete composition made according to each hypothetical mix design. The improved DOC process then identifies one or more optimized mix designs having the desired slump and strength. Afterwards, test samples are made to determine actual slump and strength. If the slump differs, changes in slump can be made by increasing or decreasing the cc concentration of cement paste. The strength can be kept the same by maintaining the same water to cement ratio in the cement paste. The strength can be altered by changing the water-to-cement ratio.

As with the original DOC program, the improved DOC process can be embodied by a computer program product comprising a computer-readable medium (e.g., a physical storage device, such as a hard drive, memory device, magnetic tape or disk, optical storage media, or other known digital storage device) that contains executable instructions for carrying out the computer-implemented aspects of the inventive method.

Because each manufacturing plant has its own unique set of raw materials and/or processing inputs and/or blend efficiencies (i.e., no two plants use exactly the same combination of raw materials and possess the exact same equipment calibrated and/or operated in the exact same manner), it will be appreciated that each manufacturing plant produces concrete compositions having unique aspects that are specific to a given manufacturing plant. In other words, even if two manufacturing plants use the same standardized mix designs (i.e., recipes), the concrete delivered by each plant will, in same way, be unique to each plant. That means that pre-existing concrete mix designs that have been modified and optimized utilizing the improved DOC program will yield new concrete compositions that are themselves unique in that they will have never been manufactured at any time anywhere in the world. Thus, improved concrete compositions manufactured using optimized mix designs resulting from the implementation of the improved DOC process are themselves unique and therefore novel as between all previously manufactured concrete.

It turns out that every concrete composition that is made has its own unique signature design K factor and also an actual K factor that can be determined by testing the actual strength of the composition. That is true both before and after implementation of the improved DOC process. However, after implementation of the improved DOC process, the signature K factors, both design and actual, for an optimized concrete composition of a manufacturing plant will exceed the signature K factors, both design and actual, of a pre-existing non-optimized concrete composition that was redesigned or replaced using the improved DOC process. By knowing and comparing the design and/or signature K factors of both a pre-existing and an optimized concrete composition of a given manufacturing plant, one can readily ascertain whether a particular concrete composition produced by the manufacturing plant was manufactured using the pre-existing mix design or an optimized mix design designed using the improved DOC process. Thus, the signature K factor can be used as a diagnostic tool to distinguish whether a non-optimized or overdesigned concrete composition or an optimized concrete composition was used in a building project (i.e., to determine whether or not the improved DOC process has been implemented by a concrete manufacturer in designing its concrete compositions).

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings, in which:

FIG. 6C is a graph of a packing density chart showing pseudo particle lines;

DETAILED DESCRIPTION OF THE PREFERRED EMBODIMENTS

I. Introduction

Figure 1:
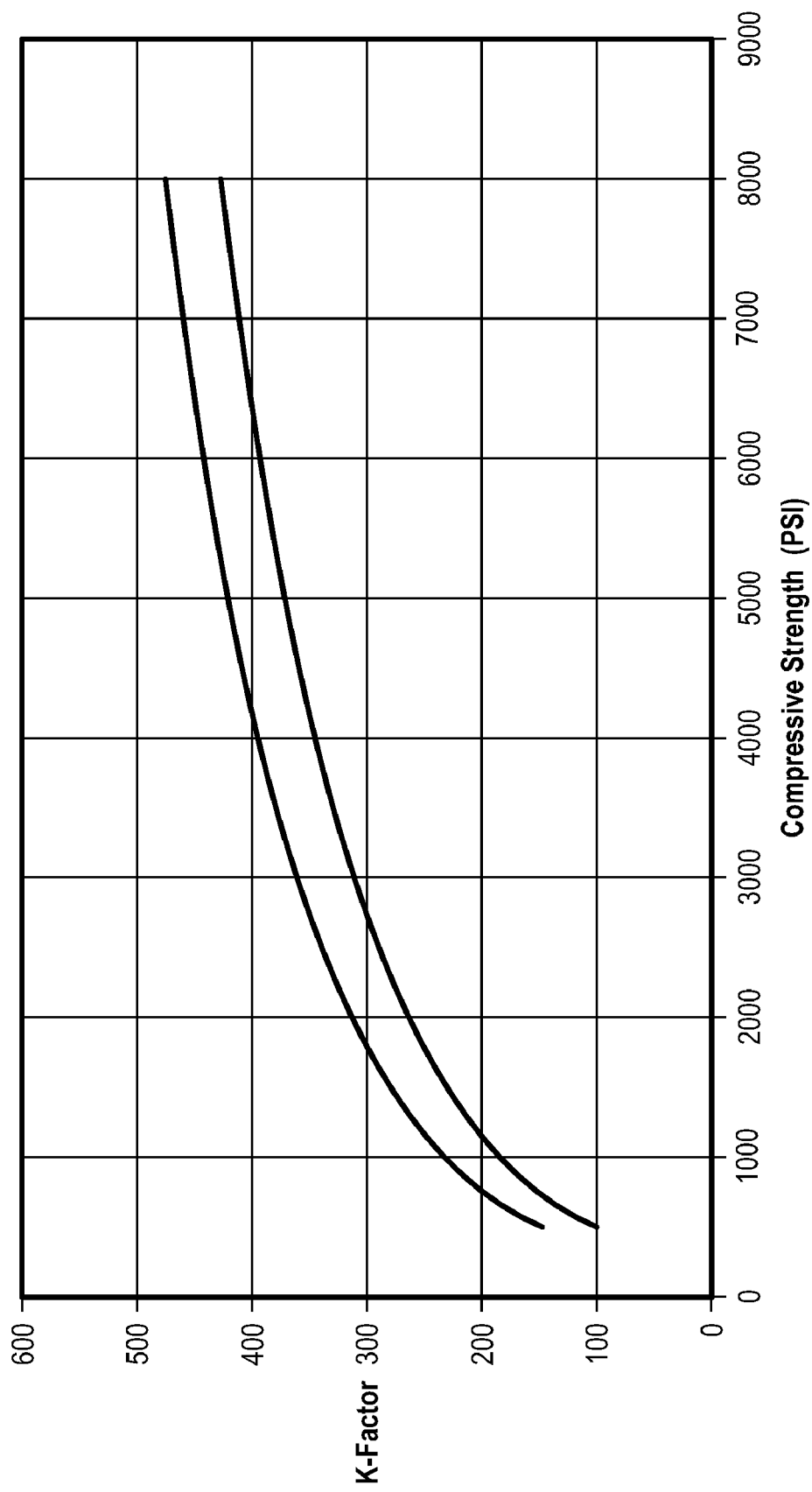
FIG. 1 is a chart that includes K factor curves that illustrate how the K Factor changes as a function of the compressive strength of concrete.

The present invention utilizes a design optimization process, which is at least in part computer-implemented, that identifies one or more optimized concrete mix designs that are optimized relative to, e.g., strength, slump and cost. The design optimization process is able to account for variability in raw material inputs and design an optimized concrete compositions based on variations in raw material qualities. It does this by effectively designing and testing large numbers (e.g., thousands or millions) of hypothetical concrete mixtures at least in part by means of a computer-implemented process in order to identify one or more mix designs having optimal properties. This process greatly reduces or eliminates the need for extensive trial-and-error testing, which is both expensive and time consuming. Moreover, unlike Shilstone optimization, the improved DOC program is able to account for particle size variations among different batches of raw materials and also cost optimize.

The terms "yard" and "cubic yard" are used interchangeably throughout this application and shall refer to the typical volumetric unit of concrete sold in the United States. This quantity can readily be converted into metric units by known conversion factors that convert yard into meters, centimeters, or other desired metric units. By way of example, one cubic yard is equal to 0.76455486 cubic meters.

II. Relationship of K Factor to Concrete Strength

An important feature of the invention is the understanding that Feret's constant K (or "K" factor) is not actually a constant but is related logarithmically to concrete strength. That means that increasing the amount of hydraulic cement within an optimized composition not only increases concrete strength by virtue of the increased amount of binder, which would be expected, but also improves the binding effectiveness or efficiency of the paste. Thus, the increase in strength of concrete as more hydraulic cement is added to an optimized concrete composition exceeds the strength that would be predicted by Feret's equation if the K factor were actually a constant for all strengths. Whereas it was known that the K factor changed depending, on mixing apparatus and aggregate type and strength, it was heretofore believed that the K factor remained constant for all strengths as long as the same raw materials and mixing apparatus were used.

The term "Feret's equation" refers to the following equation, which predicts concrete strength based solely on the volume of hydraulic cement, water and air in the concrete mixture:

$$\sigma = K \cdot \left( \frac{V_C}{V_C + V_W + V_A} \right)^2$$

For purposes of disclosure and the appended claims, the term "Feret's equation" shall also refer to the following modified Feret's equation, which predicts concrete strength based on the volume of hydraulic cement, class F fly ash, water, and air in the concrete mixture:

$$\sigma = K \cdot \left( \frac{V_C + 0.3V_{FA}}{V_C + 0.3V_{FA} + V_W + V_A} \right)^2$$

As can be seen from this version of Feret's equation, certain types of fly ash contribute to concrete strength but not to the same degree as hydraulic cement. Moreover, although the volume of fly ash is shown multiplied by a fly ash constant 0.3, it may sometimes be appropriate to use a different fly ash constant (e.g., ranging from 0.3-0.6) depending on the type of fly ash used. This substitution can be carried out by those of skill in the art when appropriate, and such modification shall also constitute "Feret's equation".

In general, the term "Feret's equation" shall refer to other similar variations that may be constructed so long as they at least relate the predicted compressive strength of the concrete composition to the ratio of hydraulic cement volume to cement paste volume (i.e., hydraulic cement, other binders, water and air) in the concrete mixture (e.g., the use of silica fume, which can contribute to strength).

The term "K factor" includes modifications of the exemplary K factors disclosed herein required to convert the calculated strength from English units (i.e., pounds per square inch or "psi") to metric units (e.g., MPa). As is well-known to those of skill in the art, 1 MPa=145 psi. The term "K factor" shall include other modifications necessary when altering Feret's equation, as discussed above.

It should be appreciated that the K factor is not an absolute number and is not always the same for all different types of concrete compositions and/or apparatus used by manufacturing plants to manufacture concrete. In fact, each manufacturing plant will have its own unique K factor curve depending on the type and quality of aggregates, the type and quality of hydraulic cement used, and the type and quality of mixing apparatus. The K factor curve will typically move up or increase with increasing mixing efficiency, aggregate strength, hydraulic cement strength, and other factors that systematically contribute to concrete strength.

So long as system inputs remain essentially the same, the K factor curve for a particular manufacturing plant can, at least in theory, be determined by identifying a single K factor point along the K factor curve and then constructing a logarithmic curve that passes through that point. Once an inappropriate K factor curve has been constructed for a particular manufacturing plant, the curve can be used to design and predict concrete strengths for a wide variety of different concretes produced by that manufacturing plant.

It should also be understood that there are different K factors depending on the context in which that term is used. The term "design K factor" refers to the K factor that is utilized within the improved DOC process of the present invention in order to design and virtually "test" a large number (e.g., millions) of different hypothetical mix designs in order to identify one or more of such mix designs that are "optimal" with respect to strength, slump, cost and other desired factors. The design K factor will, of course, vary depending on the design strength, or guaranteed minimum strength, of a particular concrete composition. For a given set of raw materials inputs and processing equipment, there will typically be a single design K factor curve.

The terms "optimal K factor" and "true K factor" refer to K factors found along an optimal K factor curve that represents perfectly designed and mixed concrete by a manufacturing plant utilizing a given set of raw materials available. Thus, the "optimal" or "true" K factor can vary between different manufacturing plants and is therefore not an absolute number. Nevertheless, for a given set of raw material inputs, there exists perfectly designed and manufactured concrete for which the optimal or true K factor can theoretically be used to predict strength. Because manufacturing plants and personnel cannot produce perfect concrete every time, there will typically be some degree of overdesign, however slight, to account for such variability. Thus, the design K factor will typically differ from (e.g., be lower than) the optimal true K factor for that given set of raw materials. Notwithstanding such variation, the design K factor used to make a well optimized concrete composition will much more closely correlate to the optimal or true K factor than compared to apparent design K factors corresponding to less optimized or non-optimized concrete compositions.

The term "apparent design K factor" refers to the K factor that can be ascertained for a preexisting concrete composition that may not have itself been designed using a K factor. Even if a K factor is not used to design a concrete composition, it nevertheless can be assigned an apparent design K factor based on what K factor would have been used to design such concrete using the disclosed optimization procedures. In the case of a poorly optimized or overdesigned concrete composition, the apparent design K factor will deviate significantly from the optimal or true K factor. The apparent design K factors of such compositions will deviate much more than the design K factors of well optimized concrete made using the same inputs. The apparent design K factor is determined based on the design strength (i.e., minimum guaranteed strength) and mix design of the preexisting concrete composition.

The term "actual K factor" shall refer to the K factor that is determined by mixing up a concrete composition according to a given mix design, allowing the concrete to cure, measuring the compressive strength of the concrete, and then calculating the actual K factor based on actual strength and quantity of components within the concrete composition. For a properly prepared concrete composition, the actual K factor will exceed the design K factor since the design K factor typically accounts for variations in concrete strength.

A graphic representation of how the K factor varies with the compressive strength of concrete is depicted in FIG. 1. FIG. 1 actually includes two curved lines following a logarithmic curve corresponding to two different K factors that have been determined by the inventors. The lower K factor curve corresponds to concrete compositions made utilizing hydraulic cement, water, aggregate and other standard admixtures used in the art. The upper K factor line corresponds to hydraulic cement compositions that additionally include an amine strengthener. The K factors used to generate the lines shown in FIG. 1 were determined by analyzing a wide variety of standard mix designs utilized in manufacturing plants in various parts of the United States or variations thereof (e.g., that use a strengthening amine). In general, the K factor can be calculated according to the following rearrangement of Feret's equation for compositions that include hydraulic cement, water, and aggregate:

$$K = \frac{\sigma}{\left(\frac{V_C}{V_C + V_W + V_A}\right)^2}$$

The strength variable a corresponds to the actual strength that was determined for various concrete compositions ranging in strength from 500 psi to 8,000 psi. For concrete compositions that also include fly ash, the K factor can be determined according to the following rearrangement of a modified Feret's equation:

$$K = \frac{\sigma}{\left(\frac{V_C + 0.3V_{FA}}{V_C + 0.3V_{FA} + V_W + V_A}\right)^2}$$

The increased K factor corresponding to increased strength according to the upper line shown in FIG. 1 can be obtained by utilizing an amine known as "THEED" (i.e., tetrahydroxydiethylenediamine, also known as ethanol, 2,2', 2'',2'''-(1,2-ethanediyldnitrolo)tetrakis-). In order to obtain increased strength, and therefore a higher K factor, it is preferable to utilize up to about 0.5% of THEED, more preferably up to about 0.25%, and most preferably up to about 0.1%. Once it has been understood that the K factor varies logarithmically with concrete compressive strength, one of skill in the art, using techniques described or readily ascertained from the current disclosure, can modify the exemplary K factor shown in FIG. 1 to account for variations based on different concentrations of THEED.

FIG. 1 further demonstrates that the "optimal" or "theoretical" K factors are not absolute or lie along an absolute fixed curve that is the same regardless of the inputs and mixing apparatus of the concrete composition. Adding an amine strengthener raises the K factor (and K factor curve representing all K factors for that system) based on the increased strength of the resulting concrete even though the ratio of hydraulic cement to paste remains the same. The same would be true for other admixtures or alterations in composition such that there could be a unique or representative K factor curve for every unique set of raw materials inputs. The same would be true for different types of mixing apparatus which might cause the cement paste to behave in unique ways specific to that mixing apparatus or methodology. In general, the effect of mixing efficiency on K factor is more dramatic with increasing cement content and strength (i.e., mixing becomes more crucial when the potential binding efficiency of hydraulic cement is maximized). What the graph at FIG. 1 shows is that for any fixed set of compositional and/or processing variables, the K factor follows a logarithmic curve relative to compressive strength. That means the effectiveness of the hydraulic cement, more precisely the cement paste, as a binder that holds or glues the aggregates together decreases with decreasing strengths. It also increases with increasing strength towards a theoretical limit beyond which no further increase in binding effectiveness is possible (i.e., where the binding efficiency is as high as theoretically possible, with the limit of cement paste strength being at stoichiometric levels of water and cement and wherein the components are perfectly mixed. This does not mean, however, that the K factor necessarily increases with increasing hydraulic cement concentration. Many manufacturers engage in the practice of overcementing in an attempt to increase or maximize strength, sometimes with disastrous results as the concrete composition, if not properly optimized to accommodate a huge cement increase (e.g., doubling), might undergo severe microshrinkage cracking and crazing in the short run and also excessive creep or expansion in the long run.

What the K factor curves illustrated in FIG. 1 essentially depict are the optimal K factors for a given set of raw materials inputs. The design K factor used in an optimization procedure may be the same or may deviate from the optimal K factor to guarantee a specific minimum strength and slump. Because some variability between design strength and actual strength is possible, even in the case of highly optimized concrete compositions, some amount of deviation between the design K factor used and the optimal K factor can be tolerated to account for some expected variation. What should be understood is that there is less variation between the design strength and the actual strength of a well optimized mix design compared to a poor mix design. In other words, the actual strength of concrete compositions made using optimized mix designs will more closely corresponding to design strength than concrete compositions made from a poor mix designs. As a result of this, an optimized mix design made according to the inventive design optimization process will have a signature design K factor that exceeds the design K factor of a poor mix design. Similarly, because the binding efficiency of cement paste in a well-designed concrete composition typically exceeds the binding efficiency of cement paste in a poorly designed concrete composition, the actual K factor of a well-designed concrete composition would also be expected to exceed the actual K factor of a poorly-designed concrete composition. This concept becomes more understandable with reference to FIGS. 2 and 3.

Figure 2:
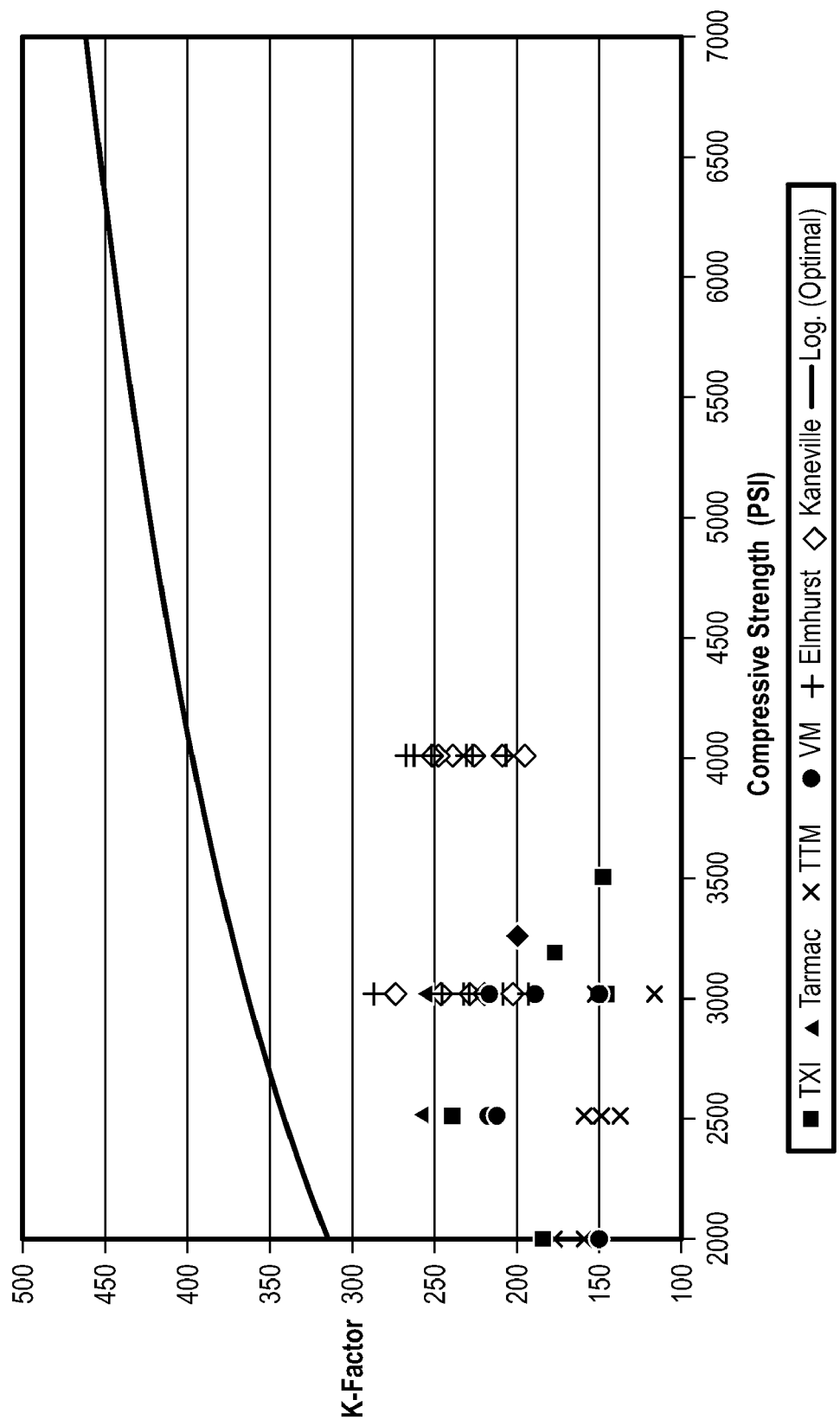
FIG. 2 is a chart that demonstrates how the actual K Factors of known concrete compositions deviate from K factors along an optimal K Factor curve, which illustrates the degree by which such compositions are overdesigned.
Figure 3:
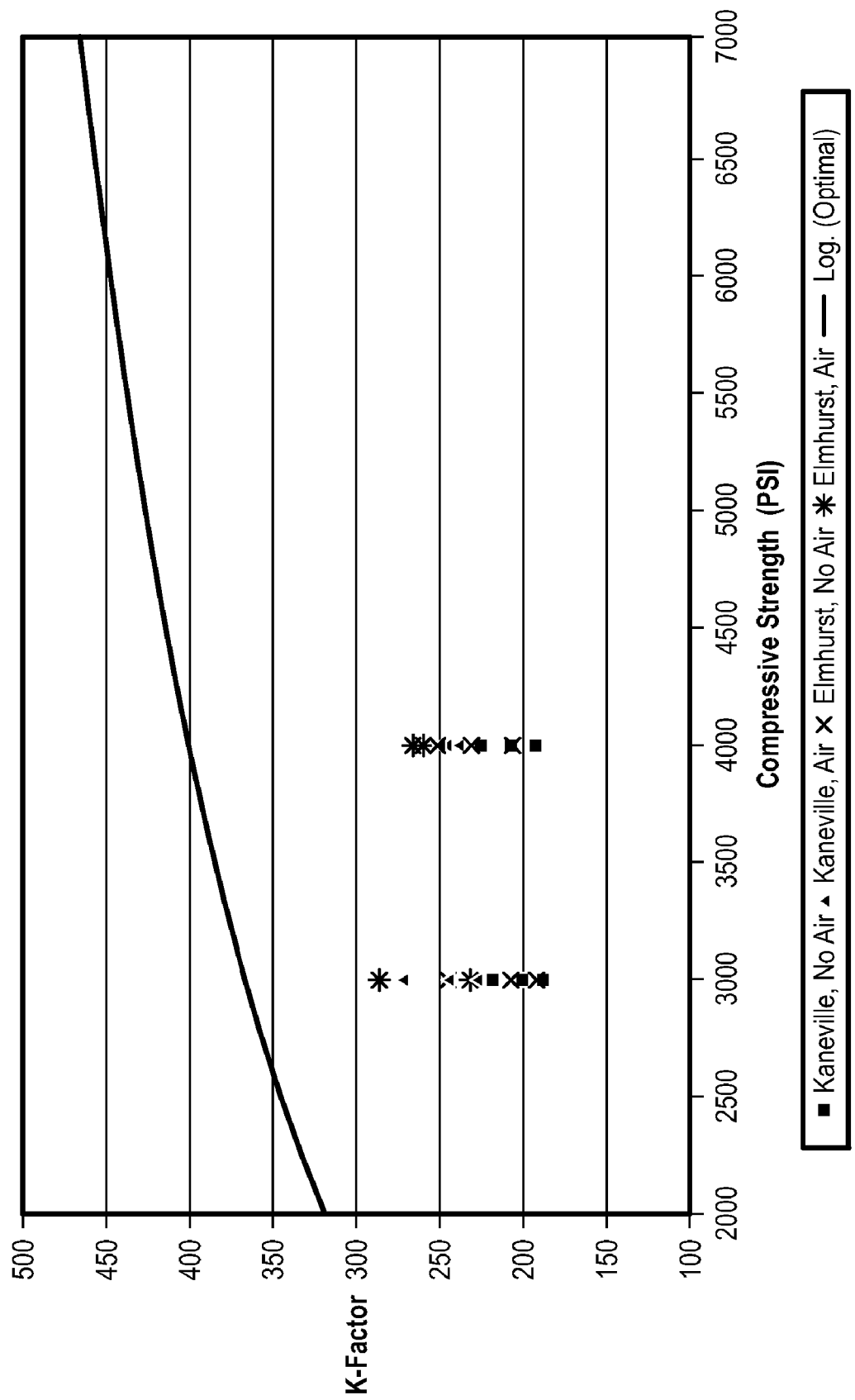
FIG. 3 is another chart showing how the actual K Factors of known concrete compositions deviate from K factors along an optimal K Factor curve, which illustrates the degree by which such compositions are overdesigned.

The apparent design K factor for each specific mix design shown in FIGS. 2 and 3 can be determined by inputting values for cement, water, air and design strength into Feret's equation and then solving for K. The actual K factors that lie along the K factor curve can be derived by properly preparing a number of concrete compositions using standard optimized mix designs used by a plurality of manufacturers according to ASTM C-94 or other rigorous standards known in the art, measuring the actual strength of the concrete test sample, and then solving for K. An optimal K factor curve can be prepared by plotting measured K factors based on optimally prepared concrete compositions against the corresponding compressive strengths.

In many cases, the actual strength of a concrete test sample made from a pre-existing concrete mix design may substantially exceed the design strength, thereby indicating that the pre-existing concrete mix design is overdesigned. However, this alone does not provide a precise way to redesign the pre-existing concrete mix design to reduce or eliminate such overdesigning. Using a revised design K factor that more closely corresponds to the optimal K factor within an optimization procedure that utilizes Feret's equation facilitates the ability to redesign the pre-existing mix design in order for actual strength to more closely correspond to design or predicted strength.

In order to demonstrate the degree by which standard concrete mix designs used in the industry are overdesigned in several existing concrete manufacturing plants (and therefore have an excessively low design K factor), reference is now made to FIGS. 2 and 3. FIG. 2 shows a variety of data points corresponding to apparent design K factors that were determined for each of a plurality of standard mix designs utilized by TXI, Tarmac, TTM, VM, Elmhurst, and Kaneville. The amount by which the data points deviate from the optimal K factor line shown in FIG. 2 indicates the degree to which such standard mix designs are or were overdesigned relative to their design strengths.

The design K factors shown in the data points below the optimal K factor line in FIG. 2 were determined utilizing a rearranged Feret's equation and solving for K, wherein the strength σ corresponds to the design or predicted strength rather than the actual strength of the concrete compositions manufactured according to such mix designs. In every case, the predicted or design strength was far less than the actual strength when the compositions were properly manufactured. The amount by which the tested compositions were found to be overdesigned represents a potential cost savings if such mix designs could be redesigned according to the inventive methods disclosed herein. For example, it is currently estimated that redesigning so as to better optimize existing concrete mix designs can save between $4 and $10 per yard of concrete manufactured. Considering that concrete manufacturers typically enjoy a profit of only about $1 to $2 per yard, the estimated cost savings are tremendous and represent a substantial improvement in the art of concrete manufacture.

FIG. 3 compares the apparent design K factors for a number of pre-existing concrete mix designs of various manufacturing plants using in manufacturing concrete compositions that either include substantial entrained air or are substantially free of entrained air. Again, the deviation between the data points representing the apparent design K factors and the optimal K factor curve shown in FIG. 3 graphically illustrates the potential cost savings if the pre-existing mix designs were redesigned and optimized according to the inventive methods disclosed herein.

As will be readily appreciated, by comparing the apparent design K factor of an existing concrete mix design with the optimal K factor for a given compressive strength lying on the curve shown in FIGS. 1-3, one may readily ascertain the degree by which an existing concrete mix design and corresponding concrete composition are overdesigned. Thus, knowing the optimal K factor and how it varies with compressive strength can be employed as a diagnostic tool to test whether the mix designs and concrete compositions of a concrete manufacturing plant are optimized or whether they are significantly overdesigned. Once it has been determined that an existing mix design is overdesigned, the mix design can be redesigned using the improved DOC process in order to identify one or more optimized mix designs having the desired slump and strength at lower cost. Because the improved DOC process takes into account the actual raw material inputs available to the manufacturer, it is better able to optimize the concrete mixtures compared to standardized tables, which typically cannot account for variations in raw materials inputs among different manufacturing plants or between batches. The improved DOC program understands the dynamic relationship between optimal K factor and concrete strength, which allows it to more efficiently identify one or more optimized mix designs compared to the original DOC program described in the Andersen patent.

III. Computer-Based Operating Environment

Figure 4:
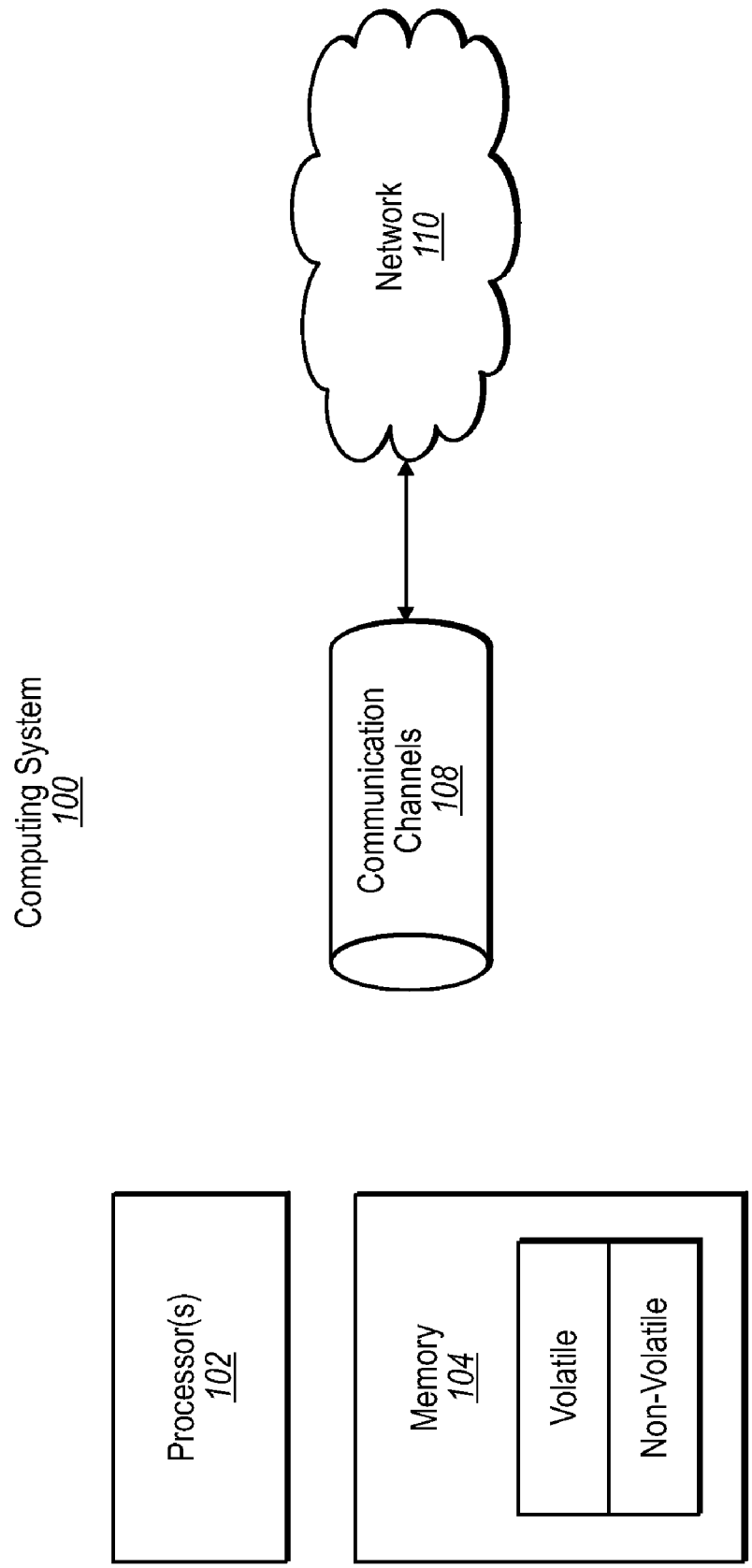
FIG. 4 is a schematic diagram that illustrates a computing system by which design optimization, re-designing, and other aspects of the invention may be carried out.

The operating environment for performing embodiments of the improved DOC program may comprise a special purpose or general-purpose computer, including various types of computer hardware, as discussed in greater detail below. FIG. 4 is a schematic diagram illustrating an exemplary computing system 100 that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 4.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 4, in its most basic configuration, a computing system 100 typically includes at least one processing unit 102 and memory 104. The memory 104 may be system memory, which may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage such as physical storage media. Such storage may be removable or non-removable, and may include, but is not limited to, PCMCIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored or instantiated in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and tangible communications media (i.e., sending and receiving devices which can temporarily store executable instructions, but not the electronic signals themselves).

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

IV. Overview of Exemplary Design Optimization Process

According to a currently preferred embodiment, computer-implemented design optimized processes according to the invention can utilize at least some of the features disclosed in U.S. Pat. No. 5,527,387 to Andersen et al. ("Andersen patent"), the disclosure of which is incorporated by reference. An important difference is that the present invention accounts for the fact that the K Factor utilized in Feret's equation is not a true constant but varies logarithmically with the compressive strength of concrete. In other words, it has now been discovered that increasing the concentration of hydraulic cement in an optimized mixture (as opposed to overcementing) increases its effectiveness or binding efficiency. The concept that the K Factor varies with concrete strength was not previously known and was therefore not appreciated in the Andersen patent or incorporated in the original DOC program (though the original DOC program worked as designed and intended).

When implementing the improved DOC process, the design K Factor utilized in Feret's equation to determine design strength is selected based on the specific minimum slump and strength of concrete that must be guaranteed by the manufacturer. In many other respects, the improved DOC process can be implemented in a manner similar that the original DOC program disclosed in the Andersen patent. It should be understood, however, that it is within the scope of the invention to utilize any set or series of known algorithms for designing one or more concrete mix designs so long as the design K factor that is used when calculating strength according to Feret's equation varies with changes in the desired or target strength (e.g., increases logarithmically with concrete strength).

Figure 5:
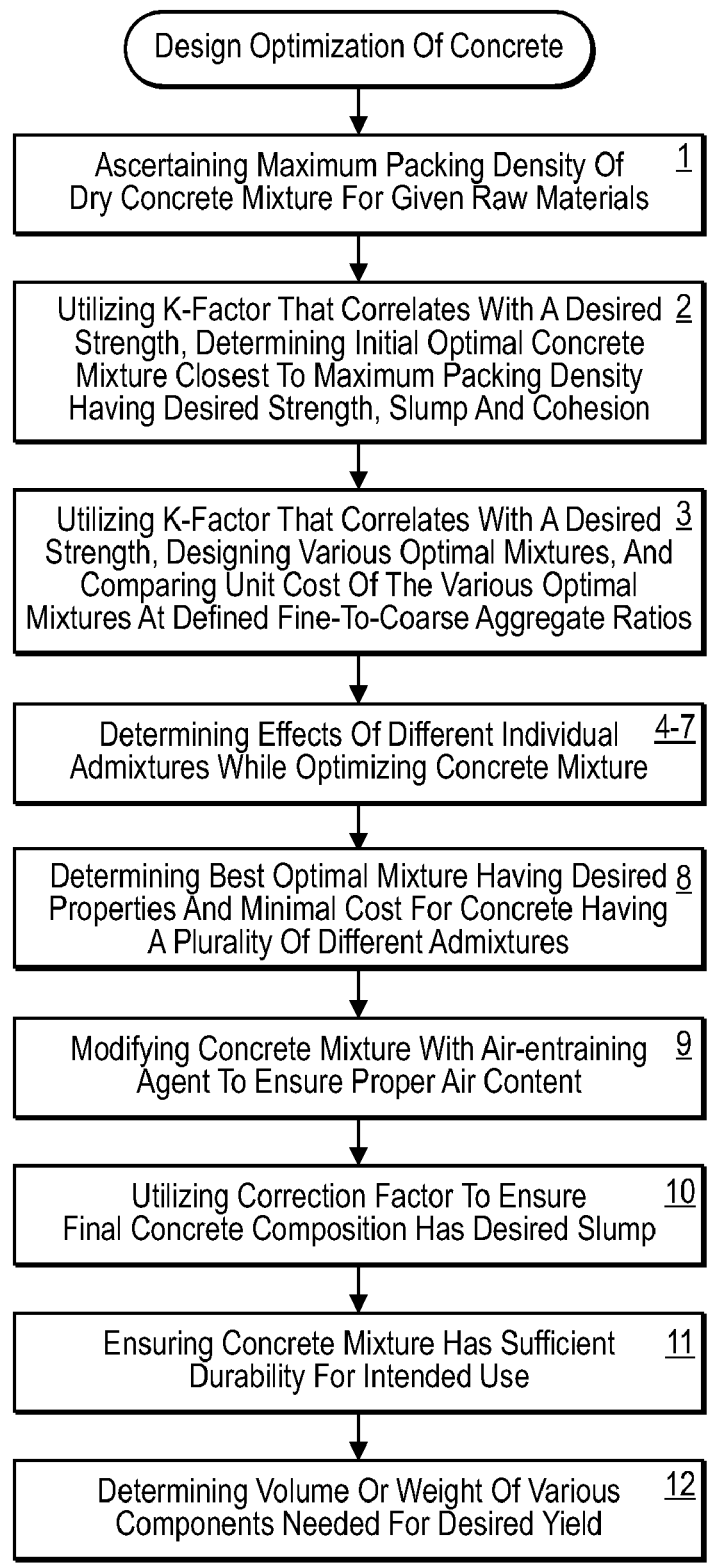
FIG. 5 is a flow chart that illustrates an exemplary optimization process according to the invention for designing an optimized concrete mixture.

FIG. 5 is a flow chart that schematically illustrates or outlines various steps that may be performed according to an embodiment of the invention. These steps are similar to those disclosed in the Andersen patent, except that the procedure illustrated in FIG. 5 selects and then utilizes a design K factor based on the specific minimum strength and slump requirement when calculating the design strength of each hypothetical concrete mix design generated by the improved DOC process. Thus, notwithstanding the similarity that may exist between the process steps illustrated in FIG. 5 and those disclosed in the Andersen patent, the process of FIG. 5 was not known in the prior art as embodied herein. The twelve steps are summarized as follows:

Step 1: Ascertaining the maximum packing density and corresponding composition of a dry concrete mixture having cement and one or more types of aggregate;

Step 2: Utilizing a K factor corresponding to the desired or design strength, determining the initial optimal concrete mixture that is closest to the maximum packing density and has a desired strength, slump, and cohesion at a specific fine-to-coarse-aggregate ratio;

Step 3: Utilizing a K factor corresponding to the design strength, designing various optimal mixtures and comparing the unit cost for each optimal mixture at defined fine-to-coarse-aggregate ratios so as to determine the overall optimal mixture with respect to cost;

Steps 4-7: Calculating the effects of individually combining different admixtures including fly ash, silica fume, water reducers, or fillers, respectively, to identify one or more optimal concrete mixtures;

Step 8: Determining the best optimal mixture having desired properties and minimal cost for mixtures that include fine aggregate, cement, coarse aggregate, mixing water, and two or more admixtures selected from fly ash, silica fume, and water reducers;

Step 9: Modifying the resulting mixture to insure that it reflects the proper concentration of air-entraining agent so as to have the proper air content;

Step 10: Utilizing a correction factor to further optimize the results of the preceding steps and ensure proper slump;

Step 11: Adjusting porosity if necessary to insure that the selected mixture has sufficient durability for its intended use; and Step 12: Accurately determining the volume or weight of the various components of a mixture needed to produce a desired concrete yield.

The foregoing steps outlined above and depicted in FIG. 5 will now be described with more particularity.

A. Step 1: Ascertaining Maximum Packing Density

Step 1 includes ascertaining the maximum packing density of a dry concrete mixture for a given set of raw materials (i.e., cement and one or more types of aggregate). A detailed description of an exemplary embodiment for determining a ratio of hydraulic cement and one or more types of aggregates that maximizes particle packing density is set forth in the Andersen patent at col. 18, line 1-col. 25, line 5. Various methods, including measuring techniques and mathematical algorithms, for determining particle size and packing density for each of the raw materials inputs are described in this section of the Andersen patent. The discussion at col. 18, line 1-col. 25, line 5 of the Andersen patent describes exemplary acts that may be used to carry out step 1.

Initially, each of the aggregate and cement components are defined by their respective average diameter size (d') and natural packing density ($\phi$). These values may be experimentally determined and can be used to calculate the theoretical packing density of a theoretical concrete composition. The average diameter size is determined using known methods, such as by plotting the particle size distribution of each material according to the Rosin-Rammler-Sperling-Bennett distribution described by the equation:

$$R(D)=\exp\{-(d/d')^n\}$$

Where, d is the particle diameter, R(D) is the cumulative probability that the diameter is less than d, d' is the diameter for which R(d')=0.368 corresponding to 36.8% residue on that sieve size, and n is the slope of the line defined by plotting the percent of particles retained on a sieve versus the sieve size.

The packing density of each type of material, $\phi$, is determined by filling the material into a cylinder having a diameter of at least 10 times the largest particle diameter of the material. The cylinder is then tapped against a hard surface until the material is fully compacted. By reading the height of compacted material in the cylinder and the weight of material, the packing density is calculated according to the formula:

$$\varphi = \frac{W_M}{SG_M \cdot V_M}$$

Where, $W_{MN}$ = weight of the material, $SG_M$ = specific gravity of the material, and $V_M$ = volume of the material.

In this way, not only is the volume of particles quantified but it is done as a function of particle morphology, specific surface area and other specific surface characteristics.

Figure 6A:
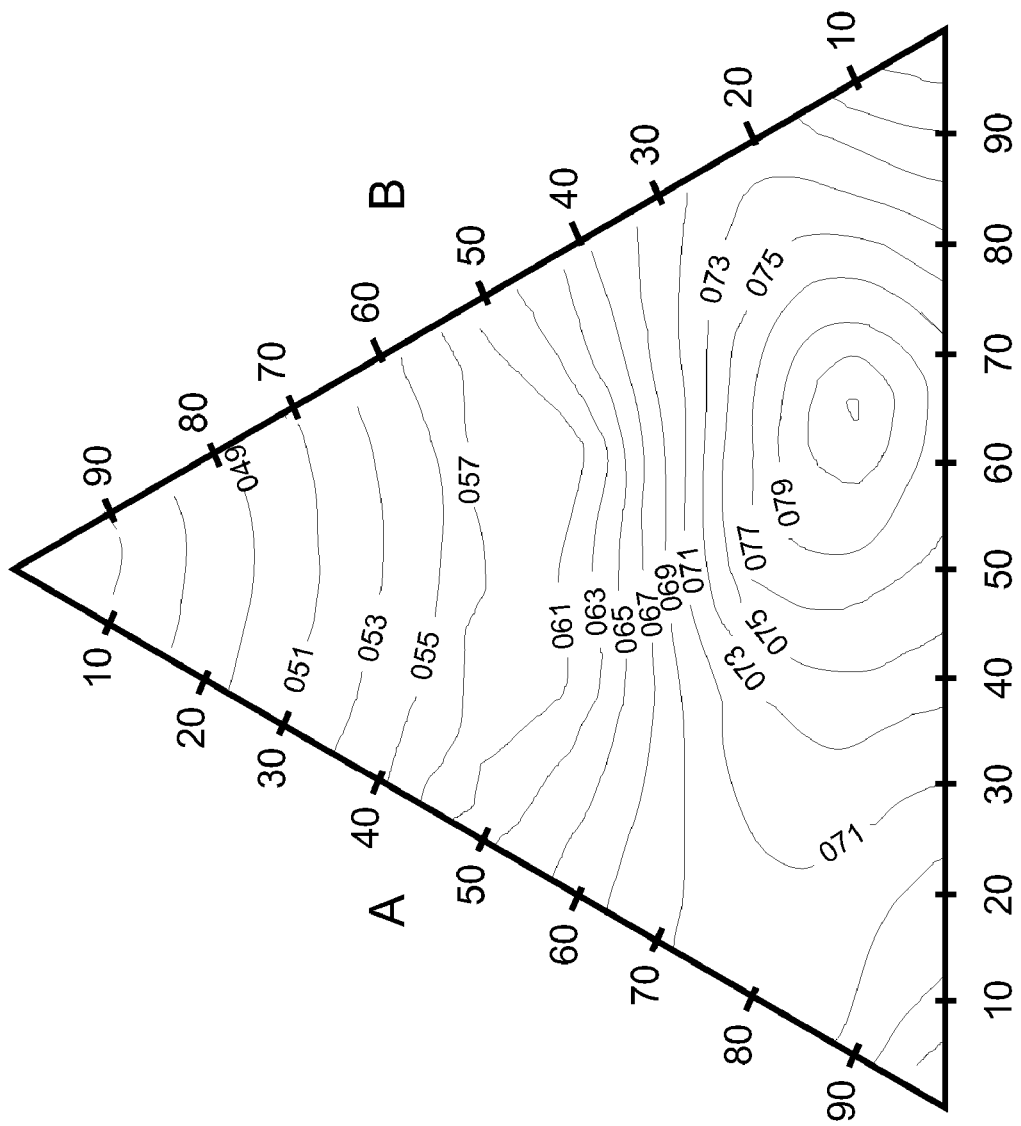
FIG. 6A is a packing density chart for the ternary mixture of cement, quartz sand (0-2 mm), and crushed granite (8-16 mm)

The maximum packing density of a conventional, three-component mixture including cement, one type of fine aggregate, and one type of coarse aggregate is determined by incrementally varying the volume of each component in the mixture and calculating the corresponding packing density. The various packing densities are then plotted on a triangular-shaped packing density chart so as to determine what composition has the maximum packing density. By way of example, FIG. 6A is a packing density chart for a ternary mixture of cement, quartz sand (0-2 mm), and crushed granite (8-16 mm). Side (A) of the chart defines the volume percent of fine aggregate (sand); side (B) defines the volume percent of cement; and the bottom or side (C) defines the volume percent of coarse aggregate (crushed granite). The values inside the triangle represent the packing density at various percent volume mixtures of the components. The chart may be read in the following manner:

Sub-step 1(a): Select a desired packing density from within the triangle. By way of example, point "Z" is selected on FIG. 6B which represents the maximum packing density for the defined mixture.

Sub-step 1(b): Determine the percent volume of cement used in the concrete mixture needed to obtain the packing density at point "Z" by drawing a horizontal line 20 from point "Z" to side (B) of the triangle. The value defined by where line 20 and side (B) of the triangle intersect is the percent volume of cement needed to obtain the desired packing density. In the example on FIG. 6B, the percent volume cement is approximately 10%.

Sub-step 1(c): Determine the percent volume of fine aggregate in the mixture by drawing a line 22 parallel to side (B) of the triangle, the line starting from point "Z" and intersecting side (A) of the triangle. The value defined at where line 22 and side (A) intersect is the percent volume of fine aggregate needed to obtain the desired packing density. In the example, the percent volume of fine aggregate is approximately 30%.

Figure 6B:
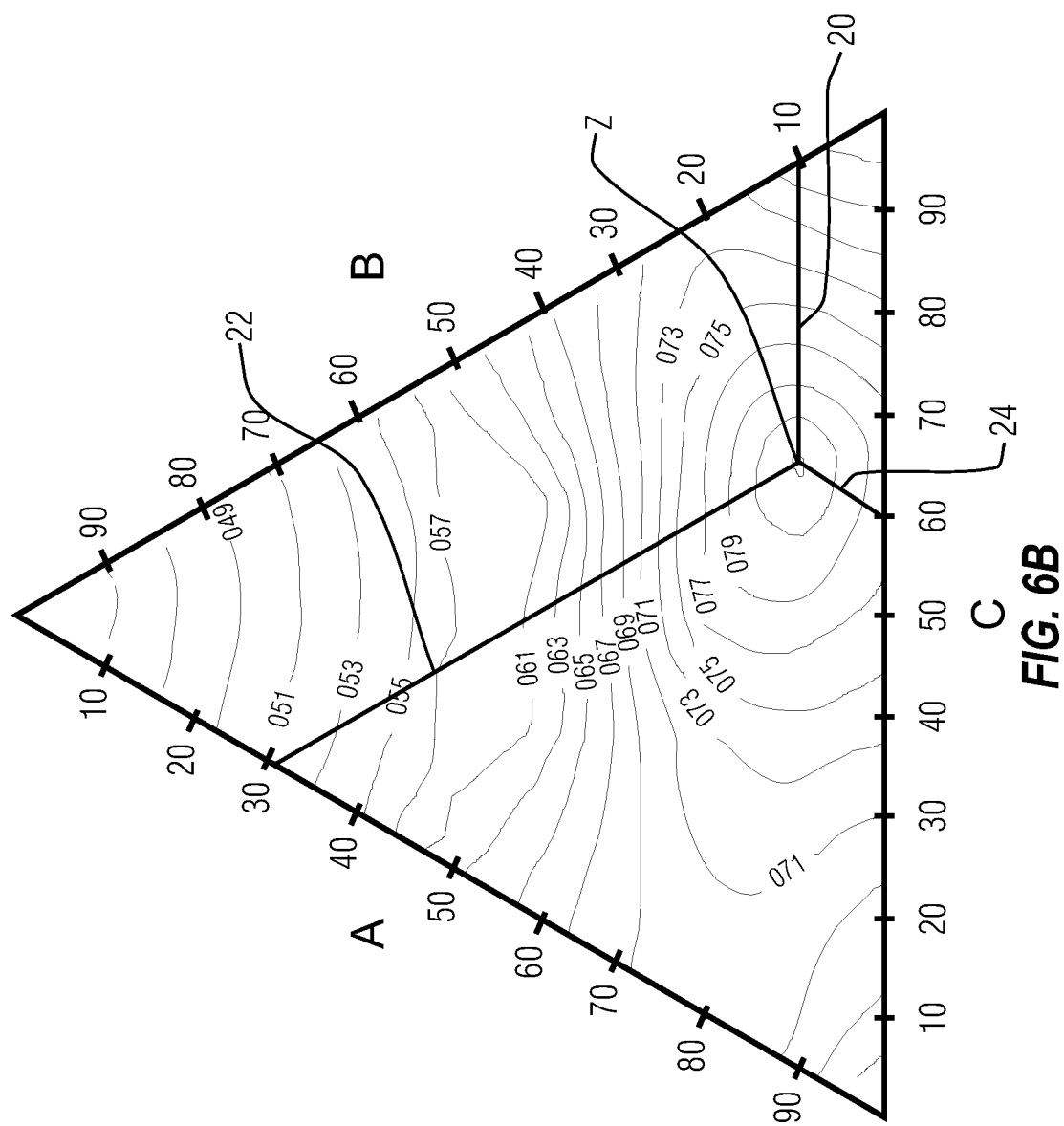
FIG. 6B is the packing density chart of FIG. 6A with lines designating how to read a composition corresponding to a density within the chart.

Sub-step 1(d): Since the percent volume of the mixture must sum to 100%, it logically follows that if the mixture is 10% cement and 30% fine aggregate, the percent volume of coarse aggregate must be 60%. This value, however, can also be determined from the packing density chart by drawing a line 24 parallel with side (A), the line starting at point "Z" and intersecting side (C). The value at the intersection of line 24 and side (C) corresponds to the percent volume of coarse aggregate. As shown in FIG. 6B, the value turns out to be approximately 60%. Using this method, the composition can be ascertained for any packing density on the chart or, using the reverse operation, the packing density can be ascertained for any desired composition.

The packing density values within the chart are evaluated from the Toufar, Klose, and Born model (hereinafter "Toufar model") used in connection with a correction factor. The Toufar model is a formula for calculating the packing densities of binary mixtures:

$$\phi = \frac{1}{\frac{r_1}{\phi_1} + \frac{r_2}{\phi_2} - r_2 \cdot \left(\frac{1}{\phi_2} - 1\right) \cdot \frac{d_2 - d_1}{d_1 + d_2} \cdot \left\{1 - \frac{1 + 4 \cdot \frac{r_1}{r_2} \cdot \frac{\phi_2}{\phi_1 \cdot (1 - \phi_2)}}{\left[1 + \frac{r_1}{r_2} \cdot \frac{\phi_2}{\phi_1 \cdot (1 - \phi_2)}\right]}\right\}}$$

Where, $r_1$ = volume of smaller particles, $r_2$ = volume of larger particles, $d_1$ = diameter of smaller particles, $d_2$ = diameter of larger particles, $\varphi_1$ = packing density of the smaller particles, and $\varphi_2$ = packing density of the larger particles.

Other models may also be used for calculating the packing densities of binary mixtures. Examples of applicable models are the Aim model and the Larrard model discussed in the article Johansen, V. and Andersen, P. J., "Particle Packing and Concrete Properties" 118-122, Materials Science of Concrete II (The American Ceramic Society, Inc., 1991), the teachings of which are incorporated by reference. Additional discussion regarding packing density, including the use of pseudo-particles to determine packing densities using the Toufar model for ternary mixtures, is set forth in the Andersen patent.

Figure 7:
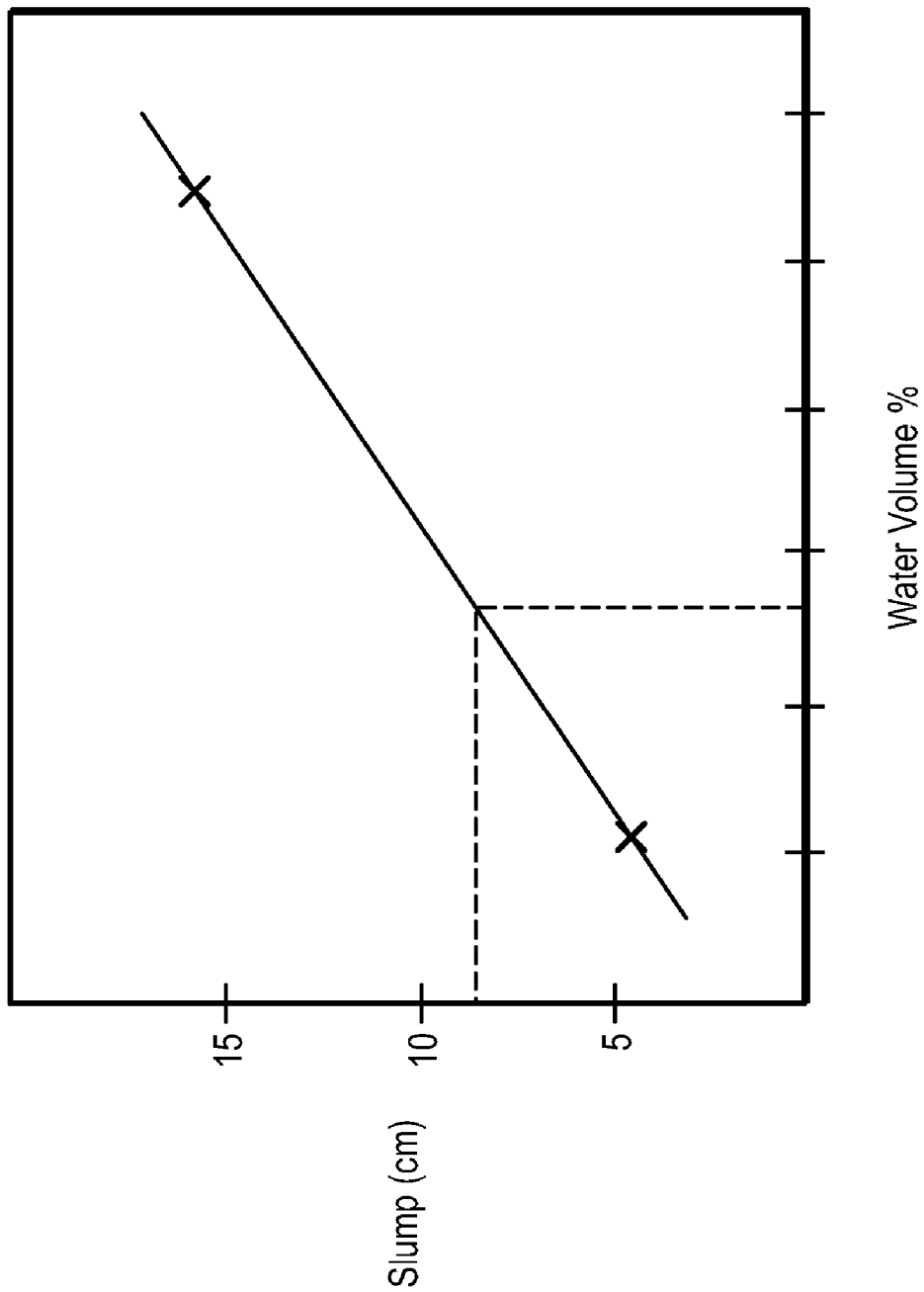
FIG. 7 illustrates an exemplary slump correction chart used to correct slump when approximating the particle packing densities of the solid components.

In an alternative embodiment, the average particle size d' is determined for each component using known methods, but instead of actually measuring the packing density φ, the packing density φ for each component is assumed to be either 0.5, 0.55 or 0.6, since solid particles typically have a particle packing density ranging from 0.5 to 0.6. The optimization program may then be carried out using the exemplary steps discussed below, with the proviso that the actual slump is likely to vary from the theoretical or predicted slump due to variations between true packing density and the assumed packing density. As a result, a final correction step for slump is performed at or near the end of the process (e.g., as part of Step 10 discussed below). Because slump can be measured the moment a concrete mixture is prepared, unlike strength, slump corrections are not time consuming. A slump correction curve, as exemplified by FIG. 7, can be prepared by preparing two concrete mixtures having higher and lower slumps, plotting the high and low slumps (e.g., 5 cm and 15 cm) against the corresponding concentration of water in volume % for the two concrete mixtures, and then drawing a straight line between the two points. The water volume correlating to any desired slump is shown on the curve (e.g., the correlation indicated by the dotted line). A final mix design having a desired slump can be prepared by utilizing an amount of water shown on the slump curve corresponding to the desired slump.

As part of the improved DOC program, the average particle size d' measured for each solid component and the particle packing density for each solid component, whether measured or estimated, are input into a computing system. These values affect the properties that are later determined for each of the plurality of mix designs that are created. The particle size and particle packing densities permit the computer system, by virtue of one or more interrelated algorithms, to hypothetically "test" the resulting properties of each virtual concrete composition based on the mix designs that are created as part of the design optimization process.

B. Step 2: Property Optimization

Step 2 involves determining an initial concrete mixture that is closest to the maximum packing density determined in Step 1 and that has the desired strength, slump, and optionally cohesion at a specific fine-to-coarse aggregate ratio. A detailed description of an exemplary embodiment of a process for identifying a concrete mixture that is optimized with respect to strength, slump and optionally cohesion is set forth in the Andersen patent at col. 25, line 8-col. 29, line 10. The term "cohesion" refers to the tendency of the concrete composition to resist segregation and bleeding. Various methods including mathematical algorithms for optimizing a concrete mixture with respect to strength, slump and optionally cohesion are described in this section of the Andersen patent. The discussion at col. 25, line 8-col. 29, line 10 of the Andersen patent describes exemplary acts that may be used to carry out step 2.

In sub-step 2(a), an initial mixture that is sufficiently close to the maximum packing density to optimize concrete properties without segregating or bleeding is selected by first, as discussed in Step 1, locating the maximum packing density on the packing density chart and the corresponding volume composition. The volume of the corresponding cement, fine aggregate, and coarse aggregate at the point of maximum packing are respectively defined by the variables $V_{C(MP)}$, $V_{F(MP)}$, and $V_{CA(MP)}$, which add up to 1.0. Next, the volume of cement is held constant while the volume of fine aggregate is increased by a quantity defined as the cohesion safety factor, and the volume of coarse aggregate is decreased by the same quantity. The mixture is thus moved horizontally left on the packing density chart. The corresponding mixture is defined as the initial mixture.

The volume (V) of the components in the initial mixture are defined by the equations:

$$V_C = V_{C(MP)}$$

$$V_F = VF_{(MP)} + CF$$

$$V_{CA} = V_{CA(MP)} - CF$$

Wherein, the variable CF represents the cohesion safety factor and is typically about 0.05. The cohesion safety factor insures that the mixture has sufficient fine aggregate to make a cohesive mixture that will not segregate or bleed. Mixtures to the right of the initial mixture on the packing density chart will typically segregate or bleed. The cohesion safety factor can vary in a range between about 0 to about 0.15 depending on the type of concrete. A lower strength concrete typically requires a higher cohesion factor up to about 0.15, while a higher strength concrete requires a lower cohesion factor of less than about 0.05.

The fine-to-coarse-aggregate ratio of the initial mixture is defined by a pseudo-particle line extending from the apex of the packing density chart, through the position of the initial mixture, and to the coarse aggregate line (FIG. 6C; compare FIGS. 6A-6B). The following sub-steps are presented as an example of how to ascertain the optimal concrete mixture along this defined pseudo-particle line.

In sub-step 2(b), the packing density of the composition of the initial concrete mixture is determined as described in Step 1.

In sub-step 2(c), the amount of mixing water required to provide the initial concrete mixture with a predetermined desired slump is ascertained. Determining this amount of water is a two-step process. First, the amount of water needed to provide the mixture with a 1 cm slump is determined using the following formula:

$$W_1 = \frac{1}{\phi} - 1$$

Where, $\phi$=the packing density of the mixture, as defined in sub-step 2(b), and $W_1$=the volume of water required to give the mixture a 1 cm slump. The value for $W_1$ is a fraction of the volume of the solids in the mixture.

Once $W_1$ is calculated for a 1 cm slump, the amount of water needed for the desired slump is calculated using Popovic's formula as follows:

$$W_2 = \frac{W_1}{\left(\frac{S_1}{S_2}\right)^{0.1}} 4$$

Where, $W_1$=the volume of water needed for a 1.0 cm slump as previously defined, $W_2$=the volume of water needed to give the mixture a desired slump, $S_1$=1.0, representing 1.0 cm slump (correct exponent actually found to be 0.085 by the inventors), and $S_2$=the desired slump in centimeters.

In sub-step 2(d), using the results from sub-steps 2(a)-2(c), calculating the 28 day compressive strength of the resulting mixture using Feret's equation:

$$\sigma = K \cdot \left( \frac{V_C}{V_C + V_W + V_A} \right)^2$$

Where, $\sigma$=theoretical 28-day compressive strength of the concrete mixture in MPa, $V_C$=volume of cement in the mixture, $W_2$=volume of water, defined in Step 2(c), needed to give the mixture the desired slump, K=Feret's constant, which is now discovered to vary with compressive strength $\sigma$ as illustrated in FIGS. 1-3, and $V_A$=the volume of air in the mixture and is defined by the following equation:

$$V_A = \left( \frac{1 + W_2}{1 - \frac{\% \, AIR}{100}} \right) - 1 - W_2$$

Where AIR is the estimated percent volume of air in the mixture. The volume of air in a mixture varies based on the type of mixer used, the volume of fine aggregate in the mixture, and the types of admixtures combined with the mixture. The percent volume of air can be estimated by those skilled in the art and is generally between about 1% to 2% for a slump greater than 10 cm and between about 2% to 4% for slump less than 10 cm.

In sub-step 2(e), the resulting compressive theoretical strength, $\sigma$, is compared with the desired strength. If the theoretical strength of the mixture is less than the desired strength, sub-steps 2(b)-2(e) are repeated by replacing the initial mixture with a new mixture and corresponding new packing density. The composition of the new mixture is obtained by increasing or decreasing the volume of cement in order to obtain the desired strength. An estimate of the volume of cement needed to obtain the desired strength is determined by inputting the desired strength into Feret's equation and solving for the corresponding volume of cement according to the following equation:

$$V_{C(N)} = \left( \frac{1 + W_2}{1 - \frac{\% \, AIR}{100}} - 1 \right) \cdot \frac{\left( \frac{\sigma_D}{K} \right)^{0.5}}{\left( 1 - \frac{\sigma_D}{K} \right)^{0.5}} \quad (16)$$

Where, $V_{C(N)}$=volume of cement in the new mixture, $W_2$=volume of water needed to obtain the desired slump in the initial or previous mixture, % AIR=estimated percent volume of air in the mixture, K=Feret's constant, which varies with concrete strength, and $\sigma_D$=the desired strength in MPa.

As the volume of cement changes for the new mixture, the volume of fine aggregate and coarse aggregate must be normalized so that the volume of fine aggregate, coarse aggregate, and cement sum up to 1.0. However, the ratio of fine-to-coarse-aggregate remains constant. Accordingly, the volume of fine aggregate and coarse aggregate in the new mixture are defined by the equations:

$$V_{F(N)} = r_F \cdot (1 - V_{C(N)})$$

$$V_{CA(N)} = r_{CA} \cdot (1 - V_{C(N)})$$

Where, $r_F$ and $r_{CA}$ are the ratios of fine aggregate and coarse aggregate, respectively, and are constants for each pseudo-particle line. The ratios are defined by the equations:

$$r_F = V_F / (V_F + V_{CA})$$

$$r_{CA} = V_{CA} / (V_F + V_{CA})$$

This new mixture corresponds to the position on the packing density chart defined by the intersection of the pseudo-particle line described in sub-step 2(a) and a horizontal line extending from new volume of cement determined by equation (16) above. As the volume of cement changes, one moves up or down on the pseudo-particle line. Sub-steps 2(b)-2(d) are continually repeated until the theoretical strength of the mixture equals the desired strength and the resulting mixture for the defined fine-to-coarse-aggregate ratio has the desired slump and strength using a minimal amount of cement and water. Typically, the desired mixture is found within ten iterations.

C. Step 3: Cost Optimization

Step 3 involves comparing the unit cost of various optimal mixtures at defined fine-to-coarse-aggregate ratios so as to determine one or more overall optimized mixture(s) that are also optimized in terms of low cost. A detailed description of an exemplary embodiment for identifying a concrete mixture that is optimized with respect to cost, while also having the desired strength and slump, is set forth in the Andersen patent at col. 29, line 13-col. 30, line 42, which constitute exemplary acts for carrying out step 3.

According to one embodiment, this may be accomplished by first calculating the unit cost of the initial optimal mixture determined in Step 2. An optimal composition and resulting unit price is then determined for a second optimal mixture defined by a new fine-to-coarse-aggregate ratio. The new fine-to-coarse-aggregate ratio is obtained by decreasing the percent volume of coarse aggregate by 1% and increasing the percent volume of fine aggregate, respectively. The unit price of the second optimal mixture is then compared with the unit price of the initial mixture. If the price of the initial mixture is less than the price of the second mixture, the composition of the initial mixture is the most economical and the process is over. If the second mixture is less than the price of the initial mixture, the fine-to-coarse-aggregate ratio is again varied so as to obtain a third optimal mixture. The cost comparison is then repeated until the least expensive mixture is obtained.

The combination of Steps 1-3 provides exemplary methods for designing a mixture of cement, water, and aggregate having a desired strength and slump. The amount of water added to the mixture can be minimized to maximize strength. The proportions of fine aggregate, coarse aggregate, and cement can be optimized to minimize the cost of the mixture. Furthermore, using the above process, mixtures having desired properties can be consistently and accurately produced independent of the variations in the feedstock. Steps 1-3 can also be used to determine the mixture of highest durability. As will be discussed later in Step 11, the mixture with highest durability is defined as the mixture with the lowest possible total porosity. This is because, in general, as the porosity increases the durability of the mixture decreases. Studies have determined that the porosity of a mixture decreases as the packing density increases. Thus, mixtures closest to the maximum packing density would be predicted to generally have the highest durability.

Steps 4-7 provide additional optimization possibilities by optionally calculating the individual effects of combining different admixtures, such as fly ash, silica fume, water reducers, or fillers, within a concrete mixture.

D. Step 4: Determining Effect of Fly Ash

A detailed description of an exemplary embodiment for identifying an optimal concrete mixture that includes fly ash is set forth in the Andersen patent at col. 30, line 44-col. 33, line 63. This section of the Andersen patent includes exemplary mathematical algorithms relating to the use of fly ash and exemplary acts corresponding to Step 4.

In general, the process includes first repeating Steps 1 and 2 so as to determine the optimal mixture (without an admixture) having desired strength and slump properties for a defined fine-to-coarse-aggregate ratio. Based on the composition of the resulting optimal mixture, a percent volume of cement is incrementally replaced with fly ash. As the percent volume of fly ash is increased, the unit price of each mixture is calculated and compared to the previous mixture to determine the least expensive mixture for the defined fine-to-coarse-aggregate ratio.

The fine-to-coarse-aggregate ratio is then varied by moving 1% to the left on the packing density chart. The above process is then repeated to determine the least expensive mixture using fly ash with the new fine-to-coarse-aggregate ratio. The unit price for the optimal mixtures at the different fine-to-coarse-aggregate ratios are then compared to determine the least expensive mixture. The process continues to move to the left on the packing density chart until the overall optimal mixture having fly ash and the desired properties is obtained. An exemplary algorithm that accounts for the effect of fly ash on slump involves the following modified Popovic's equation:

$$W_2 = \frac{W_1}{\left(\frac{S_1}{S_2}\right)^{0.1}} - W_{FA}$$

Where, $W_{FA}$ is a reduction, as a result of the fly ash, in the volume of water needed to produce a mixture with a desired slump and is determined by the equation:

$$W_{FA} = \frac{W_1 \cdot \% \, FA \cdot 6}{100 \cdot 37}$$

Where, $W_1$=the volume of mixing water required for a 1.0 cm slump in a standard mixture as previously defined, and % FA=the percent volume of fly ash in the combination of fly ash and cement.

The value for $W_2$ can then be used to calculate the 28 day strength using a modified version of Feret's equation that accounts for the fly ash, such as:

$$\sigma = K \left( \frac{V_C + K_2 V_{FA}}{V_C + K_2 V_{FA} + W_2 + V_A} \right)^2$$

Where $K_2$ is a constant for fly ash, and typically ranges between 0.3 and 0.6.

E. Step 5: Determining Effect of Silica Fume

A detailed description of an exemplary embodiment for identifying an optimal concrete mixture that includes silica fume (aka, fumed silica) is set forth in the Andersen patent at col. 33, line 65-col. 35, line 40. This section of the Andersen patent includes exemplary mathematical algorithms relating to the use of silica fume and exemplary acts corresponding to Step 5.

The optimal mixture using silica fume can be ascertained in the same manner used in determining the proper amount of fly ash in Step 4. However, the formulas for the required amount of water and resulting strength are different. In contrast to fly ash, silica fume requires more water for a given slump, but silica fume imparts a greater strength to the cement mixture. With regard to the packing density chart, the volume of silica fume is also considered as part of the volume of cement in the mixture. If desired, a pseudo particle can be used to represent the combination of the cement and silica fume. An exemplary algorithm that accounts for the effect of fumed silica on slump involves the following modified Popovic's equation:

$$W_2 = \frac{W_1}{\left(\frac{S_1}{S_2}\right)^{0.1}} + W_{SF}$$

Where, $W_{SF}$ is an increase, as a result of the silica fume, in the volume of water needed to produce a mixture with a desired slump and is determined by the equation:

$$W_{SF} = \frac{W_1 \cdot \% \, SF \cdot 20}{100 \cdot 20}$$

Where, % SF=the percent volume of silica fume in the combination of silica fume and cement.

The value for $W_2$ can then be used to calculate the 28 day strength using a modified version of Feret's equation that accounts for the fumed silica, such as:

$$\sigma = K\left(\frac{V_C + K_3 V_{SF}}{V_C + K_3 V_{SF} + W_2 + V_A}\right)^2$$

Where, $K_3$=a reactivity constant describing the strength development per volume of silica fume comparable to the same volume of cement. Typically, this value is between 1.5 and 4, with 2 being the preferred value. The actual value can be empirically determined for a given silica fume.

F. Step 6: Determining Effect of Water Reducers

A detailed description of an exemplary embodiment for identifying an optimal concrete mixture that includes water reducers is set forth in Andersen et al. at col. 35, line 45-col. 37, line 55. This section of the Andersen patent includes exemplary mathematical algorithms relating to the use of water reducers and exemplary acts corresponding to Step 6.

Assuming that only water reducers are added to a standard concrete mixture, the process for obtaining the optimal mixture is the same as that used for Step 4 to obtain an optimal mixture using fly ash. The only difference is that the formulas for determining the required amount of mixing water and the resulting strength are modified. The process includes determining the optimal mixture for the first fine-to-coarse-aggregate ratio. Incremental amounts of water reducers are then added to the mixture. The unit cost of these mixtures are calculated and compared so as to determine the optimal mixture having water reducers at the initial fine-to-coarse-aggregate ratio. The fine-to-coarse-aggregate ratio is then varied and the process is repeated. By comparing the unit cost for the optimal mixtures at each fine-to-coarse-aggregate ratio, the overall optimal mixture using water reducers can be determined.

Based on the parameters of the standard water reducer, the percent volume of water needed to produce a mixture including a water reducer with a desired slump is determined by the following equation:

$$W_2 = \frac{W_1}{\left(\frac{S_1}{S_2}\right)^{0.1}} - W_{WR}$$

Where, $W_{WR}$ is a reduction, as a result of the water reducer, in the volume of water needed to produce a mixture with a desired slump and is determined by the equation:

$$W_{WR} = \frac{W_1 \cdot \% \, WR \cdot 30}{100(2)}$$

Where, $W_1$=the volume of mixing water required for a 1.0 cm slump as previously defined, and % WR the percent quantity of water reducer in the mixture by weight of the cement.

The value for $W_2$ can then be used to calculate the 28-day strength using Feret's equation. As water reducers do not independently contribute to the strength of concrete, the same formulas used in Step 2 can be used for calculating 28-day strength and for estimating the volume of cement needed to obtain the desired strength. Since the amount of water required for the desired slump is decreased by using a water reducing agent, the water-cement ratio in the mixture is decreased, thereby, increasing the strength of the resulting mixture. Accordingly, the amount of cement can be reduced until a mixture is defined possessing the desired strength and slump and having the initial 0.1% water reducing agent. A cost comparison is then performed and if the mixture with the water reducer is cheaper, an additional 0.1% water reducer is added to the mixture. The above process is then again repeated according to the format described in Step 4 for fly ash until the optimal mixture including a water reducer is determined.

G. Step 7: Determining Effect of Fillers

A detailed description of an exemplary embodiment for identifying an optimal concrete mixture that includes fillers (e.g., finely ground rock) is set forth in Andersen et al. at col. 37, line 57-col. 38, line 59. This section of the Andersen patent includes exemplary mathematical algorithms relating to the use of fillers and exemplary acts corresponding to Step 7.

Fillers generally do not possess cementitious properties and, thus, do not directly contribute to the strength of the resulting concrete. Similar to fly ash, however, fillers do decrease the amount of mixing water required to obtain a desired slump as compared to cement and, accordingly, can indirectly affect the slump and strength of the resulting concrete. By way of example and not by limitation, fillers can include calcium carbonate, dolomite, granite, basalt, and ore that are crushed to have a particle size similar to fly ash—diameters less than 100 μm. The reduction in the amount of water need to obtain a desired slump is a result of the approximately spherical shape of certain fillers and the lack of hydraulic activity. An exemplary algorithm that accounts for the effect of fillers on slump involves the following modified Popovic's equation:

$$W_2 = \frac{W_1}{\left(\frac{S_1}{S_2}\right)^{0.1}} - W_F$$

Where, $W_F$ is a reduction, as a result of the filler, in the volume of water needed to produce a mixture with a desired slump and is determined by the equation:

$$W_F = \frac{W_1 \cdot \% \, FIL \cdot 6}{100(37)}$$

Where, % FIL=the percent volume of filler in the combination of filler and cement.

The value for $W_2$ can then be used to calculate the 28 day strength. As fillers do not independently contribute to the strength of the concrete, the same formulas used in Step 2 can be used for calculating 28 day strength and for estimating the volume of cement needed to obtain the desired strength.

H. Step 8: Combined Design Optimization System

A detailed description of an exemplary embodiment for determining the combined effect of adding two or more admixtures to a concrete mix design (e.g., two or more of fly ash, silica fume, and water reducer) is set forth in the Andersen patent at col. 38, line 61-col. 43, line 13. This section of Andersen et al. includes exemplary mathematical algorithms relative to identifying an optimal concrete mixture that utilizes multiple admixtures, as well as acts corresponding to step 8.

Once the process is understood of how to optimize a concrete mixture using a single admixture in conjunction with cement, fine aggregate, coarse aggregate and water, the various processes can be combined into a system using an embedded "do loop" that allows one to determine the optimal mixture having selective combinations of admixtures, the admixtures including fly ash, silica fume and water reducers. This process essentially accounts for the effects on slump, strength, cost and other desired factors when utilizing two or more admixtures. In one aspect, the following exemplary modified Feret's equation can be utilized that accounts for two or more admixtures (e.g., fly ash and silica fume) within the cement paste and their affect on strength:

$$\sigma = K \left( \frac{V_C + K_2 V_{FA} + K_3 V_{SF}}{V_C + K_2 V_{FA} + K_3 V_{SF} + W_2 + V_A} \right)^2$$

Where, $V_{SF=\%}SF \cdot (V_T/100)$ $V_{FA=\%}FA \cdot (V_T/100)$ $V_C = V_T - V_{SF} - V_{FA}$ Where, $V_T$=the total volume of cement, silica fume, and fly ash in the mixture. The other variables are as previously and defined in Step 4 and 5.

The following equation defines the amount of water required to give a mixture including fly ash and silica fume a desired slump:

$$W_2 = \frac{W_1}{\left(\frac{S_1}{S_2}\right)^{0.1}} - W_{FA} + W_{SF}$$

Where, $W_{SF}$ and $W_{FA}$ are as defined in Steps 4 and 5.

Figure 8A:
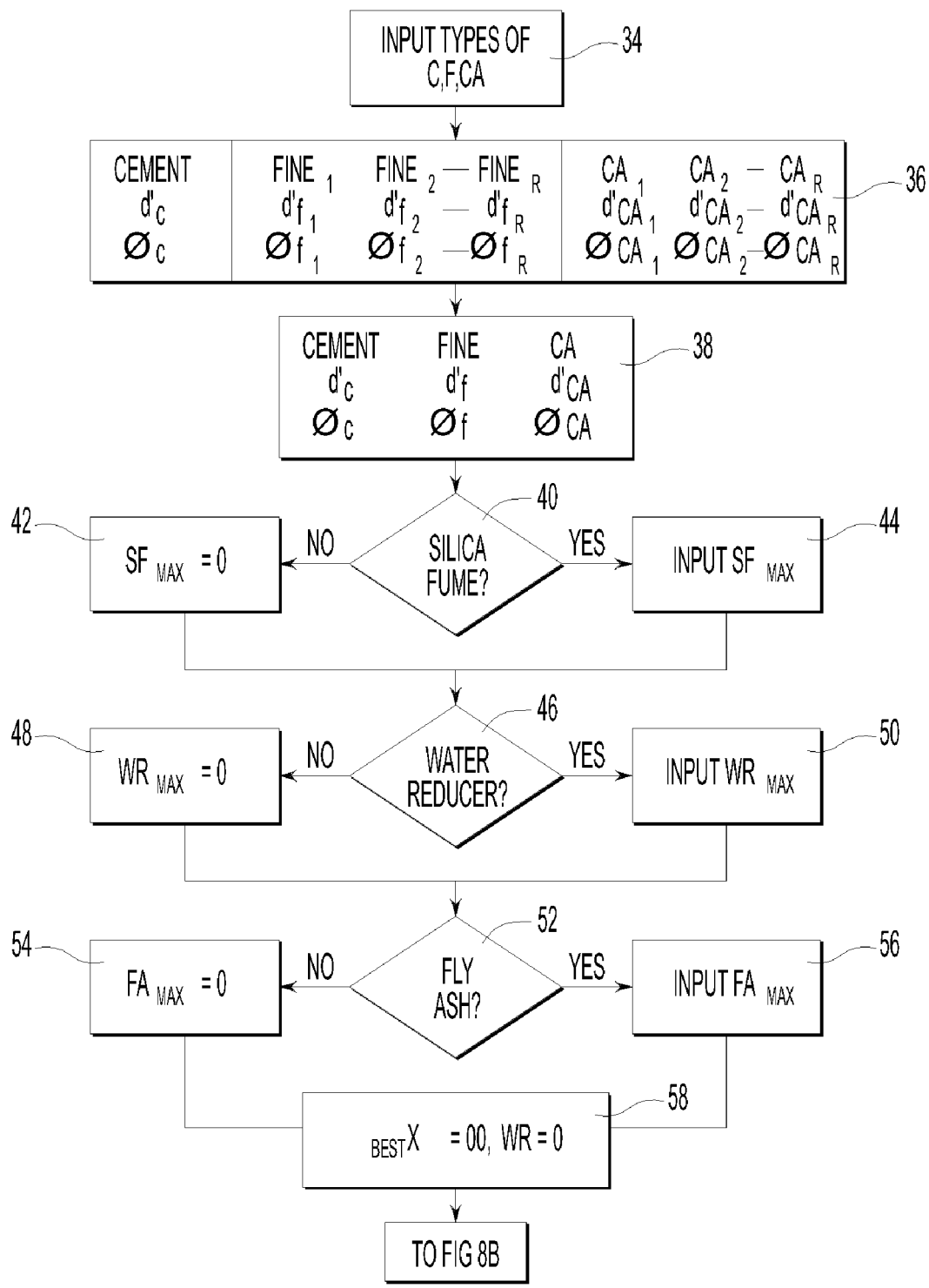
FIGS. 8A-8B comprise a logic flow diagram of the optimization system.
Figure 8B:
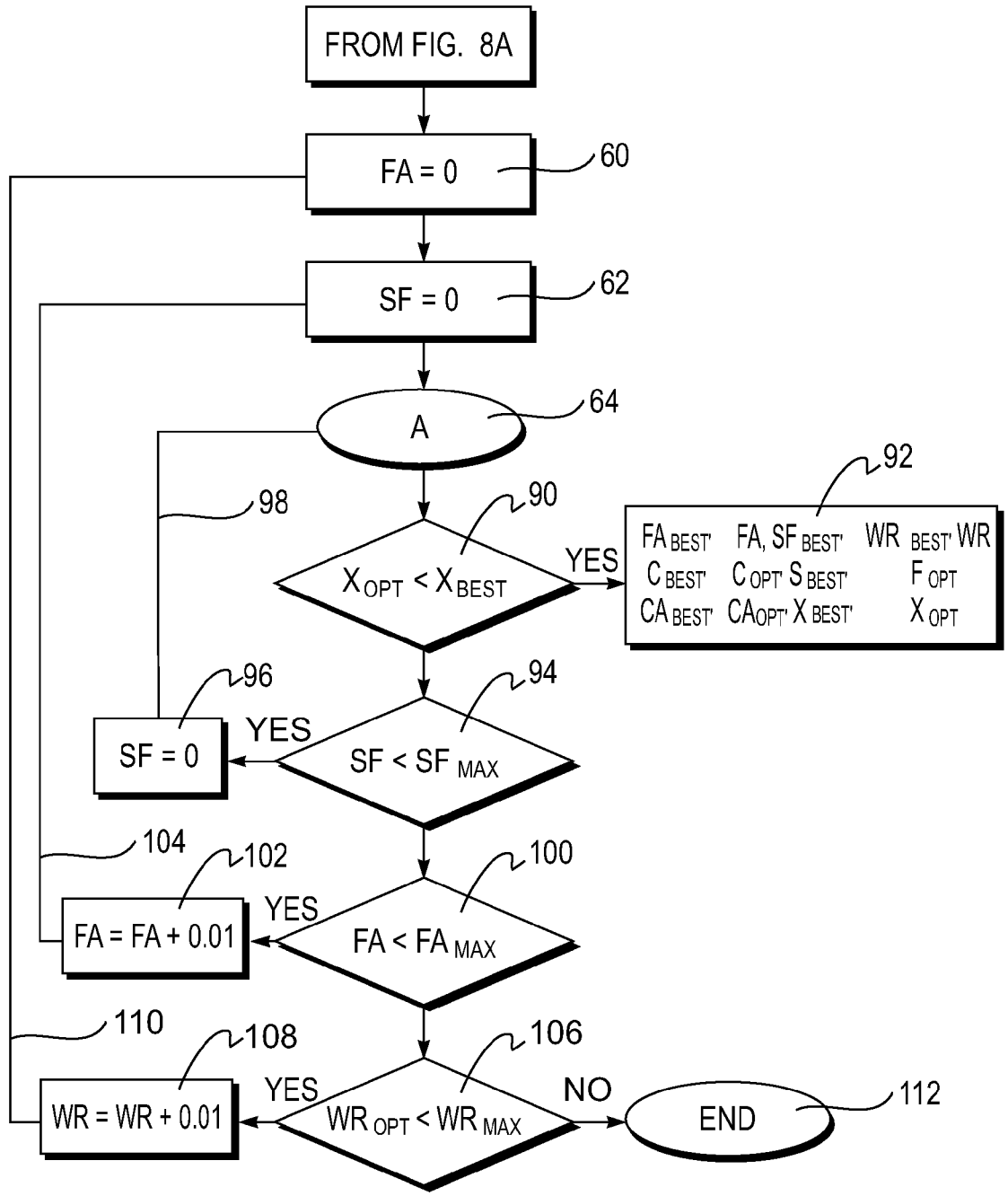
Figure 8C:
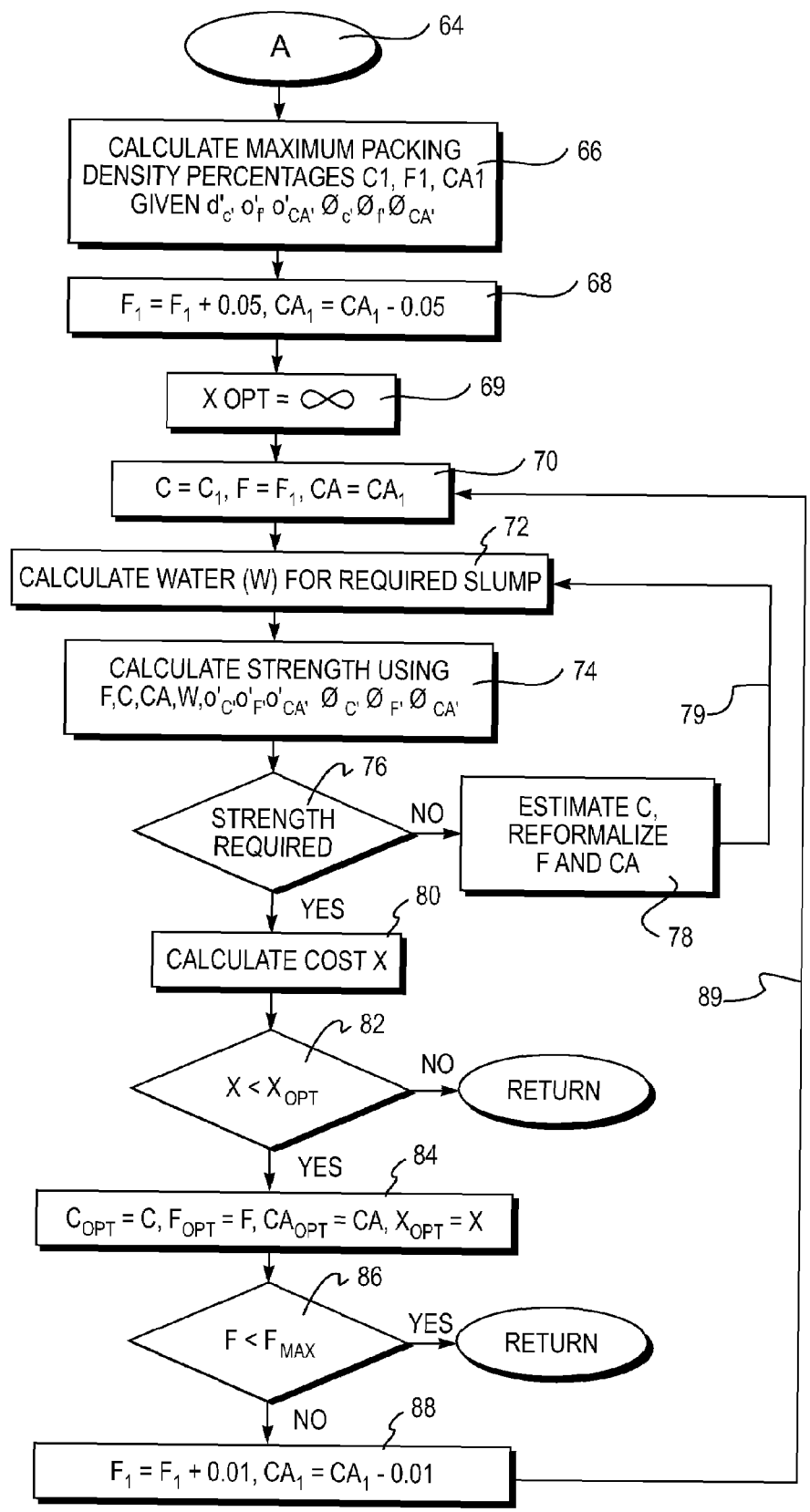
FIG. 8C is a tree of the logic flow diagram shown in FIG. 8B.

The logic of the optimization procedure may be employed in Step 8 as depicted in the logic flow diagram shown in FIGS. 8A and 8B and the logic tree shown in FIG. 8C. FIGS. 8A-8C schematically illustrate exemplary acts corresponding to Step 8. In many ways, the process is similar to previous steps, except that fly ash and silica fume only displace a portion of the hydraulic cement. As a result, the fine-to-coarse aggregate ratio does not need to be varied in this step. What are varied as the various ratios of cement, aggregates, fly ash and silica fume to determine an mix design that is optimized to cost and that includes two or more of fly ash, silica fume and a water reducer.

Should the desired strength not equal the calculated strength, the estimated values for the new volumes of cement, fly ash, and silica fume can be calculated from the following equations, respectively:

$$V_{C(N)} = \frac{\left(\frac{\sigma_D}{K}\right)^{0.5} \frac{W_2 + V_A}{1 - \left(\frac{\sigma_D}{K}\right)^{0.5}}}{1 + \frac{K_2 \cdot \% \, FA}{100 - \% \, FA} + \frac{K_3 \cdot \% \, SF}{100 - \% \, SF}}$$

$$V_{FA(N)} = \frac{\% \, FA \cdot V_{C(N)}}{100 - \% \, FA}$$

$$V_{SF(N)} = \frac{\% \, SF \cdot V_{C(N)}}{100 - \% \, SF}$$

Where all variables are as previously defined in Steps 4 and 5.

Finally, as discussed in relation to step 6, the addition of water reducers is only taken into consideration in determining the amount of water required to give a mixture a desired slump. Accordingly, independent of whether the water reducer is to be added to the combination of cement and fly ash, cement and silica fume, or the composition of cement, fly ash and silica fume, the above defined equations are only varied by subtracting the reduction in the amount of water required for a desired slump as a result of the addition of the water reducer.

For example, the required amount of water for a desired slump in a mixture containing cement, fly ash, silica fume, water reducer, fine aggregate, and coarse aggregate is determined by the following equation:

$$W_2 = \frac{W_1}{\left(\frac{S_1}{S_2}\right)^{0.1}} - W_{FA} + W_{SF} - W_{WR}$$

Where, the values for $W_{FA}$, $W_{SF}$, and $W_{WR}$ are as defined in Steps 4, 5, and 6, respectively.

It should also be noted that the affects of other pozzolans or admixtures can also be added to the optimization process by simply adding another loop to the iterative process.

Similarly, fillers could have been added to the above system, but since fillers are seldom (if ever) added to a mixture including other admixtures, the result would have been the same.

I. Step 9: Modifications Using Air Entraining Agent

Step 9 involves optionally modifying the concrete mixture using an air-entraining agent, if necessary, to ensure that the concrete composition has a proper air content. A detailed description of an exemplary embodiment for employing air-entraining agents, if necessary or desired, is set forth in the Andersen patent at col. 43, line 15-col. 44, line 13. This section of the Andersen patent includes exemplary acts corresponding to Step 9.

Unlike the admixtures discussed above, air-entraining agents are not modeled into the optimization process and thus must be corrected after the fact. Air-entraining agents are admixtures that stabilize bubbles formed during the mixing process by lowering the surface tension of the water. The air-entraining agent forms a water repelling film that is sufficiently strong to contain and stabilize air bubbles. Unlike naturally occurring air bubbles, air bubbles formed through the use of an air-entraining agent are extremely small and have a diameter size ranging from about 10 to about 1000 μm. Benefits to increasing the percent volume of entrained air voids in concrete are the improved resistance to freezing and thawing of hardened concrete in moist conditions and the increased workability of the unhardened concrete mixture.

Once the optimal mixture is actually produced, the actual air content in the mixture can be determined. If the air content for a given slump after completion of the optimization process is too low or too high compared to the assumed air content used in sub-step 2(c), the optimization process can be recalculated using the corrected value for the content of air or the mixture can be reformed with the appropriate amount of air-entraining agent. The air content can also modeled according to the discussion in Step 10 below. As with water reducers, the percent volume of an air entraining agent in a mixture is typically so small that the agent itself is not taken into account as affecting the volume of the mixture. However, the resulting amount of air incorporated into the mixture is taken into consideration in determining the strength of the mixture.

J. Step 10: System Correction Factor

Step 10 identifies and implements a system correction factor to ensure that the final concrete composition has the desired slump. A detailed description of an exemplary embodiment for correcting slump if necessary is set forth in the Andersen patent at col. 44, line 17-col. 45, line 32. This section of Andersen et al. includes exemplary mathematical algorithms relative to correcting slump and exemplary acts corresponding to Step 10.

Once the iterative process of Step 8 is completed, a linear regression analysis can be used to improve the accuracy of the system results. This may be accomplished by plotting the theoretically determined amount of mixing water required to obtain a desired slump versus the actual amount mixing water required to obtain a desired slump. The relationship between the plotted values is then defined and incorporated into Popovic's formula so as to increase the accuracy of the theoretical amount of water required to obtain a desired slump. In practice, the above process includes the following sub-steps:

Sub-step 10(a): Determining the theoretical amount of water required to obtain a desired slump in the optimal mixture defined in Step 8. This amount corresponds to the value for $W_2$ solved from Popovic's formula and is the amount used in determining the resulting 28-day strength of the optimal mixture.

Sub-step 10(b): Physically combine the theoretical amount of water with the optimal concrete mixture of Step 8. Next, experimentally determine the actual slump and air content of the mixture. As a result of approximations incorporated into the optimization process, there will often be a discrepancy between the actual values for slump and air and the theoretical values for slump and air.

Sub-step 10(c): Using Popovic's formula, solve for the amount of water, $W_2$, needed to give the defined mixture the actual slump determined in sub-step 10(b). Sub-steps 10(b) and 10(c) now give the actual and theoretical amounts of water, respectively, required to give a specific mixture a specific slump.

Sub-step 10(d): Repeat Steps 10(a)-10(c) for different desired slumps. The steps should be repeated at least three times with the accuracy of the final results improving the more the steps are repeated. This provides two sets of values corresponding to the actual and theoretical amounts of water required to obtain a defined slump.

Sub-step 10(e): Plot the values of Step 10(d) with the actual amount of water required for a specific slump on the y-axis and the theoretical amount of water required for a specific slump on the x-axis. Studies have shown that such a plot will reveal a linear relationship.

Sub-step 10(f): Define the linear relationship of Step 10(e) in the following form:

$$W_{2c} = (W_2 \cdot m) + b$$

Where, $W_{2c}$=actual amount of water for a defined slump (in use, the value represents the corrected theoretical amount of water for a defined slump), $W_2$=theoretical amount of water for a defined slump, m=slope of the plot in Step 10(e), and b=the y intercept.

Sub-step 10(g): Plot the experimentally determined air content values for each the mixtures versus the experimentally determined slump values for the corresponding mixtures. Define the correlation in the following form:

$$AIR_{ACT} = (SLUMP \cdot m) + b$$

Where, $AIR_{ACT}$=the volume of air in a mixture based on the corresponding slump, SLUMP=the slump for a given mixture, m=slope of the plot of actual slump versus correspond air content, and b=the y intercept of the slope.

Sub-step 10(h): The formula of sub-step 10(f) is then incorporated into the design optimization process such that after the theoretical amount of mixing water required for a desired slump is solved for from Popovic's formula, the resulting value for $W_2$ is input into equation described for sub-step 10(f) above. $W_{2c}$ is then solved for providing an improved or corrected value for the amount of water required to obtain a desired slump. The desired slump is then incorporated into the equation described in sub-step 10(g) to obtain the volume of air in the mixture. The resulting volume of air and corrected water volume are then used in Feret's equation to solve for the strength of the mixture. The optimization process then continues as previously discussed. In this way the slump can be estimated to within ±2 cm.

K. Step 11: Ensuring Sufficient Durability

Step 11 ensures the concrete composition has sufficient durability for its intended use. A detailed description of one currently preferred embodiment for ensuring sufficient durability, if necessary or desired, is set forth in that Andersen patent at col. 45, lines 34-60. This section of Andersen et al. includes an exemplary mathematical algorithm relating to porosity, which affects durability, and describes acts corresponding to Step 11.

The above optimization process can also be used to insure that the selected concrete composition has sufficient durability for its intended use. Durability is the ability of a concrete structure to maintain its integrity over an extended period of time and is measured in this patent in terms of porosity. Mixtures with a high porosity typically have an excessively high concentration of water or fine aggregate and as such have low durability. Total porosity of a mixture can be determined by the following equation, where it is assumed 80% of the hydration of the cement has already occurred:

$$\text{TOTAL POROSITY} = \left(\frac{W_W - 0.208(W_C)}{10}\right) + \% \text{ AIR}$$

Where, $W_W$=weight of water per cubic meter of concrete, $W_C$=weight of cement per cubic meter of concrete, and % Air=percent volume of air in mixture based on volume of solids in mixture.

The above equation can thus be used with the slump and strength to insure that a mixture has desired properties. That is, once a mixture has been found to have sufficient strength and slump, the total porosity can be calculated to determine if it satisfies the desired porosity level. If porosity is too high, the percent volume of cement can be increased, thereby decreasing the porosity of the structure and ensuring that it has sufficient durability.

L. Step 12: Optimizing Yield

Finally, step 12 involves determining the quantities of the various components of the optimal concrete mixture that are needed to produce a desired yield of a concrete composition. A detailed description of one currently preferred embodiment for accurately producing a desired quantity of concrete from the optimal concrete mixture is set forth in the Andersen patent at col. 45, line 63-col. 46, line 52. This section of Andersen et al. includes an exemplary mathematical algorithm relative to determining raw materials quantities to ensure a desired yield and also acts corresponding to step 12.

The volume of a proposed mixture is typically calculated by dividing the weight of each component by its respective density to obtain the volume of each component. The volume of each of the components are then added together to obtain the sum volume of the resulting mixture. This process, however, does not take into account that the packing density of the particles is less than 1.0 and, thus, does not consider the interstitial spaces remaining between the mixed particles. As a result, the actual volume of the mixture is greater than the calculated volume.

The process for optimizing yield entails dividing the volume of each component (as determined by the previously discussed optimization process) by the total volume of the mixture and then multiplying the corresponding fractions by the desired volume of the mixture. These calculations determine the actual volume of each component that should be added to produce a mixture of a desired volume. In turn, the volume of the components can be multiplied by their respective specific gravities to determine the weight of each component that should be added to a mixture to obtain a desired yield of concrete.

By way of example, the volume of cement needed to produce 100 cubic meters of a defined concrete mixture can be determined by the following equation:

$$\text{Vol. Cement} = (V_C/V_T) \cdot 100$$

Where, $V_C$=the volume of cement in the mixture determined in Step 10 of the optimization process and is represented as a fraction of the solids in the mixture, the solids (i.e., cement, fine aggregate, coarse aggregate and, when relevant, fly ash and silica fume) summing to 1.0, $V_T$=the total volume of the optimized mixture defined in Step 8, and is obtained by adding the volume of water, W, in the mixture to the volume of solids (which sum to 1.0) and dividing the sum by the volume of air in the mixture.

Hence, the total volume is represented by the following equation:

$$V_T = \frac{W+1}{1 - \frac{\% \text{ AIR}}{100}}$$

Where, the percent air, % Air, in the mixture can be empirically determined by a trial mix. Using the above equation for each of the components in the mixture, the volume of each of the components needed to produce a mixture with a desired yield can be accurately determined.

V. Computer-Implemented Iterative Design Optimization Sub-Routine or Process

Figure 9:
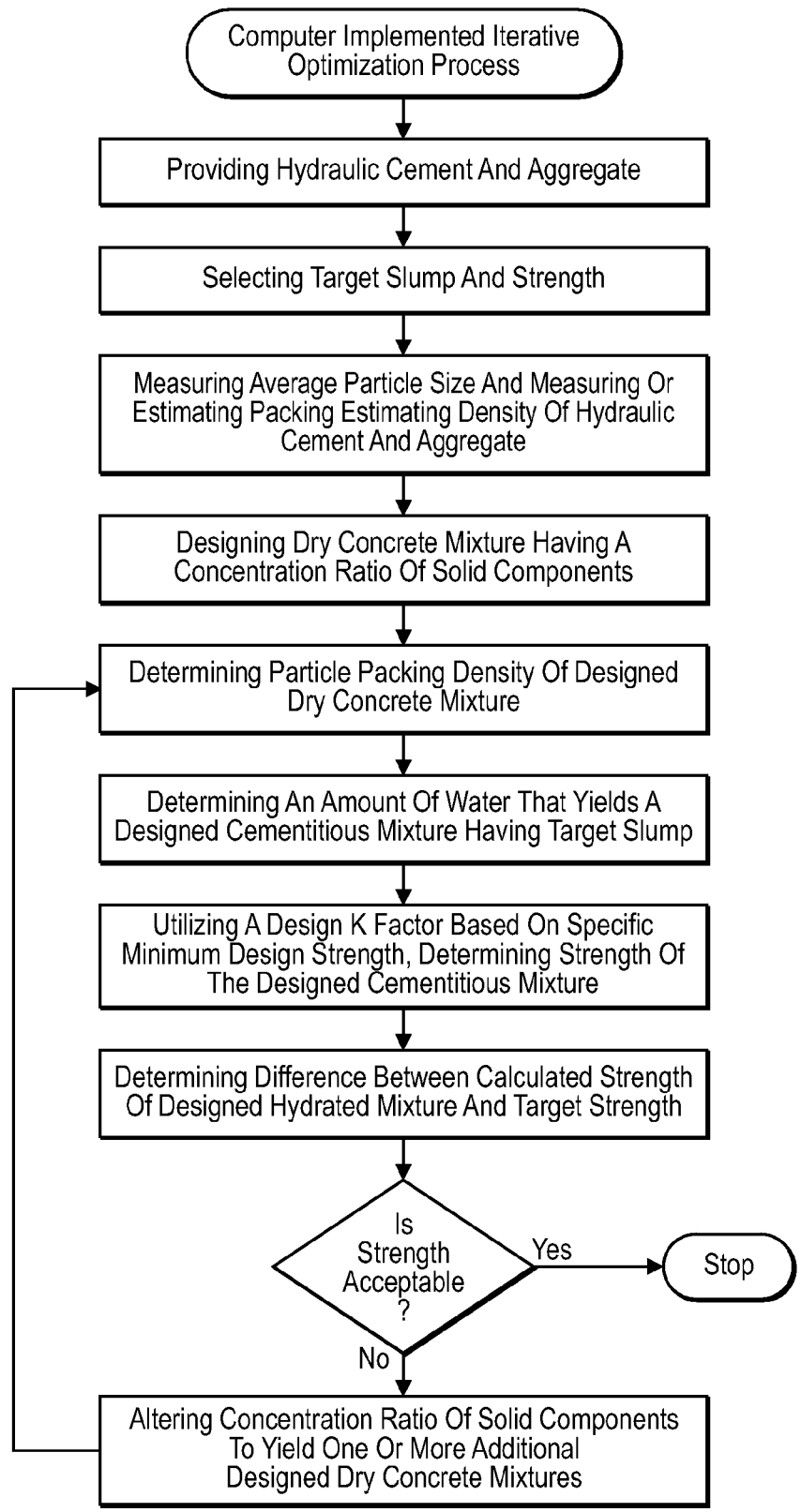
FIG. 9 is a flow chart that illustrates an exemplary computer implemented iterative optimization process according to the invention.

According to another aspect or embodiment of the present invention, there is provided a computer-implemented iterative optimization process according to the flow chart illustrated in FIG. 9, which may be utilized alone or in combination with any part of the generalized process exemplified by Steps 1-12 described in Section IV. This process includes the following steps:

1. providing batches of hydraulic cement and aggregate having specific characteristics;
2. selecting a target slump and strength for the final concrete composition;
3. measuring the average particle size and measuring or estimating the packing density for the solid components comprising hydraulic cement and each type of aggregate (e.g., fine, medium, and coarse aggregate);
4. designing a dry concrete mixture having a concentration ratio of solid components;
5. calculating the particle packing density of the designed dry concrete mixture;
6. calculating an amount of water that yields a designed cementitious mixture having the target slump;
7. calculating the strength of the designed cementitious mixture using Feret's equation, or a variant thereof, utilizing a specific design K factor, from among different K factors that lie along a K factor curve representative of system inputs, that is selected based on the target strength (e.g., a specific minimum desired or design compressive strength of the final designed concrete mixture);
8. calculating the difference between the calculated strength of the designed cement mixture and the target strength; and
9. altering the concentration ratio of the solid components to yield one or more additional designed dry concrete mixtures and then repeating steps 5 through 8 until the calculated strength of one or more designed hydrated mixtures equals or is within an acceptable range of deviation from the target strength.

The design K factor utilized in this process is ideally the same as the theoretical or "true" K factor that corresponds to an ideal target strength. Nevertheless, the design K factor may deviate from the theoretical K factor in order to guarantee a specific minimum concrete strength. The amount of deviation provides a margin of safety to account for variations between design strength and actual strength that may occur as a result of variations in raw materials characteristics and/or variations in processing. Providing a better optimized mix design according to the invention significantly reduces the standard deviation between design strength and actual strength as compared to a poor, unoptimized mix design. Improvements and/or adjustments to processing equipment, as discussed elsewhere in this disclosure, can further reduce the deviation between design and actual strengths. Minimizing and/or monitoring and accounting for changes in the raw materials can further reduce the deviation between design and actual strengths.

Figure 10:
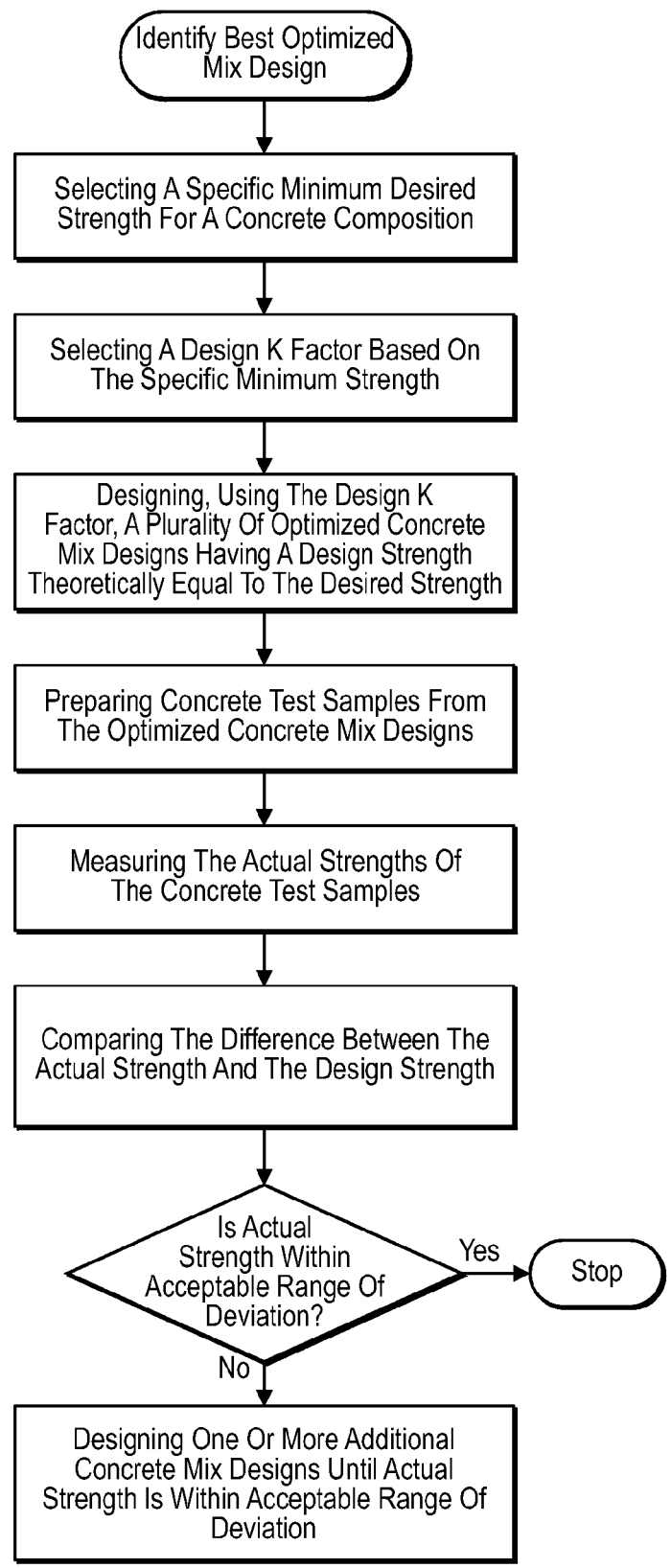
FIG. 10 is flow chart that illustrates an exemplary optimization process according to the invention for designing an optimized concrete mixture which accounts for changes in the K Factor as compressive strength varies.

VI. Identifying Best Optimized Mix Design from Among Several Design Optimized Hypothetical Mix Designs FIG. 10 is a flow chat that illustrates an exemplary process according to the invention for designing several/hypothetical optimized mix designs and then identifying the best optimized mix design. The process illustrated in FIG. 10 demonstrates the use of a correct design K factor selected based on the desired or target strength. This process can be utilized using any desired computer-implemented design optimization procedure that utilizes Feret's equation or a variation thereof, including any processes disclosed herein. The design optimization illustrated by FIG. 10 includes the following steps:

1. selecting the specific minimum desired or target strength for a concrete composition;
2. selecting a design K factor based on the desired or target strength, which may equal or deviate from theoretical K factor that corresponds to that strength;
3. designing, using the design K factor, a plurality of theoretically optimized concrete mix designs having a design strength that is theoretically equal to the desired or target strength;
4. preparing concrete test samples based on the theoretically optimized concrete mix designs;
5. measuring the actual strengths of the concrete test samples;
6. comparing the difference between the actual strength for each theoretically optimized mix design and the desired or target strength; and
7. if the actual strength is not within an acceptable range of deviation relative to the desired strength, designing one or more additional concrete mix designs until the desired strength of one or more additional concrete mix designs is within an acceptable range of deviation from the desired strength.

The acceptable range of deviation between the actual strength and the desired strength can be selected depending on the level of certainty desired by the concrete manufacturer. An actual strength that is outside the acceptable range of deviation typically indicates a concrete mixture that is overdesigned. Conversely, an actual strength that falls within the acceptable range of deviation is indicative of a better optimized mix design.

VII. Manufacturing an Optimized Concrete Composition

Figure 11:
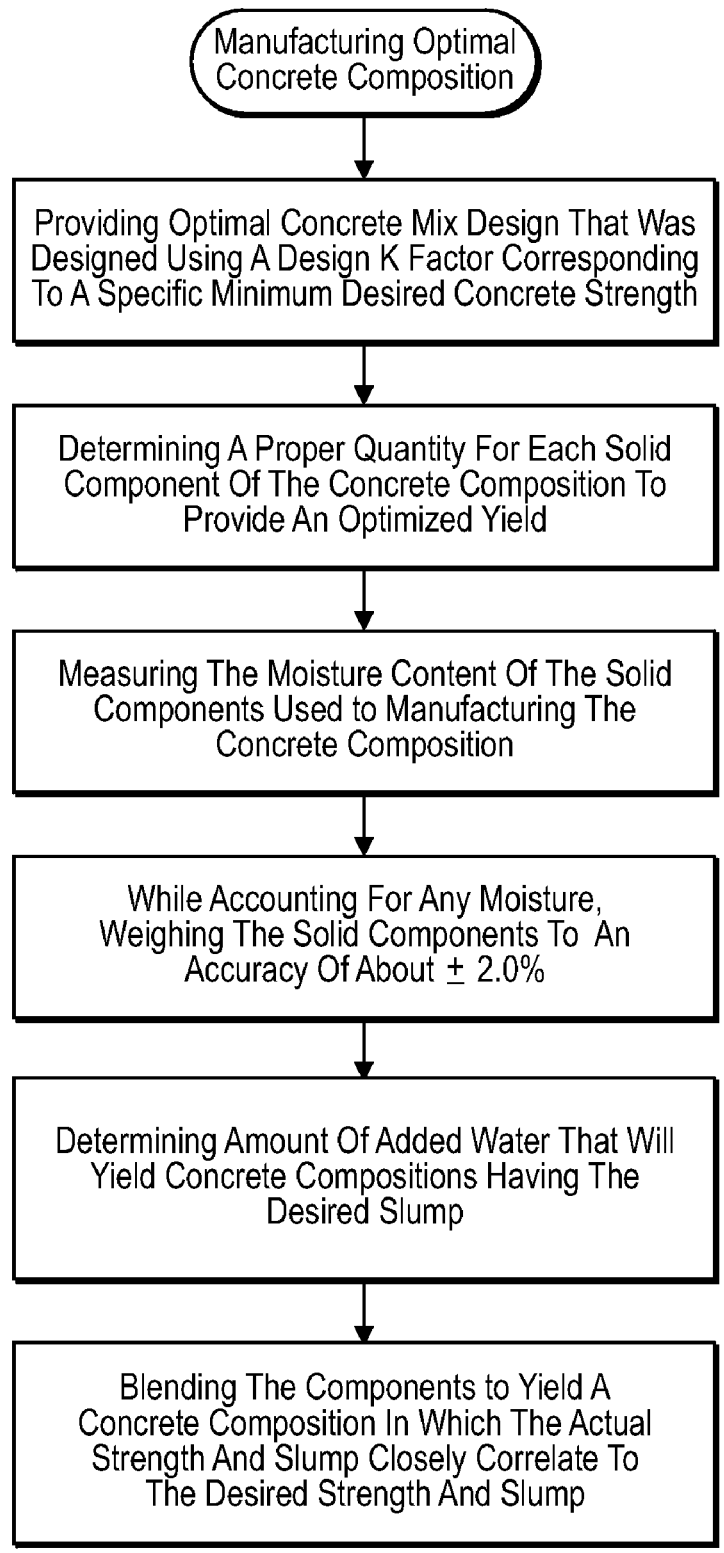
FIG. 11 is a flow chart that illustrates an exemplary process for manufacturing a concrete composition from an optimized concrete mix design in order to ensure that the actual strength closely correlates to the desired or predicted strength.

FIG. 11 is a flow chart that illustrates an exemplary process for manufacturing an optimal concrete composition design using an inventive design optimization procedure set forth herein. The manufacturing process includes the following steps:

1. providing an optimal concrete mix design that was determined using a design K factor that corresponds to a specific minimum desired strength of the concrete to be manufactured;
2. determining a proper quantity for each solid component of the concrete composition in order to provide an optimized yield that guarantees a minimum required quantity while minimizing overproduction and waste;
3. measuring the moisture content of the solid components used to manufacture the concrete composition;
4. taking into account any moisture within the solid components, weighing each solid component added to the concrete composition to an accuracy of about ±2.0%, more preferably to an accuracy of about ±1.0%, and most preferably to an accuracy of about 0.5%;
5. taking into account any moisture within the solid components, determining an amount of batch water that, when blended with the solid components, will yield a concrete composition having a desired slump (e.g., according to the mix design); and
6. blending the components to yield a concrete composition in which the actual strength and slump closely correlate to the desired strength and slump.

According to one embodiment, it may be advantageous to control the concentration of water from the time the concrete composition is manufactured until the time it is delivered and used at the job site to prevent degradation of concrete strength. Additional information for optimizing the mixing process and controlling water concentration will now be given.

A. Controlling the Quantities of Components Added to Concrete

In order to obtain a concrete composition in which the actual strength closely corresponds to the desired or theoretical strength of the optimized concrete mix design, it is preferable to carefully weight or otherwise measure the quantity of each component added to the concrete composition. According to one embodiment, each component is preferably weighed to an accuracy of about ±2.0%, more preferably to an accuracy of about ±1.0%, and most preferably to an accuracy of about ±0.5%. An example of apparatus that can be used to accurately weigh the various components added to a concrete delivery/mixer truck within the foregoing parameters is an Alkon Command Batch Weigh-up & Batching System. It will be appreciated, however, that it is within the scope of the invention to utilize any other apparatus known in the art or that may be developed that is capable of accurately weighing or otherwise measuring the amounts of the components added to the concrete mixer truck within the desired level of accuracy.

B. Accounting for Variations in Moisture Content of Solid Components

According to one embodiment, it is advantageous to account for variations in the moisture content of the solid components (i.e., aggregates), which can significantly affect the strength and slump of the resulting concrete composition. Because moisture adds weight to the aggregates, failure to account and correct for this moisture can result in using a lower quantity of one or more aggregates than what may be required according to an optimized mix design. Providing a lesser quantity of one or more aggregates than what was determined by the design K factor to be optional can indirectly affect the strength of the resulting concrete composition (e.g., by increasing the amount of water, which increases the water-to-content ratio). In addition, reducing the amount of aggregates may increase the relative amount of hydraulic cement to beyond what was determined to be optimal. In addition to reducing strength, the unaccounted for excess water will also increase the overall batch water content, which may increase slump to beyond what was determined to be optimal.

To account for moisture, sensors may be used to sense the moisture content of the solid components. Any moisture sensors known in the art or that may be developed can be used to monitor content. An example of a moisture sensor is a microwave sensor, which beams microwave radiation into a given volume of material (e.g., fine, medium or coarse aggregate) and then measures the absorption of microwave energy by any water that may be present. Because water strongly absorbs microwave energy, the amount of microwave energy absorbed by a given volume of aggregates correlates with an amount of moisture within the aggregates. The information regarding moisture content can be utilized to determine (e.g., by a computer) how much additional must be weighed out to provide the correct amount of aggregate and/or how much added water should be added to the mixture to maintain the correct slump and/or water-to-cement ratio. In general, smaller aggregates are more sensitive to changes in moisture due to their generally higher surface area and ability to absorb moisture into pores.

C. Use of Admixtures Instead of Water to Increase Slump

Equally or more important than controlling the initial quantities of components added to the concrete mixer/delivery truck is carefully controlling the concentration of batch water in the concrete composition from between the time the components are added to the cement mixer drum to when the composition is delivered and utilized at the job site. In order to maintain a strength that meets or exceeds the specific minimum strength, little or no additional water should ever be added to the concrete composition once the components have been properly batched and mixed together.

In the event that it may be desired to alter the slump of the concrete composition at a job site, only suitable chemical admixtures for increasing or decreasing slump should be utilized. For example, where it is desired to increase the slump, one of the various plasticizers, super-plasticizers or high range water reducers known in the art can be utilized. Where it is desired to decrease slump, any of the known rheology modifying agents or water binding agents known in the art can be utilized. The quantity of such admixtures added to the concrete composition should be carefully controlled in order to deliver a concrete composition having the desired properties of slump and strength.

D. Specially Designed Concrete Mixing Trucks

In current practice, slump modifications in concrete are typically performed at the job site by the concrete truck driver adding additional water. This is the worst way to ensure desired strength since concrete truck drivers are typically the least knowledgeable regarding the deleterious effect of adding water to concrete. In most cases, drivers go on look and feel rather than using a slump cone. This practice is so common that concrete manufacturers are forced by necessity to overdesign their concrete mix designs by a significant margin.

In order to prevent a concrete truck driver from deliberately or inadvertently adding water to the concrete composition once it leaves the concrete manufacturing site, it is within the scope of the invention to utilize specially designed concrete mixing trucks that include a tank or vessel containing one or more admixtures used to make slump adjustments as needed at the job site. For example, plasticizers, super-plasticizers or long-range water reducers known in the art can be contained within one or more vessels. In addition, the concrete mixing truck may include a device that accurately measures the slump of the concrete mixture within the drum. If it is necessary or desired to increase the slump of the concrete mixture, a pre-determined quantity of the slump increasing admixture can be injected from the special tank or vessel into the drum in order to raise the slump to the desired value.

A separate vessel or tank may also include admixtures that are capable of altering the concrete composition in other ways (e.g., increasing cohesion, decreasing slump, increasing set time, or retarding set time). Because such admixtures do not typically affect strength, the desired minimum strength can more easily be maintained, thereby further decreasing the deviation between actual and design strength (and actual and design K factor).

Concrete delivery trucks are typically equipped with water tanks to add water on site. Some are also equipped with admixture tanks to meter admixtures. One of skill in the art, knowing how admixtures affect slump, can readily design a concrete truck that is able to meter a specific quantity of slump altering admixture as may be needed to desired to alter slump in the appropriate manner. Thus, only minor modifications of existing concrete trucks may be required. Such apparatus comprising means for metering a desired quantity of admixture to a concrete composition on site.

E. Abbreviated Re-Design Process to Adjust Slump of an Optimized Mix Design without Substantially Altering Compressive Strength In some cases it may be desirable to quickly re-design a mix design that is already optimized in order to adjust the slump without significantly changing the compressive strength. This can be done without creating a whole new optimized mix design using, e.g., the detailed 12-step design optimization procedure described above. To maintain the same essential strength, while varying the slump, the same water-to-cement ratio of the paste is maintained. Only the volume of paste is altered in order to adjust the slump of the wet cementitious mixture. In general, adding more paste will increase slump, while adding less paste will decrease the slump. Thus, the overall ratio of cement paste to aggregate is adjusted to change the slump. Because the water-to-cement ratio of the paste remains the same, the strength will theoretically remain essentially the same. In some cases, the ratio of fine to coarse aggregates may remain the same. In other cases, the ratio can be altered somewhat depending on the effect on the other properties caused by changing the overall ratio of cement paste to aggregate (e.g., cohesiveness, durability, and the like).

Figure 12:
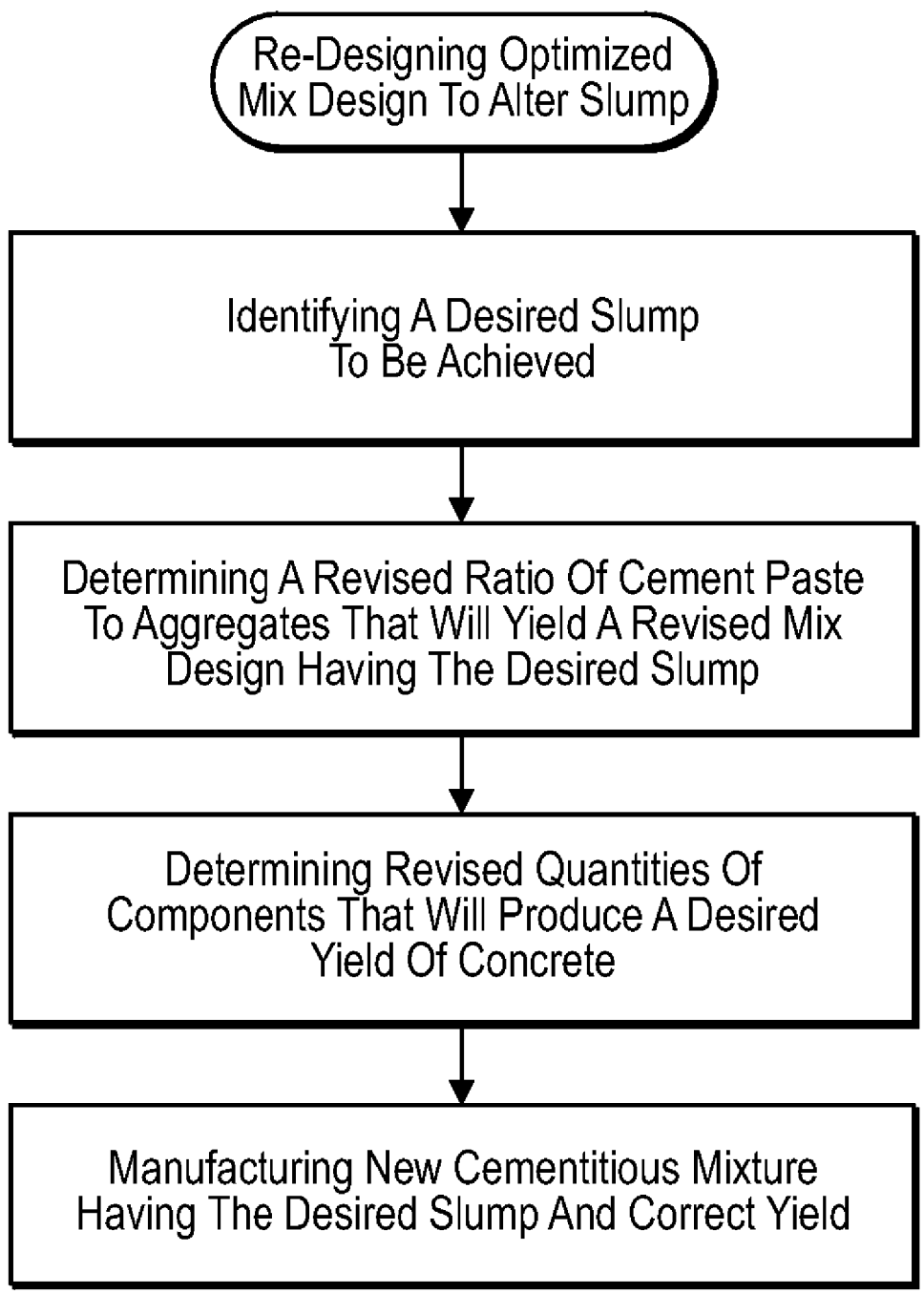
FIG. 12 is a flow chart that illustrates an exemplary abbreviated re-design process for changing the slump of an optimized concrete mix design without substantially changing the strength.

A flow chart illustrating an exemplary method for the abbreviated re-design of a current optimized mix design in order to adjust slump is shown in FIG. 12. The effect of changing the overall concentration of cement paste on slump can be determined using any of the slump equations set forth above and accounting for the increased or decreased water content depending on whether the amount of cement paste is increased or decreased compared to the initial mix design. Adding more cement paste increases slump because it increases the overall concentration of water-to-solid components. Conversely, decreasing the quantity of cement paste decreases slump because it decreases the overall ration of water-to-solid components.

According to one embodiment, the process is controlled by a computer and involves monitoring changes in slump between batches, which might be caused by variations in aggregate size and/or moisture. When a change in slump is detected, a computer-implemented design process involves adjusting the quantity of water in order to revise the slump, changing the amount of cement to maintain the same water to cement ratio (and therefore strength), and altering the relative concentration of aggregates if needed to maintain a proper amount of cohesiveness. In general, increasing the ratio of fine aggregate to coarse aggregate increases cohesiveness but can decrease slump. A decrease in cement paste may require an increase in fine aggregate to maintain cohesiveness. Conversely, an increase in cement paste may require a decrease in fine aggregate to increase slump while avoiding the deleterious effect of overcementing and in order to better optimize cost.

In some cases, it may be possible to select a ratio of fine to coarse aggregate that is not necessarily perfectly optimized but that is adequate (e.g., typically within a range of 40:60 to 60:40 parts fine to coarse aggregate). Within this ratio there is often not a lot of variability in cohesion and segregation, which can greatly affect concrete performance when placed at a job site. To ensure a minimum guaranteed strength, a cement paste is designed having a water to cement ratio that yield the desired strength (e.g., in the case where the cement paste is the weakest component). The ratio of cement paste to aggregate is adjusted to yield the desired slump. While this approach does not optimize concrete to the same degree of accuracy, it can be employed in many cases (e.g., smaller jobs where the relatively small cost of overdesigning may not justify a full-blown optimization procedure as described herein).

VIII. Redesigning a Pre-Existing Concrete Mix Design

Figure 13:
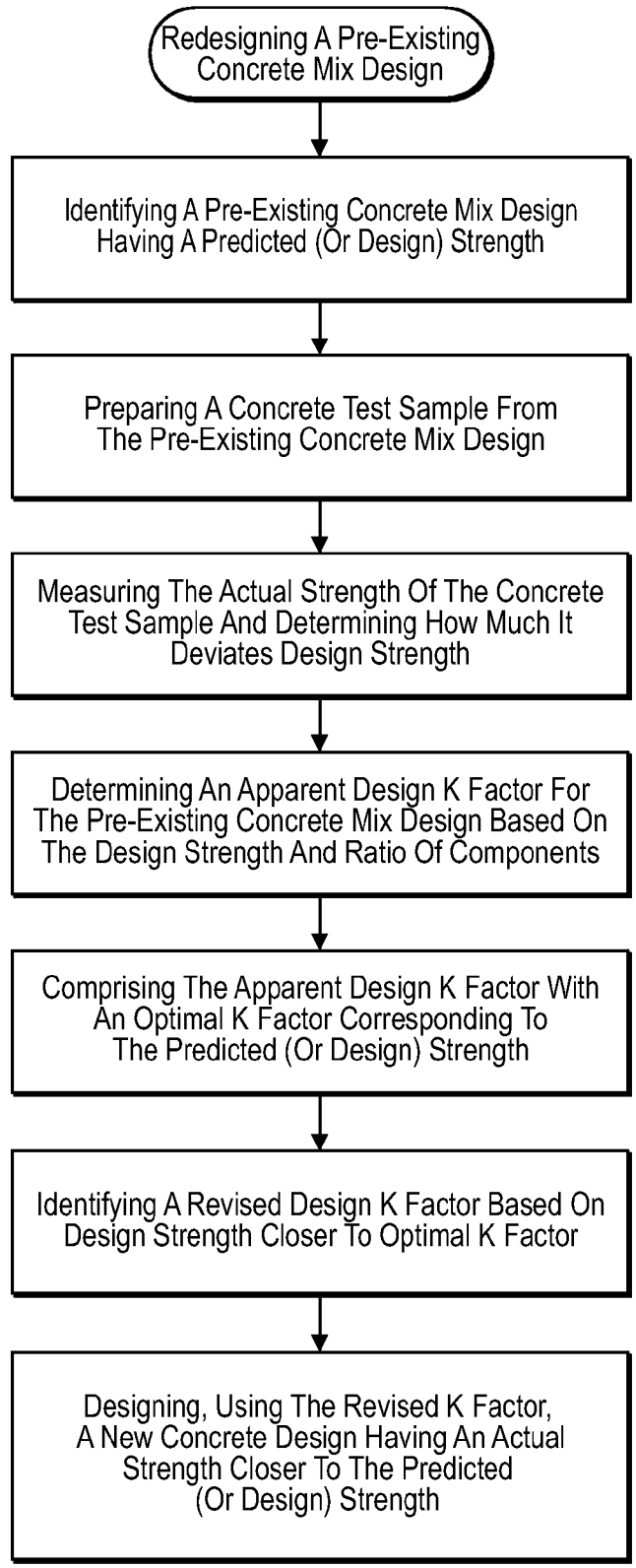
FIG. 13 is a flow chart that illustrates an exemplary process for redesigning a pre-existing concrete mix design by employing a correct understanding of the K Factor and how it varies as a function of concrete compressive strength.

FIG. 13 is a flow chart that illustrates an exemplary method for redesigning a pre-existing concrete mix design utilizing the recently discovered knowledge that and how the K factor used in Feret's equation varies with changes in concrete strength (i.e., logarithmically with increasing strength). The exemplary redesign process shown in FIG. 13 includes the following steps:

1. identifying a pre-existing concrete mix design having a predicted (or design) strength;
2. preparing a concrete test sample from the pre-existing concrete mix design;
3. measuring the actual strength of the concrete test sample and determining how much the actual strength deviates from the design strength (optional);
4. determining an apparent design K factor for the pre-existing concrete mix design based on the design strength and the ratio of components within the concrete test sample made from the pre-existing concrete mix design;
5. comparing the apparent design K factor of the pre-existing concrete mix design with the "true" or optimal K factor corresponding to the design or predicted strength of the pre-existing concrete mix design;
6. identifying a revised design K factor based on the predicted (or design) strength (e.g., selected based on one of the K factor lines shown in FIGS. 1-3 or that is appropriate for the given set of raw material inputs) that is closer to the optimal K factor for the design strength than the apparent design K factor of the pre-existing mix design; a K factor curve for the concrete plant can be optionally constructed by testing the actual strength of one or more properly prepared concrete compositions of the manufacturer and plotting the actual K factor(s) versus actual strength; and
7. designing, using the revised design K factor, a new concrete mix design that yields a concrete composition having an actual strength that more consistently corresponds to the predicted (or design) strength compared to the pre-existing mix design.

In the case of an unoptimized, poorly pre-existing mix design, the difference between the apparent design K factor based on the design or predicted strength of the pre-existing mix design and the optimal or theoretical K factor based on the design strength will be significantly greater than in an optimized mix design. By rebalancing the relative concentrations of the various components in order to yield a more optimized mix design (i.e., so as to more efficiently utilize the hydraulic cement and other components), the deviation between actual strength and design strength will be significantly decreased. As a result, the revised design K factor that is required to guarantee a specific minimum strength will more closely correspond to the optimal or theoretical K factor compared to the pre-existing, unoptimized mix design. Moreover, comparing the difference between the apparent design K factor and the optimal K factor is a diagnostic tool that enables one desiring to implement the design optimization procedure of the present invention to diagnose if, and to what extent, a pre-existing mix design may be overdesigned. As discussed elsewhere, the deviation between the design and optimal K factors can be achieved by carefully accounting for variations in the size and moisture content of the solid components and/or upgrading and/or adjusting the manufacturing process and equipment.

IX. Upgrading an Existing Concrete Plant

Figure 14:
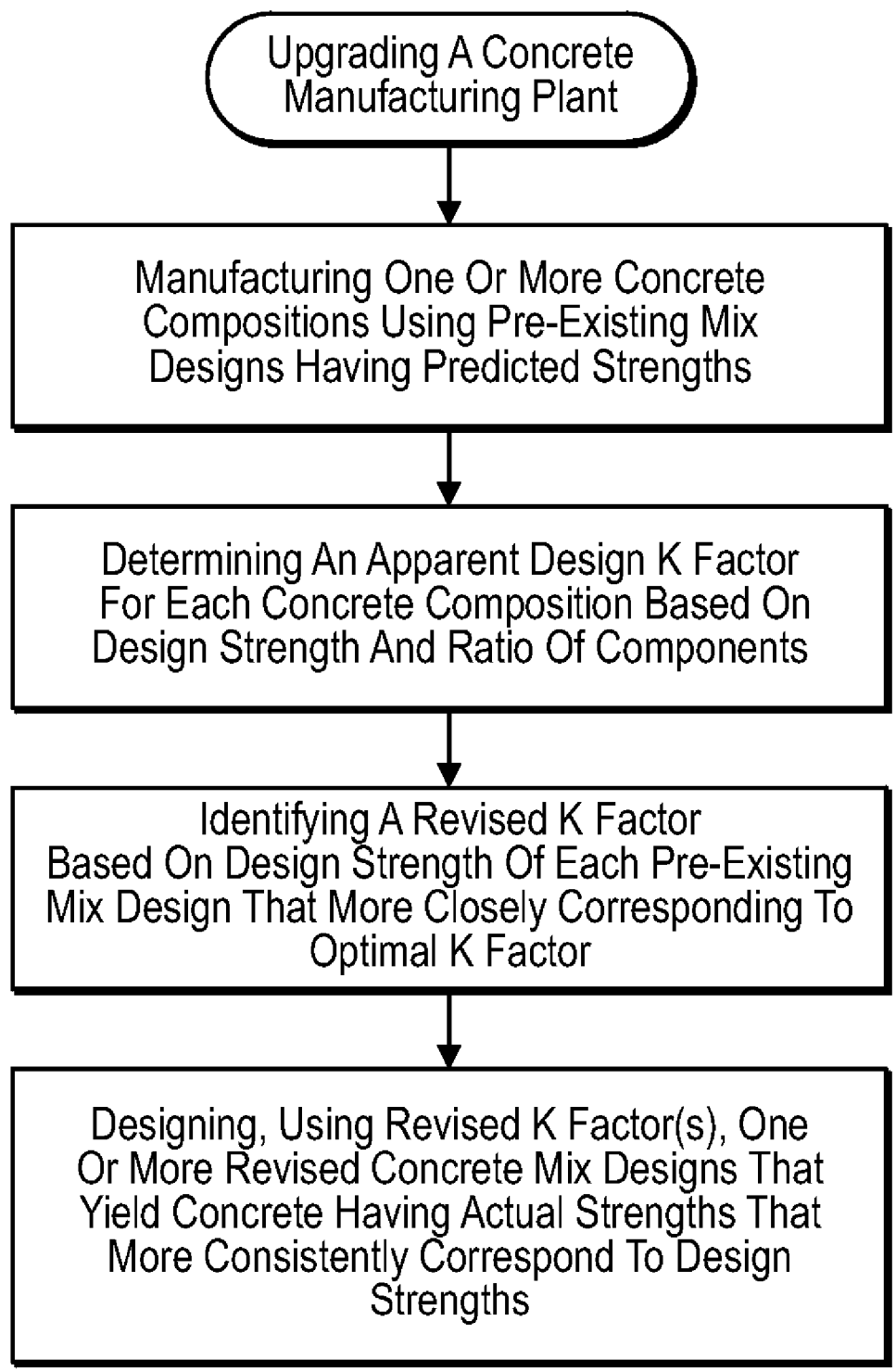
FIG. 14 is a flow chart that illustrates an exemplary process for upgrading an existing concrete manufacturing plant by employing a correct understanding of the K Factor and how it varies as a function of concrete compressive strength.

FIG. 14 is a flow chart that illustrates an exemplary embodiment according to the invention for upgrading an existing concrete manufacturing plant. The process illustrated in FIG. 14 utilizes the discovery that and how the K factor various logarithmically with changes in concrete strength. The process for upgrading an existing concrete manufacturing plant includes the following steps:

1. manufacturing one or more concrete compositions using one or more pre-existing mix designs having predicted strengths;
2. determining an apparent design K factor for each of the one or more concrete compositions based on the design strength and ratio of components of each concrete composition;
3. identifying a revised design K factor, based on the predicted or desired strength of each pre-existing mix design, which more closely corresponding to the optimal or true K factor for the design strength compared to the pre-existing mix design; and
4. designing, using the revised design K factor for each pre-existing mix design, one or more revised concrete mix designs that yield concrete compositions having actual strengths that more consistently correspond to the predicted or design strengths compared to the one or more pre-existing mix designs, respectively.

Because each manufacturing plant has its own unique set of raw materials and/or processing inputs (i.e., no two plants use exactly the same raw materials and possess the exact same equipment calibrated and/or operated in the exact same manner), it will be appreciated that each manufacturing plant produces concrete compositions having unique aspects that are specific to a given manufacturing plant. In other words, even if two manufacturing plants use the same standardized mix designs (i.e., recipes), the concrete delivered by each plant will, in same way, be unique to each plant. That means that pre-existing concrete mix designs that have been modified and optimized utilizing the improved DOC program will yield new concrete compositions that are themselves unique in that they will have never been manufactured at any time anywhere in the world. Thus, improved concrete compositions manufactured using optimized mix designs resulting from the implementation of the improved DOC process are themselves unique and therefore novel as between all previously manufactured concrete.

It turns out that every concrete composition that is made has its own unique signature design K factor and also an actual K factor that can be determined by testing the actual strength of the composition. That is true both before and after implementation of the improved DOC process. However, after implementation of the improved DOC process, the signature K factors, both design and actual, for an optimized concrete composition of a manufacturing plant will exceed the signature K factors, both design and actual, of the pre-existing concrete composition that was redesigned using the improved DOC process. By knowing and comparing the design and/or signature K factors of both a pre-existing and an optimized concrete composition of a given manufacturing plant, one can readily ascertain whether a particular concrete composition produced by the manufacturing plant was manufactured using the pre-existing mix design or an optimized mix design designed using the improved DOC process. Thus, the signature K factor can be used as a diagnostic tool to distinguish whether an overdesigned or an optimized concrete composition was used in a building project (i.e., to determine whether or not the improved DOC process has been implemented by a concrete manufacturer in designing its concrete compositions).

One of the practical affects of upgrading an existing concrete manufacturing plant is providing mix designs that are specifically optimized based on the raw materials that are actually used by the concrete manufacturing plant. It is often the case that manufacturing plants use standardized mix designs that were made using raw materials not available to a particular manufacturing plant. Indeed, manufacturing plants are often owned by a single entity that provides standardized mix designs for use with every manufacturing plant regardless of variations in raw material inputs. As a result, there is large systematic error built into the standardized mix designs that cannot be accounted for or corrected by simply providing improved batching equipment. In other words, even if the components could be measured and batched perfectly each time, the mix designs would have to account for variations in raw materials inputs among and between the various manufacturing plants. The only way to eliminate such systematic error is to provide an optimized mix design that is specifically tailored to account for the specific raw materials that are used by a particular manufacturing plant to make concrete at a given time.

The knowledge of how the K factor varies with concrete strength can be used as a diagnostic tool to identify those aspects of a manufacturer's batching process that may be in need of modification. As discussed herein, the improved DOC process can be used to identify how much paste is needed to achieve a desired slump, with the K factor specifying the water-to-cement ratio needed to obtain a specific strength. If particle packing is optimized for a particular plant, there is little benefit in spending capital resources to optimize the metering equipment. Increasing the ability to accurately weigh and batch solid components will not yield much benefit if particle packing is already optimized or nearly optimized. If variations in weighing the aggregates does not appreciatively affect slump, then it will also not appreciatively affect strength even if the aggregates are not weighed to a high degree of accuracy.

On the other hand, where much more cement paste is required to achieve a desired slump compared to an optimized particle packing system, that indicates that much more accurately weighing the aggregates to achieve optimized particle packing will yield significant benefits. In other words, if more accurately measuring the fine and coarse aggregates minimizes or eliminates changes in slump and also reduces or eliminates overcementing required to achieve desired slump, investment in more accurate weighing apparatus would be highly beneficial and worth the cost.

In addition to accurately weighing the various components added to a batch of concrete, accounting for variations in moisture content of the aggregates will also yield large benefits in the case where moisture variation is a problem. Variations in moisture not only affect how much aggregate is needed but also greatly affect how much water is contained in the concrete composition, thereby affecting water-to-cement ratio and slump to a high degree. Accounting for all water inputs greatly increases the ability to consistently provide concrete having the desired slump and strength such that a capital investment in moisture sensing material may be justified.

X. Examples of Design Optimization Process to Re-Design or Replace Pre-Existing Mix Designs The following examples demonstrate the ability of the improved DOC process disclosed herein to modify, redesign and/or replace pre-existing mix designs currently used in the industry in order to yield improved concrete mixtures that are better optimized with respect to cost, while also maintaining the desired properties (e.g., slump and strength). The same procedures can also be carried out relative to virtually any known mix designed currently known and used in the concrete industry in order to optimize such compositions with respect to strength and cost, while also maintaining other desired properties.

The inventive design optimization methods were used to improve mix designs at various concrete manufacturing plants throughout the United States, demonstrating the universal applicability of the inventive methods. Examples 1-4 relate to four optimized concrete mix designs that were made according to the improved DOC process to improve upon and replace 12 standard mix designs presently or previously used by a first manufacturing plant using standardized mix designs. The standard mix designs in the remaining comparative examples are the same as in Examples 1-4, but were used by other plants owned by the same manufacturer. For this reason, the cost of manufacturing concrete at the different plants differs due to differences in the raw materials cost due to location and source. Because the quality of aggregates differ from plant to plant, the design optimization procedure yields different optimized mix designs for each manufacturing plant in order to account for such differences in raw material inputs. In this way, the optimized mix designs are better tailored to the specific raw materials used by each plant.

The standard pre-existing mix designs are "comparative examples" and shall be numbered according to the corresponding optimized mix design created to take their place (e.g., the optimized mix design of Example 1 corresponds to, and is designed to replace, the mix designs of Comparative Examples 1a-1c).

EXAMPLES 1-4

Examples 1-4 illustrate four optimized concrete mix designs that were prepared using the improved DOC process described herein. The four mix designs of Examples 1-4 can replace twelve pre-existing standard concrete mix designs utilized by an existing concrete manufacturing plant. Each mix design of Examples 1-4 corresponds to a group of three pre-existing mix designs of similar type that guarantee a minimum compressive strength, at a specified slump, and percentage of entrained air when delivered to the customer. The pre-existing mix designs of the concrete manufacturing plant, their components, cost (revised Apr. 7, 2006), and apparent design K factors, will be presented in four groups of three concrete mix designs, each group having similar properties or characteristics.

COMPARATIVE EXAMPLES 1a-1c

The three mix designs of Comparative Examples 1a-1c have a design strength of 3000 psi, a slump of 4 inches, and minimal entrained air (1.5%).

|  | Comparative Example | | | |
|---|---|---|---|---|
|  | 1a | 1b | 1c | Cost (US$) |
| Compressive Strength (psi) | 3000 | 3000 | 3000 | — |
| Slump (inch) | 4 | 4 | 4 | — |
| Type 1 Cement (lbs/yd$^3$) | 370 | 470 | 423 | $101.08/Ton |
| Type C Fly Ash (lbs/yd$^3$) | 100 | 0 | 0 | $51.00/Ton |
| Sand (lbs/yd$^3$) | 1570 | 1470 | 1660 | $9.10/Ton |
| State Rock (lbs/yd$^3$) | 1700 | 1700 | 1714 | $11.65/Ton |
| Potable Water (lbs/yd$^3$) | 280 | 280 | 265 | negligible |
| Daravair 1400 (air entrain.) (fl. oz./cwt) | 0 | 0 | 0 | $3.75/Gal |
| Daracem 65 (water red.) (fl. oz./cwt) | 0 | 0 | 14.8 | $5.65/Gal |
| % Air | 1.5 | 1.5 | 1.5 | — |
| Apparent Design K Factor | 234 | 191 | 207 | — |
| Cost ($/yd$^3$) | $38.59 | $40.62 | $41.99 | — |
| Sales Distribution (%) Within Group | 19.57 | 80.43 | 0 | — |
| Weighted Average Cost ($/yd$^3$) |  | $40.23 |  | — |
| Total Sales (%) of Concrete Plant |  | 1.08 |  | — |

COMPARATIVE EXAMPLES 2a-2c

The three mix designs of Comparative Examples 2a-2c have a design strength of 3000 psi, a slump of 4 inches, and substantial entrained air (5%).

|  | Comparative Example | | | |
|---|---|---|---|---|
|  | 2a | 2b | 2c | Cost (US$) |
| Compressive Strength (psi) | 3000 | 3000 | 3000 | — |
| Slump (inch) | 4 | 4 | 4 | — |
| Type 1 Cement (lbs/yd$^3$) | 350 | 470 | 423 | $101.08/Ton |
| Type C Fly Ash (lbs/yd$^3$) | 100 | 0 | 0 | $51.00/Ton |
| Sand (lbs/yd$^3$) | 1510 | 1420 | 1560 | $9.10/Ton |
| State Rock (lbs/yd$^3$) | 1750 | 1750 | 1740 | $11.65/Ton |
| Potable Water (lbs/yd$^3$) | 250 | 260 | 240 | negligible |
| Daravair 1400 (air entrain.) (fl. oz./cwt) | 4 | 5 | 4 | $3.75/Gal |
| Daracem 65 (water red.) (fl. oz./cwt) | 0 | 0 | 14.8 | $5.65/Gal |
| % Air | 5 | 5 | 5 | — |
| Apparent Design K Factor | 237 | 189 | 199 | — |
| Cost ($/yd$^3$) | $38.00 | $41.37 | $42.37 | — |
| Sales Distribution (%) Within Group | 74.23 | 25.77 | 0 | — |
| Weighted Average Cost ($/yd$^3$) |  | $38.87 |  | — |
| Total Sales (%) of Concrete Plant |  | 17.53 |  | — |

COMPARATIVE EXAMPLES 3a-3c

The three mix designs of Comparative Examples 3a-3c have a design strength of 4000 psi, a slump of 4 inches, and minimal entrained air (1.5%).

|  | Comparative Example | | | |
|---|---|---|---|---|
|  | 3a | 3b | 3c | Cost (US$) |
| Compressive Strength (psi) | 4000 | 4000 | 4000 | — |
| Slump (inch) | 4 | 4 | 4 | — |
| Type 1 Cement (lbs/yd$^3$) | 470 | 564 | 517 | $101.08/Ton |
| Type C Fly Ash (lbs/yd$^3$) | 100 | 0 | 0 | $51.00/Ton |
| Sand (lbs/yd$^3$) | 1530 | 1440 | 1530 | $9.10/Ton |
| State Rock (lbs/yd$^3$) | 1746 | 1750 | 1750 | $11.65/Ton |
| Potable Water (lbs/yd$^3$) | 280 | 285 | 280 | negligible |
| Daravair 1400 (air entrain.) (fl. oz./cwt) | 0 | 0 | 0 | $3.75/Gal |
| Daracem 65 (water red.) (fl. oz./cwt) | 0 | 0 | 18.1 | $5.65/Gal |
| % Air | 1.5 | 1.5 | 1.5 | — |
| Apparent Design K Factor | 232 | 206 | 226 | — |
| Cost ($/yd$^3$) | $43.73 | $45.53 | $47.71 | — |
| Sales Distribution (%) Within Group | 6.81 | 44.35 | 48.84 | — |
| Weighted Average Cost ($/yd$^3$) |  | $46.47 |  | — |
| Total Sales (%) of Concrete Plant |  | 12.81 |  | — |

COMPARATIVE EXAMPLES 4a-4c

The three mix designs of Comparative Examples 4a-4c have a design strength of 4000 psi, a slump of 4 inches, and substantial entrained air (5%).

|  | Comparative Example | | | |
|---|---|---|---|---|
|  | 4a | 4b | 4c | Cost (US$) |
| Compressive Strength (psi) | 4000 | 4000 | 4000 | — |
| Slump (inch) | 4 | 4 | 4 | — |
| Type 1 Cement (lbs/yd$^3$) | 470 | 564 | 517 | $101.08/Ton |
| Type C Fly Ash (lbs/yd$^3$) | 100 | 0 | 0 | $51.00/Ton |
| Sand (lbs/yd$^3$) | 1390 | 1340 | 1430 | $9.10/Ton |
| State Rock (lbs/yd$^3$) | 1710 | 1750 | 1750 | $11.65/Ton |
| Potable Water (lbs/yd$^3$) | 255 | 275 | 255 | negligible |
| Daravair 1400 (air entrain.) (fl. oz./cwt) | 4 | 5 | 4 | $3.75/Gal |
| Daracem 65 (water red.) (fl. oz./cwt) | 0 | 0 | 18.1 | $5.65/Gal |
| % Air | 5 | 5 | 5 | — |
| Apparent Design K Factor | 224 | 212 | 218 | — |
| Cost ($/yd$^3$) | $43.41 | $45.88 | $47.99 | — |
| Sales Distribution (%) Within Group | 77.31 | 22.69 | 0 | — |
| Weighted Average Cost ($/yd$^3$) |  | $43.97 |  | — |
| Total Sales (%) of Concrete Plant |  | 68.58 |  | — |

The following optimized concrete mix designs according to Examples 1-4 were made according to the improved DOC process and are intended to replace the 12 mix designs of Comparative Examples 1a-4c. Each optimized mix design takes the place of three mix designs of similar attributes (e.g., the optimized mix design of Example 1 takes the place of the pre-existing mix designs of Comparative Examples 1a-1c). The optimization procedure assumed a percent absorption for the sand and rock of 1.5% and 2.5%, respectively, and a percent moisture of 4.57% and 3.18%, respectively.

|  | Example | | | | |
|---|---|---|---|---|---|
|  | 1 | 2 | 3 | 4 | Cost (US$) |
| Compressive Strength (psi) | 3000 | 3000 | 4000 | 4000 | — |
| Slump (inch) | 5 | 5 | 5 | 5 | — |
| Type 1 Cement (lbs/yd$^3$) | 340 | 299 | 375 | 366 | $101.08/Ton |
| Type C Fly Ash (lbs/yd$^3$) | 102 | 90 | 113 | 110 | $51.00/Ton |
| Sand (lbs/yd$^3$) | 1757 | 1697 | 1735 | 1654 | $9.10/Ton |
| State Rock (lbs/yd$^3$) | 1452 | 1403 | 1434 | 1367 | $11.65/Ton |
| Potable Water (lbs/yd$^3$) | 294 | 269 | 294 | 269 | negligible |
| Daravair 1400 (air entrain.) (fl. oz./cwt) | 0 | 1.4 | 0 | 1.4 | $3.75/Gal |
| % Air | 2 | 5.5 | 2 | 5.5 | $5.65/Gal |
| Cost($/yd$^3$) | $36.55 | $33.72 | $38.39 | $37.23 | — |
| Weighted Avg. Cost ($/yd$^3$) |  | $36.76 |  |  | — |
| Cost Savings ($/yd$^3$) Per Mix Design | $3.68 | $5.15 | $8.08 | $6.74 | — |
| Weighted Avg. Plant Cost Savings ($/yd$^3$) |  | $6.60 |  |  | — |

Many concrete manufacturing plants have an excessive number of mix designs of similar type in an attempt to satisfy customer need. Each improved mix design of Examples 1-4 is able to take the place of three pre-existing standard mix designs of similar type because it satisfies the criteria of all three mix designs while also having reduced cost. Reducing the number of mix designs required to satisfy customer need represents an additional cost savings to a concrete manufacturing plant because it simplifies the overall manufacturing process.

The absolute cost savings ranged from a low of $2.04 per yard (Example 1 relative to Comparative Example 1a) to a high of $10.76 per yard (Example 4 relative to Comparative Example 4c). The weighted average cost of the pre-existing mix designs of Comparative Examples 1a-4c, based on the percentage of each mix design sold by the manufacturing plant, is $43.36 per yard (as of Apr. 7, 2006). The weighted average cost to manufacture concrete using the four optimized mix designs based on existing sales percentages for the 12 pre-existing mix designs of the manufacturer would be $36.76 per yard at the same materials cost per component. The average overall cost savings for the manufacturing plant would therefore be $6.60 per yard, assuming the manufacturer were to replace the 12 pre-existing mix designs of Comparative Examples 1a-4c with the optimized mix designs of Examples 1-4 and continue to manufacture the same distribution of concrete as before.

The amount of $6.60 is several times greater than the typical profit of $1-2 per yard earned by typical concrete manufacturers after all fixed and variable costs of operating the manufacturing plant are factored in and accounted for. The improved design optimization procedures are therefore able to dramatically improve upon pre-existing mix designs used by manufacturers, which were thought to be optimal based on decades of testing and use, and increase profits by several times. This is a surprising and unexpected result that attests to the contribution to the art of concrete manufacture provided by the improved DOC process of the present invention. Whereas the original DOC program of the Andersen patent had much to commend itself, it could not be readily implemented in the real world to diagnose and improve upon pre-existing concrete mix designs in a concrete and verifiable manner in order to yield demonstrably improved results at reduced cost. The improvements described herein were necessary to provide an optimization procedure that could be readily implemented as illustrated in Examples 1-4.

EXAMPLES 5-8

Examples 5-8 illustrate four optimized concrete mix designs that were prepared using the improved DOC process described herein. The four mix designs of Examples 5-8 can replace twelve pre-existing standard concrete mix designs of an existing concrete manufacturing plant, which used the same 12 mix designs as in Comparative Examples 1a-4c but manufactured concrete using a different set of raw materials. Each mix design of Examples 5-8 corresponds to a group of three pre-existing mix designs of similar type that guarantee a minimum compressive strength, at a specified slump, and percentage of entrained air when delivered to the customer. The pre-existing mix designs of the concrete manufacturing plant, their components, cost (revised Oct. 27, 2005), and apparent design K factors, will be presented in four groups of three concrete mix designs, each group having similar properties or characteristics.

COMPARATIVE EXAMPLES 5a-5c

The three mix designs of Comparative Examples 5a-5c have a design strength of 3000 psi, a slump of 4 inches, and minimal entrained air (1.5%).

|  | Comparative Example | | | |
|---|---|---|---|---|
|  | 5a | 5b | 5c | Cost (US$) |
| Compressive Strength (psi) | 3000 | 3000 | 3000 | — |
| Slump (inch) | 4 | 4 | 4 | — |
| Type 1 Cement (lbs/yd$^3$) | 370 | 470 | 423 | $104/Ton |
| Type C Fly Ash (lbs/yd$^3$) | 100 | 0 | 0 | $47.00/Ton |
| Sand (lbs/yd$^3$) | 1570 | 1470 | 1660 | $4.46/Ton |
| ¾ inch Rock (lbs/yd$^3$) | 1700 | 1700 | 1714 | $4.46/Ton |
| Potable Water (lbs/yd$^3$) | 280 | 280 | 265 | Negligible |
| Daravair (air entrain.) (fl. oz./cwt) | 0 | 0 | 0 | $3.75/Gal |
| Daracem (water red.) (fl. oz./cwt) | 0 | 0 | 14.8 | $5.65/Gal |
| % Air | 1.5 | 1.5 | 1.5 | — |
| Apparent Design K Factor | 234 | 191 | 207 | — |
| Cost ($/yd$^3$) | $29.01 | $31.63 | $32.42 | — |
| Sales Distribution (%) Within Group | 19.57 | 80.43 | 0 | — |
| Weighted Average Cost ($/yd$^3$) |  | $31.12 |  | — |
| Total Sales (%) of Concrete Plant |  | 1.08 |  | — |

COMPARATIVE EXAMPLES 6a-6c

The three mix designs of Comparative Examples 6a-6c have a design strength of 3000 psi, a slump of 4 inches, and substantial entrained air (5%).

|  | Comparative Example | | | |
|---|---|---|---|---|
|  | 6a | 6b | 6c | Cost (US$) |
| Compressive Strength (psi) | 3000 | 3000 | 3000 | — |
| Slump (inch) | 4 | 4 | 4 | — |
| Type 1 Cement (lbs/yd$^3$) | 350 | 470 | 423 | $104/Ton |
| Type C Fly Ash (lbs/yd$^3$) | 100 | 0 | 0 | $47.00/Ton |
| Sand (lbs/yd$^3$) | 1510 | 1420 | 1560 | $4.46/Ton |
| ¾ inch Rock (lbs/yd$^3$) | 1750 | 1750 | 1740 | $4.46/Ton |
| Potable Water (lbs/yd$^3$) | 250 | 260 | 240 | negligible |
| Daravair (air entrain.) (fl. oz./cwt) | 4 | 5 | 4 | $3.75/Gal |
| Daracem (water red.) (fl. oz./cwt) | 0 | 0 | 14.8 | $5.65/Gal |
| % Air | 5 | 5 | 5 | — |
| Apparent Design K Factor | 237 | 189 | 199 | — |
| Cost ($/yd$^3$) | $28.36 | $32.32 | $32.74 | — |
| Sales Distribution (%) Within Group | 74.23 | 25.77 | 0 | — |
| Weighted Average Cost ($/yd$^3$) |  | $29.38 |  | — |
| Total Sales (%) of Concrete Plant |  | 17.53 |  | — |

COMPARATIVE EXAMPLES 7a-7c

The three mix designs of Comparative Examples 7a-7c have a design strength of 4000 psi, a slump of 4 inches, and minimal entrained air (1.5%).

|  | Comparative Example | | | |
|---|---|---|---|---|
|  | 7a | 7b | 7c | Cost (US$) |
| Compressive Strength (psi) | 4000 | 4000 | 4000 | — |
| Slump (inch) | 4 | 4 | 4 | — |
| Type 1 Cement (lbs/yd$^3$) | 470 | 564 | 517 | $104/Ton |
| Type C Fly Ash (lbs/yd$^3$) | 100 | 0 | 0 | $47.00/Ton |
| Sand (lbs/yd$^3$) | 1530 | 1440 | 1530 | $4.46/Ton |
| ¾ inch Rock (lbs/yd$^3$) | 1746 | 1750 | 1750 | $4.46/Ton |
| Potable Water (lbs/yd$^3$) | 280 | 285 | 280 | negligible |
| Daravair (air entrain.) (fl. oz./cwt) | 0 | 0 | 0 | $3.75/Gal |
| Daracem (water red.) (fl. oz./cwt) | 0 | 0 | 18.1 | $5.65/Gal |
| % Air | 1.5 | 1.5 | 1.5 | — |
| Apparent Design K Factor | 232 | 206 | 226 | — |
| Cost ($/yd$^3$) | $34.22 | $36.56 | $38.46 | — |
| Sales Distribution (%) Within Group | 6.81 | 44.35 | 48.84 | — |
| Weighted Average Cost ($/yd$^3$) |  | $37.33 |  | — |
| Total Sales (%) of Concrete Plant |  | 12.81 |  | — |

COMPARATIVE EXAMPLES 8a-8c

The three mix designs of Comparative Examples 8a-8c have a design strength of 4000 psi, a slump of 4 inches, and substantial entrained air (5%).

|  | Comparative Example | | | |
|---|---|---|---|---|
|  | 8a | 8b | 8c | Cost (US$) |
| Compressive Strength (psi) | 4000 | 4000 | 4000 | — |
| Slump (inch) | 4 | 4 | 4 | — |
| Type 1 Cement (lbs/yd$^3$) | 470 | 564 | 517 | $104/Ton |
| Type C Fly Ash (lbs/yd$^3$) | 100 | 0 | 0 | $47.00/Ton |
| Sand (lbs/yd$^3$) | 1390 | 1340 | 1430 | $4.46/Ton |
| ¾ inch Rock (lbs/yd$^3$) | 1710 | 1750 | 1750 | $4.46/Ton |
| Potable Water (lbs/yd$^3$) | 255 | 275 | 255 | negligible |
| Daravair (air entrain.) (fl. oz./cwt) | 4 | 5 | 4 | $3.75/Gal |
| Daracem (water red.) (fl. oz./cwt) | 0 | 0 | 18.1 | $5.65/Gal |
| % Air | 5 | 5 | 5 | — |
| Apparent Design K Factor | 224 | 212 | 218 | — |
| Cost ($/yd$^3$) | $34.37 | $37.16 | $38.99 | — |
| Sales Distribution (%) Within Group | 77.31 | 22.69 | 0 | — |
| Weighted Average Cost ($/yd$^3$) |  | $35.01 |  | — |
| Total Sales (%) of Concrete Plant |  | 68.58 |  | — |

The following optimized concrete mix designs according to Examples 5-8 were made according to the improved DOC process and are intended to replace the 12 mix designs of Comparative Examples 5a-8c. Each optimized mix design takes the place of three mix designs of similar attributes (e.g., the optimized mix design of Example 5 takes the place of the pre-existing mix designs of Comparative Examples 5a-5c). The optimization procedure assumed a percent absorption for the sand and rock of 1.9% and 2.3%, respectively, and a percent moisture of 4.57% and 3.18%, respectively.

| | Example | | | | |
|---|---|---|---|---|---|
| | 5 | 6 | 7 | 8 | Cost (US$) |
| Compressive Strength (psi) | 3000 | 3000 | 4000 | 4000 | — |
| Slump (inch) | 5 | 5 | 5 | 5 | — |
| Type 1 Cement (lbs/yd³) | 332 | 302 | 375 | 366 | $104/Ton |
| Type C Fly Ash (lbs/yd³) | 100 | 91 | 112 | 110 | $47.00/Ton |
| Sand (lbs/yd³) | 1769 | 1693 | 1737 | 1657 | $4.46/Ton |
| ¾ inch Rock (lbs/yd³) | 1470 | 1407 | 1450 | 1377 | $4.46/Ton |
| Potable Water (lbs/yd³) | 294 | 274 | 295 | 270 | negligible |
| Daravair (fl. oz./cwt) | 0 | 1.4 | 0 | 1.4 | $3.75/Gal |
| % Air | 1.8 | 5.5 | 1.9 | 5.4 | $5.65/Gal |
| Cost ($/yd³) | $26.97 | $25.01 | $29.37 | $28.66 | — |
| Weighted Avg. Cost ($/yd³) | | $28.09 | | | — |
| Cost Savings ($/yd³) Per Mix Design | $4.15 | $4.37 | $7.96 | $6.34 | — |
| Weighted Avg. Plant Cost Savings ($/yd³) | | $6.18 | | | — |

Each improved mix design of Examples 5-8 is able to take the place of three pre-existing standard mix designs of similar type because it satisfies the criteria of all three mix designs while also having reduced cost. The reduced number of mix designs is an additional cost savings as it simplifies the overall manufacturing process.

The absolute cost savings ranged from a low of $2.04 per yard (Example 5 relative to Comparative Example 5a) to a high of $10.32 per yard (Example 8 relative to Comparative Example 8c). The weighted average cost of the pre-existing mix designs of Comparative Examples 5a-8c, based on the percentage of each mix design sold by the manufacturing plant, is $34.27 per yard (as of Oct. 27, 2005). The weighted average cost to manufacture concrete using the four optimized mix designs based on existing sales percentages for the 12 pre-existing mix designs of the manufacturer would be $28.09 per yard at the same materials cost per component. The average overall cost savings for the manufacturing plant would therefore be $6.18 per yard, assuming the manufacturer were to replace the 12 pre-existing mix designs of Comparative Examples 5a-8c with the optimized mix designs of Examples 5-8 and continue to manufacture the same distribution of concrete as before.

EXAMPLES 9-12

Examples 9-12 illustrate four optimized concrete mix designs that were prepared using the improved DOC process described herein. The four mix designs of Examples 9-12 can replace twelve pre-existing standard concrete mix designs of an existing concrete manufacturing plant, which used the same 12 mix designs as in Comparative Example 1a-4c but manufactured concrete using a different set of raw materials. Each mix design of Examples 9-12 corresponds to a group of three pre-existing mix designs of similar type that guarantee a minimum compressive strength, at a specified slump, and percentage of entrained air when delivered to the customer. The pre-existing mix designs of the concrete manufacturing plant, their components, cost (revised Oct. 27, 2005), and apparent design K factors, will be presented in four groups of three concrete mix designs, each group having similar properties or characteristics.

COMPARATIVE EXAMPLES 9a-9c

The three mix designs of Comparative Examples 9a-9c have a design strength of 3000 psi, a slump of 4 inches, and minimal entrained air (1.5%).

| | Comparative Example | | | |
|---|---|---|---|---|
| | 9a | 9b | 9c | Cost (US$) |
| Compressive Strength (psi) | 3000 | 3000 | 3000 | — |
| Slump (inch) | 4 | 4 | 4 | — |
| Type 1 Cement (lbs/yd³) | 370 | 470 | 423 | $104/Ton |
| Type C Fly Ash (lbs/yd³) | 100 | 0 | 0 | $47.00/Ton |
| Sand (lbs/yd³) | 1570 | 1470 | 1660 | $8.12/Ton |
| 1 inch Rock (lbs/yd³) | 1700 | 1700 | 1714 | $9.36/Ton |
| Potable Water (lbs/yd³) | 280 | 280 | 265 | Negligible |
| Daravair (air entrain.) (fl. oz./cwt) | 0 | 0 | 0 | $3.75/Gal |
| Daracem (water red.) (fl. oz./cwt) | 0 | 0 | 14.8 | $5.65/Gal |
| % Air | 1.5 | 1.5 | 1.5 | — |
| Apparent Design K Factor | 234 | 191 | 207 | — |
| Cost ($/yd³) | $36.21 | $38.64 | $39.82 | — |
| Sales Distribution (%) Within Group | 19.57 | 80.43 | 0 | — |
| Weighted Average Cost ($/yd³) | | $38.16 | | — |
| Total Sales (%) of Concrete Plant | | 1.08 | | — |

COMPARATIVE EXAMPLES 10a-10c

The three mix designs of Comparative Examples 10a-10c have a design strength of 3000 psi, a slump of 4 inches, and substantial entrained air (5%).

| | Comparative Example | | | |
|---|---|---|---|---|
| | 10a | 10b | 10c | Cost (US$) |
| Compressive Strength (psi) | 3000 | 3000 | 3000 | — |
| Slump (inch) | 4 | 4 | 4 | — |
| Type 1 Cement (lbs/yd³) | 350 | 470 | 423 | $104/Ton |
| Type C Fly Ash (lbs/yd³) | 100 | 0 | 0 | $47.00/Ton |
| Sand (lbs/yd³) | 1510 | 1420 | 1560 | $8.12/Ton |
| 1 inch Rock (lbs/yd³) | 1750 | 1750 | 1740 | $9.36/Ton |
| Potable Water (lbs/yd³) | 250 | 260 | 240 | negligible |
| Daravair (air entrain.) (fl. oz./cwt) | 4 | 5 | 4 | $3.75/Gal |
| Daracem (water red.) (fl. oz./cwt) | 0 | 0 | 14.8 | $5.65/Gal |

|  | Comparative Example | | | |
|---|---|---|---|---|
|  | 10a | 10b | 10c | Cost (US$) |
| % Air | 5 | 5 | 5 | — |
| Apparent Design K Factor | 237 | 189 | 199 | — |
| Cost ($/yd³) | $35.56 | $39.36 | $40.02 | — |
| Sales Distribution (%) Within Group | 74.23 | 25.77 | 0 | — |
| Weighted Average Cost ($/yd³) |  | $36.54 |  | — |
| Total Sales (%) of Concrete Plant |  | 17.53 |  | — |

COMPARATIVE EXAMPLES 11a-11c

The three mix designs of Comparative Examples 11a-11c have a design strength of 4000 psi, a slump of 4 inches, and minimal entrained air (1.5%).

|  | Comparative Example | | | |
|---|---|---|---|---|
|  | 11a | 11b | 11c | Cost (US$) |
| Compressive Strength (psi) | 4000 | 4000 | 4000 | — |
| Slump (inch) | 4 | 4 | 4 | — |
| Type 1 Cement (lbs/yd³) | 470 | 564 | 517 | $104/Ton |
| Type C Fly Ash (lbs/yd³) | 100 | 0 | 0 | $47.00/Ton |
| Sand (lbs/yd³) | 1530 | 1440 | 1530 | $8.12/Ton |
| 1 inch Rock (lbs/yd³) | 1746 | 1750 | 1750 | $9.36/Ton |
| Potable Water (lbs/yd³) | 280 | 285 | 280 | negligible |
| Daravair (air entrain.) (fl. oz./cwt) | 0 | 0 | 0 | $3.75/Gal |
| Daracem (water red.) (fl. oz./cwt) | 0 | 0 | 18.1 | $5.65/Gal |
| % Air | 1.5 | 1.5 | 1.5 | — |
| Apparent Design K Factor | 232 | 206 | 226 | — |
| Cost ($/yd³) | $41.46 | $43.64 | $45.70 | — |
| Sales Distribution (%) Within Group | 6.81 | 44.35 | 48.84 | — |
| Weighted Average Cost ($/yd³) |  | $44.50 |  | — |
| Total Sales (%) of Concrete Plant |  | 12.81 |  | — |

COMPARATIVE EXAMPLES 12a-12c

The three mix designs of Comparative Examples 12a-12c have a design strength of 4000 psi, a slump of 4 inches, and substantial entrained air (5%).

|  | Comparative Example | | | |
|---|---|---|---|---|
|  | 12a | 12b | 12c | Cost (US$) |
| Compressive Strength (psi) | 4000 | 4000 | 4000 | — |
| Slump (inch) | 4 | 4 | 4 | — |
| Type 1 Cement (lbs/yd³) | 470 | 564 | 517 | $104/Ton |
| Type C Fly Ash (lbs/yd³) | 100 | 0 | 0 | $47.00/Ton |
| Sand (lbs/yd³) | 1390 | 1340 | 1430 | $8.12/Ton |
| 1 inch Rock (lbs/yd³) | 1710 | 1750 | 1750 | $9.36/Ton |
| Potable Water (lbs/yd³) | 255 | 275 | 255 | negligible |
| Daravair (air entrain.) (fl. oz./cwt) | 4 | 5 | 4 | $3.75/Gal |
| Daracem (water red.) (fl. oz./cwt) | 0 | 0 | 18.1 | $5.65/Gal |
| % Air | 5 | 5 | 5 | — |
| Apparent Design K Factor | 224 | 212 | 218 | — |
| Cost ($/yd³) | $41.25 | $44.05 | $46.04 | — |
| Sales Distribution (%) Within Group | 77.31 | 22.69 | 0 | — |
| Weighted Average Cost ($/yd³) |  | $41.89 |  | — |
| Total Sales (%) of Concrete Plant |  | 68.58 |  | — |

The following optimized concrete mix designs according to Examples 9-12 were made according to the improved DOC process and are intended to replace the 12 mix designs of Comparative Examples 9a-12c. Each optimized mix design takes the place of three mix designs of similar attributes (e.g., the optimized mix design of Example 9 takes the place of the pre-existing mix designs of Comparative Examples 9a-9c). The optimization procedure assumed a percent absorption for the sand and rock of 1.9% and 1.8%, respectively, and a percent moisture of 4.57% and 3.18%, respectively.

|  | Example | | | | |
|---|---|---|---|---|---|
|  | 9 | 10 | 11 | 12 | Cost (US$) |
| Compressive Strength (psi) | 3000 | 3000 | 4000 | 4000 | — |
| Slump (inch) | 5 | 5 | 5 | 5 | — |
| Type 1 Cement (lbs/yd³) | 336 | 293 | 376 | 362 | $104/Ton |
| Type C Fly Ash (lbs/yd³) | 101 | 88 | 113 | 109 | $47.00/Ton |
| Sand (lbs/yd³) | 1768 | 1721 | 1742 | 1671 | $8.12/Ton |
| 1 inch Rock (lbs/yd³) | 1466 | 1429 | 1446 | 1387 | $9.36/Ton |
| Potable Water (lbs/yd³) | 288 | 263 | 288 | 266 | negligible |
| Daravair (fl. oz./cwt) | 0 | 1.4 | 0 | 1.4 | $3.75/Gal |
| % Air | 2.5 | 5.6 | 2.5 | 5.2 | $5.65/Gal |
| Cost ($/yd³) | $34.18 | $31.38 | $36.34 | $35.09 | — |
| Weighted Avg. Cost ($/yd³) |  | $34.59 | | | — |
| Cost Savings ($/yd³) Per Mix Design | $3.99 | $5.16 | $8.16 | $6.80 | — |
| Weighted Avg. Plant Cost Savings ($/yd³) |  | $6.66 | | | — |

Each improved mix design of Examples 9-12 is able to take the place of three pre-existing standard mix designs of similar type because it satisfies the criteria of all three mix designs while also having reduced cost. The reduced number of mix designs is an additional cost savings as it simplifies the overall manufacturing process.

The absolute cost savings ranged from a low of $2.04 per yard (Example 9 relative to Comparative Example 9a) to a high of $10.96 per yard (Example 12 relative to Comparative Example 12c). The weighted average cost of the pre-existing mix designs of Comparative Examples 9a-12c, based on the percentage of each mix design sold by the manufacturing plant, is $41.24 per yard (as of Oct. 27, 2005). The weighted average cost to manufacture concrete using the four optimized mix designs based on existing sales percentages for the 12 pre-existing mix designs of the manufacturer would be $34.59 per yard at the same materials cost per component. The average overall cost savings for the manufacturing plant would therefore be $6.66 per yard, assuming the manufacturer were to replace the 12 pre-existing mix designs of Comparative Examples 9a-12c with the optimized mix designs of Examples 9-12 and continue to manufacture the same distribution of concrete as before.

EXAMPLES 13-16

Examples 13-16 illustrate four optimized concrete mix designs that were prepared using the improved DOC process described herein. The four mix designs of Examples 13-16 can replace twelve pre-existing standard concrete mix designs of an existing concrete manufacturing plant, which utilized the same 12 mix designs as in Comparative Examples 1a-4c but manufactured concrete using a different set of raw materials. Each mix design of Examples 13-16 corresponds to a group of three pre-existing mix designs of similar type that guarantee a minimum compressive strength, at a specified slump, and percentage of entrained air when delivered to the customer. The pre-existing mix designs of the concrete manufacturing plant, their components, cost (revised Oct. 27, 2005), and apparent design K factors, will be presented in four groups of three concrete mix designs, each group having similar properties or characteristics.

COMPARATIVE EXAMPLES 13a-13c

The three mix designs of Comparative Examples 13a-13c have a design strength of 3000 psi, a slump of 4 inches, and minimal entrained air (1.5%).

|  | Comparative Example | | | |
|---|---|---|---|---|
|  | 13a | 13b | 13c | Cost (US$) |
| Compressive Strength (psi) | 3000 | 3000 | 3000 | — |
| Slump (inch) | 4 | 4 | 4 | — |
| Type 1 Cement (lbs/yd$^3$) | 370 | 470 | 423 | $104/Ton |
| Type C Fly Ash (lbs/yd$^3$) | 100 | 0 | 0 | $47.00/Ton |
| Sand (lbs/yd$^3$) | 1570 | 1470 | 1660 | $8.12/Ton |
| Pea Gravel (lbs/yd$^3$) | 1700 | 1700 | 1714 | $9.36/Ton |
| Potable Water (lbs/yd$^3$) | 280 | 280 | 265 | Negligible |
| Daravair (air entrain.) (fl. oz./cwt) | 0 | 0 | 0 | $3.75/Gal |
| Daracem (water red.) (fl. oz./cwt) | 0 | 0 | 14.8 | $5.65/Gal |
| % Air | 1.5 | 1.5 | 1.5 | — |
| Apparent Design K Factor | 234 | 191 | 207 | — |
| Cost ($/yd$^3$) | $36.14 | $38.57 | $39.75 | — |
| Sales Distribution (%) Within Group | 19.57 | 80.43 | 0 | — |
| Weighted Average Cost ($/yd$^3$) |  | $38.10 |  | — |
| Total Sales (%) of Concrete Plant |  | 1.08 |  | — |

COMPARATIVE EXAMPLES 14a-14c

The three mix designs of Comparative Examples 14a-14c have a design strength of 3000 psi, a slump of 4 inches, and substantial entrained air (5%).

|  | Comparative Example | | | |
|---|---|---|---|---|
|  | 14a | 14b | 14c | Cost (US$) |
| Compressive Strength (psi) | 3000 | 3000 | 3000 | — |
| Slump (inch) | 4 | 4 | 4 | — |
| Type 1 Cement (lbs/yd$^3$) | 350 | 470 | 423 | $104/Ton |
| Type C Fly Ash (lbs/yd$^3$) | 100 | 0 | 0 | $47.00/Ton |
| Sand (lbs/yd$^3$) | 1510 | 1420 | 1560 | $8.12/Ton |
| Pea Gravel (lbs/yd$^3$) | 1750 | 1750 | 1740 | $9.36/Ton |
| Potable Water (lbs/yd$^3$) | 250 | 260 | 240 | Negligible |
| Daravair (air entrain.) (fl. oz./cwt) | 4 | 5 | 4 | $3.75/Gal |
| Daracem (water red.) (fl. oz./cwt) | 0 | 0 | 14.8 | $5.65/Gal |
| % Air | 5 | 5 | 5 | — |
| Apparent Design K Factor | 237 | 189 | 199 | — |
| Cost ($/yd$^3$) | $35.50 | $39.29 | $39.95 | — |
| Sales Distribution (%) Within Group | 74.23 | 25.77 | 0 | — |
| Weighted Average Cost ($/yd$^3$) |  | $36.47 |  | — |
| Total Sales (%) of Concrete Plant |  | 17.53 |  | — |

COMPARATIVE EXAMPLES 15a-15c

The three mix designs of Comparative Examples 15a-15c have a design strength of 4000 psi, a slump of 4 inches, and minimal entrained air (1.5%).

|  | Comparative Example | | | |
|---|---|---|---|---|
|  | 15a | 15b | 15c | Cost (US$) |
| Compressive Strength (psi) | 4000 | 4000 | 4000 | — |
| Slump (inch) | 4 | 4 | 4 | — |
| Type 1 Cement (lbs/yd$^3$) | 470 | 564 | 517 | $104/Ton |
| Type C Fly Ash (lbs/yd$^3$) | 100 | 0 | 0 | $47.00/Ton |
| Sand (lbs/yd$^3$) | 1530 | 1440 | 1530 | $8.12/Ton |
| Pea Gravel (lbs/yd$^3$) | 1746 | 1750 | 1750 | $9.36/Ton |
| Potable Water (lbs/yd$^3$) | 280 | 285 | 280 | Negligible |
| Daravair (air entrain.) (fl. oz./cwt) | 0 | 0 | 0 | $3.75/Gal |
| Daracem (water red.) (fl. oz./cwt) | 0 | 0 | 18.1 | $5.65/Gal |
| % Air | 1.5 | 1.5 | 1.5 | — |
| Apparent Design K Factor | 232 | 206 | 226 | — |
| Cost ($/yd$^3$) | $41.39 | $43.57 | $45.63 | — |
| Sales Distribution (%) Within Group | 6.81 | 44.35 | 48.84 | — |
| Weighted Average Cost ($/yd$^3$) |  | $44.43 |  | — |
| Total Sales (%) of Concrete Plant |  | 12.81 |  | — |

COMPARATIVE EXAMPLES 16a-16c

The three mix designs of Comparative Examples 16a-16c have a design strength of 4000 psi, a slump of 4 inches, and substantial entrained air (5%).

|  | Comparative Example | | | |
| --- | --- | --- | --- | --- |
|  | 16a | 16b | 16c | Cost (US$) |
| Compressive Strength (psi) | 4000 | 4000 | 4000 | — |
| Slump (inch) | 4 | 4 | 4 | — |
| Type 1 Cement (lbs/yd$^3$) | 470 | 564 | 517 | $104/Ton |
| Type C Fly Ash (lbs/yd$^3$) | 100 | 0 | 0 | $47.00/Ton |
| Sand (lbs/yd$^3$) | 1390 | 1340 | 1430 | $8.12/Ton |
| Pea Gravel (lbs/yd$^3$) | 1710 | 1750 | 1750 | $9.36/Ton |
| Potable Water (lbs/yd$^3$) | 255 | 275 | 255 | negligible |
| Daravair (air entrain.) (fl. oz./cwt) | 4 | 5 | 4 | $3.75/Gal |
| Daracem (water red.) (fl. oz./cwt) | 0 | 0 | 18.1 | $5.65/Gal |
| % Air | 5 | 5 | 5 | — |
| Apparent Design K Factor | 224 | 212 | 218 | — |
| Cost ($/yd$^3$) | $41.19 | $43.98 | $45.97 | — |
| Sales Distribution (%) Within Group | 77.31 | 22.69 | 0 | — |
| Weighted Average Cost ($/yd$^3$) |  | $41.82 |  | — |
| Total Sales (%) of Concrete Plant |  | 68.58 |  | — |

The following optimized concrete mix designs according to Examples 13-16 were made according to the improved DOC process and are intended to replace the 12 mix designs of Comparative Examples 13a-16c. Each optimized mix design takes the place of three mix designs of similar attributes (e.g., the optimized mix design of Example 13 takes the place of the pre-existing mix designs of Comparative Examples 13a-13c). The optimization procedure assumed a percent absorption for the sand and pea gravel of 1.9% and 2.6%, respectively, and a percent moisture of 4.57% and 3.18%, respectively.

|  | Example | | | | |
| --- | --- | --- | --- | --- | --- |
|  | 13 | 14 | 15 | 16 | Cost (US$) |
| Compressive Strength (psi) | 3000 | 3000 | 4000 | 4000 | — |
| Slump (inch) | 5 | 5 | 5 | 5 | — |
| Type 1 Cement (lbs/yd$^3$) | 352 | 305 | 403 | 373 | $104/Ton |
| Type C Fly Ash (lbs/yd$^3$) | 106 | 91 | 121 | 112 | $47.00/Ton |
| Sand (lbs/yd$^3$) | 1734 | 1692 | 1690 | 1648 | $8.12/Ton |
| Pea Gravel (lbs/yd$^3$) | 1429 | 1394 | 1392 | 1358 | $9.36/Ton |
| Potable Water (lbs/yd$^3$) | 288 | 277 | 310 | 277 | negligible |
| Daravair (fl. oz./cwt) | 0 | 1.4 | 0 | 1.4 | $3.75/Gal |
| % Air | 2.4 | 5.8 | 2.6 | 5.8 | $5.65/Gal |
| Cost ($/yd$^3$) | $34.75 | $31.74 | $37.40 | $35.45 | — |
| Weighted Avg. Cost ($/yd$^3$) |  | $35.04 |  |  | — |
| Cost Savings ($/yd$^3$) Per Mix Design | $3.34 | $4.73 | $7.03 | $6.37 | — |
| Weighted Avg. Plant Cost Savings ($/yd$^3$) |  | $6.14 |  |  | — |

Each improved mix design of Examples 13-16 is able to take the place of three pre-existing standard mix designs of similar type because it satisfies the criteria of all three mix designs while also having reduced cost. The reduced number of mix designs is an additional cost savings as it simplifies the overall manufacturing process.

The absolute cost savings ranged from a low of $1.39 per yard (Example 13 relative to Comparative Example 13a) to a high of $10.53 per yard (Example 16 relative to Comparative Example 16c). The weighted average cost of the pre-existing mix designs of Comparative Examples 13a-16c, based on the percentage of each mix design sold by the manufacturing plant, is $41.18 per yard (as of Oct. 27, 2005). The weighted average cost to manufacture concrete using the four optimized mix designs based on existing sales percentages for the 12 pre-existing mix designs of the manufacturer would be $35.04 per yard at the same materials cost per component. The average overall cost savings for the manufacturing plant would therefore be $6.14 per yard, assuming the manufacturer were to replace the 12 pre-existing mix designs of Comparative Examples 13a-16c with the optimized mix designs of Examples 13-16 and continue to manufacture the same distribution of concrete as before.

EXAMPLES 17-20

Examples 17-20 illustrate four optimized concrete mix designs that were prepared using the improved DOC process described herein. The four mix designs of Examples 17-20 can replace twelve pre-existing standard concrete mix designs of an existing concrete manufacturing plant that utilized the same 12 mix designs as in Comparative Examples 1a-4c but manufactured concrete using a different set of raw materials. Each mix design of Examples 17-20 corresponds to a group of three pre-existing mix designs of similar type that guarantee a minimum compressive strength, at a specified slump, and percentage of entrained air when delivered to the customer. The pre-existing mix designs of the concrete manufacturing plant, their components, cost (revised Oct. 27, 2005), and apparent design K factors, will be presented in four groups of three concrete mix designs, each group having similar properties or characteristics.

COMPARATIVE EXAMPLES 17a-17c

The three mix designs of Comparative Examples 17a-17c have a design strength of 3000 psi, a slump of 4 inches, and minimal entrained air (1.5%).

|  | Comparative Example | | | |
|---|---|---|---|---|
|  | 17a | 17b | 17c | Cost (US$) |
| Compressive Strength (psi) | 3000 | 3000 | 3000 | — |
| Slump (inch) | 4 | 4 | 4 | — |
| Type 1 Cement (lbs/yd$^3$) | 370 | 470 | 423 | $104/Ton |
| Type C Fly Ash (lbs/yd$^3$) | 100 | 0 | 0 | $47.00/Ton |
| Sand (lbs/yd$^3$) | 1570 | 1470 | 1660 | $10.80/Ton |
| 1 inch Rock (lbs/yd$^3$) | 1700 | 1700 | 1714 | $6.25/Ton |
| Potable Water (lbs/yd$^3$) | 280 | 280 | 265 | Negligible |
| Daravair (air entrain.) (fl. oz./cwt) | 0 | 0 | 0 | $3.75/Gal |
| Daracem (water red.) (fl. oz./cwt) | 0 | 0 | 14.8 | $5.65/Gal |
| % Air | 1.5 | 1.5 | 1.5 | — |
| Apparent Design K Factor | 234 | 191 | 207 | — |
| Cost ($/yd$^3$) | $35.61 | $37.91 | $39.35 | — |
| Sales Distribution (%) Within Group | 19.57 | 80.43 | 0 | — |
| Weighted Average Cost ($/yd$^3$) |  | $37.46 |  | — |
| Total Sales (%) of Concrete Plant |  | 1.08 |  | — |

COMPARATIVE EXAMPLES 18a-18c

The three mix designs of Comparative Examples 18a-18c have a design strength of 3000 psi, a slump of 4 inches, and substantial entrained air (5%).

|  | Comparative Example | | | |
|---|---|---|---|---|
|  | 18a | 18b | 18c | Cost (US$) |
| Compressive Strength (psi) | 3000 | 3000 | 3000 | — |
| Slump (inch) | 4 | 4 | 4 | — |
| Type 1 Cement (lbs/yd$^3$) | 350 | 470 | 423 | $104/Ton |
| Type C Fly Ash (lbs/yd$^3$) | 100 | 0 | 0 | $47.00/Ton |
| Sand (lbs/yd$^3$) | 1510 | 1420 | 1560 | $10.80/Ton |
| 1 inch Rock (lbs/yd$^3$) | 1750 | 1750 | 1740 | $6.25/Ton |
| Potable Water (lbs/yd$^3$) | 250 | 260 | 240 | Negligible |
| Daravair (air entrain.) (fl. oz./cwt) | 4 | 5 | 4 | $3.75/Gal |
| Daracem (water red.) (fl. oz./cwt) | 0 | 0 | 14.8 | $5.65/Gal |
| % Air | 5 | 5 | 5 | — |
| Apparent Design K Factor | 237 | 189 | 199 | — |
| Cost ($/yd$^3$) | $34.81 | $38.47 | $39.35 | — |
| Sales Distribution (%) Within Group | 74.23 | 25.77 | 0 | — |
| Weighted Average Cost ($/yd$^3$) |  | $35.75 |  | — |
| Total Sales (%) of Concrete Plant |  | 17.53 |  | — |

COMPARATIVE EXAMPLES 19a-19c

The three mix designs of Comparative Examples 19a-19c have a design strength of 4000 psi, a slump of 4 inches, and minimal entrained air (1.5%).

|  | Comparative Example | | | |
|---|---|---|---|---|
|  | 19a | 19b | 19c | Cost (US$) |
| Compressive Strength (psi) | 4000 | 4000 | 4000 | — |
| Slump (inch) | 4 | 4 | 4 | — |
| Type 1 Cement (lbs/yd$^3$) | 470 | 564 | 517 | $104/Ton |
| Type C Fly Ash (lbs/yd$^3$) | 100 | 0 | 0 | $47.00/Ton |
| Sand (lbs/yd$^3$) | 1530 | 1440 | 1530 | $10.80/Ton |
| 1 inch Rock (lbs/yd$^3$) | 1746 | 1750 | 1750 | $6.25/Ton |
| Potable Water (lbs/yd$^3$) | 280 | 285 | 280 | Negligible |
| Daravair (air entrain.) (fl. oz./cwt) | 0 | 0 | 0 | $3.75/Gal |
| Daracem (water red.) (fl. oz./cwt) | 0 | 0 | 18.1 | $5.65/Gal |
| % Air | 1.5 | 1.5 | 1.5 | — |
| Apparent Design K Factor | 232 | 206 | 226 | — |
| Cost ($/yd$^3$) | $40.73 | $42.78 | $44.97 | — |
| Sales Distribution (%) Within Group | 6.81 | 44.35 | 48.84 | — |
| Weighted Average Cost ($/yd$^3$) |  | $43.71 |  | — |
| Total Sales (%) of Concrete Plant |  | 12.81 |  | — |

COMPARATIVE EXAMPLES 20a-20c

The three mix designs of Comparative Examples 20a-20c have a design strength of 4000 psi, a slump of 4 inches, and substantial entrained air (5%).

|  | Comparative Example | | | |
|---|---|---|---|---|
|  | 20a | 20b | 20c | Cost (US$) |
| Compressive Strength (psi) | 4000 | 4000 | 4000 | — |
| Slump (inch) | 4 | 4 | 4 | — |
| Type 1 Cement (lbs/yd$^3$) | 470 | 564 | 517 | $104/Ton |
| Type C Fly Ash (lbs/yd$^3$) | 100 | 0 | 0 | $47.00/Ton |
| Sand (lbs/yd$^3$) | 1390 | 1340 | 1430 | $10.80/Ton |
| 1 inch Rock (lbs/yd$^3$) | 1710 | 1750 | 1750 | $6.25/Ton |
| Potable Water (lbs/yd$^3$) | 255 | 275 | 255 | negligible |
| Daravair (air entrain.) (fl. oz./cwt) | 4 | 5 | 4 | $3.75/Gal |
| Daracem (water red.) (fl. oz./cwt) | 0 | 0 | 18.1 | $5.65/Gal |
| % Air | 5 | 5 | 5 | — |
| Apparent Design K Factor | 224 | 212 | 218 | — |
| Cost ($/yd$^3$) | $40.40 | $43.06 | $45.17 | — |
| Sales Distribution (%) Within Group | 77.31 | 22.69 | 0 | — |
| Weighted Average Cost ($/yd$^3$) |  | $41.00 |  | — |
| Total Sales (%) of Concrete Plant |  | 68.58 |  | — |

The following optimized concrete mix designs according to Examples 17-20 were made according to the improved DOC process and are intended to replace the 12 mix designs of Comparative Examples 17a-20c. Each optimized mix design takes the place of three mix designs of similar attributes (e.g., the optimized mix design of Example 17 takes the place of the pre-existing mix designs of Comparative Examples 17a-17c). The optimization procedure assumed a percent absorption for the sand and rock of 1.9% and 3.2%, respectively, and a percent moisture of 4.57% and 3.18%, respectively.

|  | Example | | | | |
| --- | --- | --- | --- | --- | --- |
|  | 17 | 18 | 19 | 20 | Cost (US$) |
| Compressive Strength (psi) | 3000 | 3000 | 4000 | 4000 | — |
| Slump (inch) | 5 | 5 | 5 | 5 | — |
| Type 1 Cement (lbs/yd$^3$) | 335 | 302 | 374 | 366 | $104/Ton |
| Type C Fly Ash (lbs/yd$^3$) | 101 | 91 | 112 | 110 | $47.00/Ton |
| Sand (lbs/yd$^3$) | 1762 | 1693 | 1740 | 1658 | $10.80/Ton |
| 1 inch Rock (lbs/yd$^3$) | 1422 | 1366 | 1404 | 1337 | $6.25/Ton |
| Potable Water (lbs/yd$^3$) | 295 | 274 | 295 | 270 | negligible |
| Daravair (fl. oz./cwt) | 0 | 1.4 | 0 | 1.4 | $3.75/Gal |
| % Air | 2.4 | 5.5 | 2.2 | 5.5 | $5.65/Gal |
| Cost ($/yd$^3$) | $34.01 | $31.63 | $36.12 | $35.14 | — |
| Weighted Avg. Cost ($/yd$^3$) | | $34.64 | | | — |
| Cost Savings ($/yd$^3$) Per Mix Design | $3.45 | $4.12 | $7.59 | $5.86 | — |
| Weighted Avg. Plant Cost Savings ($/yd$^3$) | | $5.75 | | | — |

Each improved mix design of Examples 17-20 is able to take the place of three pre-existing standard mix designs of similar type because it satisfies the criteria of all three mix designs while also having reduced cost. The reduced number of mix designs is an additional cost savings as it simplifies the overall manufacturing process.

The absolute cost savings ranged from a low of $1.60 per yard (Example 17 relative to Comparative Example 17a) to a high of $10.03 per yard (Example 20 relative to Comparative Example 20c). The weighted average cost of the pre-existing mix designs of Comparative Examples 17a-20c, based on the percentage of each mix design sold by the manufacturing plant, is $40.39 per yard (as of Oct. 27, 2005). The weighted average cost to manufacture concrete using the four optimized mix designs based on existing sales percentages for the 12 pre-existing mix designs of the manufacturer would be $34.64 per yard at the same materials cost per component. The average overall cost savings for the manufacturing plant would therefore be $5.75 per yard, assuming the manufacturer were to replace the 12 pre-existing mix designs of Comparative Examples 17a-20c with the optimized mix designs of Examples 17-20 and continue to manufacture the same distribution of concrete as before.

The next two examples are newly optimized mix designs for self-leveling concrete. Self-leveling concrete manufactured according to the mix designs of Examples 21 and 22 is characterized as having sufficiently high slump such that it can level out due to gravity alone without working and also having sufficient cohesiveness such that it does not significantly segregate (i.e., separate into heavier and lighter components due to gravity).

EXAMPLE 21

The follow mix design for a self leveling concrete composition was designed using the improved DOC process disclosed herein. Such compositions are characterized as being air entrained and having greater than an 8-inch slump when in a wet condition prior to curing and a minimum compressive strength of 4000 psi after 7 days of curing. All weights are SSD.

| Component | Amount |
| --- | --- |
| Cement | 519 lbs/yd$^3$ |
| Fly Ash | 130 lbs/yd$^3$ |
| Sand | 1857 lbs/yd$^3$ |
| Rock | 1245 lbs/yd$^3$ |
| Water | 261 lbs/yd$^3$ |
| Daravair | 1.3 fl. oz/cwt* |
| P. NC534 | 11.6 fl. oz/cwt |
| Glenium 3030 | 5.0 fl. oz/cwt* |

Note:
Glenium added at plant for 4" slump; Daravair adjusted at plant for min. 5% air; accelerator added on-site followed immediately by adjustment of slump on-site with additional Glenium 3030 if necessary.

EXAMPLE 22

The follow mix design for a self leveling concrete composition was designed using the improved DOC process disclosed herein. Such compositions are characterized as being air entrained and having greater than an 8-inch slump when in a wet condition prior to curing and a minimum compressive strength of 4000 psi after 7 days of curing. All weights are SSD.

| Component | Amount |
| --- | --- |
| Cement | 366 lbs/yd$^3$ |
| Fly Ash | 110 lbs/yd$^3$ |
| Sand | 1801 lbs/yd$^3$ |
| Rock | 1219 lbs/yd$^3$ |
| Water | 261 lbs/yd$^3$ |
| Daravair | 1.3 fl. oz/cwt* |
| Rheomac VMA450 | 4.0 fl. oz/cwt |
| Glenium 3030 | 2.0 fl. oz/cwt* |

Note:
Rheomac added at plant with batch water; Daravair adjusted at plant for min. 5% air; on-site adjustment of slump with Glenium 3030

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of manufacturing a concrete composition comprising:
   obtaining a concrete mix design prepared at least in part by:
      inputting into a computing system data relating to particle size and particle packing density for a plurality of solid components;
      inputting into the computing system a target strength;
      inputting into the computing system a selected design K factor for use in determining a predicted strength for each of a plurality of concrete mix designs generated by the computing system, the design K factor being selected based on the target strength from among a plurality of different K factors that vary with concrete strength for the given set of raw materials;

the computing system designing a plurality of concrete mix designs having varying quantities of raw materials;

the computing system identifying an amount of water for each of the concrete mix designs;

the computing system determining, based on the selected design K factor and the identified amount of water, a predicted strength for each of the concrete mix designs; and the computing system comparing the predicted strength for each concrete mix design with the target strength to identify a concrete mix design that is better optimized with respect to strength compared to other of the plurality of concrete mix designs; and manufacturing a concrete composition according to the concrete mix design or a corrected variation thereof.

2. A method as defined in claim 1, the concrete, composition having a substantially optimized ratio of raw materials.

3. A method as defined in claim 1, the concrete mix design being further prepared by:

inputting into the computing system data relating to raw materials cost; and the computing system identifying the better optimized concrete mix design at least on part on the basis of having a lower cost compared to other of the plurality of concrete mix designs.

4. A method as defined in claim 1, wherein the selected design K factor accounts for an effect on concrete strength of including an amine strengthener, the method further comprising adding an amine strengthener to the concrete composition.

5. A method as defined in claim 1, wherein the selected design K factor accounts for an effect on concrete strength of including at least one of fly ash or silica fume, the method further comprising adding at least one of fly ash or silica fume to the concrete composition.

6. A method as defined in claim 1, wherein the selected design K factor accounts for an effect on concrete strength of using a specific mixing apparatus, the method further comprising mixing the concrete composition using the specific mixing apparatus.

7. A method as defined in claim 1, further comprising:
preparing a concrete test sample for a given set of raw materials based on the concrete mix design;
determining a strength for the concrete test sample; and
altering the concrete mix design to obtain a corrected variation of the concrete mix design for the given set of raw materials that yields a concrete composition having a strength that more closely correlates with the target strength compared to the selected concrete mix design.

8. A method as defined in claim 1, further comprising:
preparing a concrete test sample for a given set of raw materials based on the concrete mix design;
determining a slump for the concrete test sample; and
altering the concrete mix design to obtain a corrected variation of the concrete mix design for the given set of raw materials that yields a concrete composition having a slump that more closely correlates with the target slump compared to the selected concrete mix design.

9. A method as defined in claim 1, further comprising:
upgrading and/or recalibrating equipment used by the manufacturing plant in manufacturing concrete so that concrete manufactured by the manufacturing plant using the upgraded and/or recalibrated equipment has an actual strength that more closely correlates to design strength compared to previous equipment prior to upgrading and/or recalibrating.

10. A method as defined in claim 1, further comprising:
the computing system identifying a modified mix design that yields a concrete composition having a modified slump but substantially similar strength by altering a ratio of cement paste to aggregate relative to the selected concrete mix design or corrected variation thereof; and manufacturing a modified concrete composition according to the modified mix design or corrected variation thereof.

11. A method of manufacturing a concrete composition comprising:

identifying a pre-existing concrete mix design having an initial ratio of components, a design strength, and an apparent design K factor based on actual strength of concrete manufactured using the pre-existing concrete mix design;

obtaining a revised concrete mix design prepared at least in part by a computer system designing a revised concrete mix design having a revised ratio of components using a revised design K factor that is selected based on the design strength and that more closely corresponds to an optimal K factor corresponding to the design strength compared to the apparent K factor of the pre-existing concrete mix design; and manufacturing a concrete composition according to the revised concrete mix design or a corrected variation thereof.

12. A method as defined in claim 11, wherein the concrete composition has an actual strength that more closely corresponds to the design strength compared to concrete compositions made using the pre-existing concrete mix design.

13. A method as defined in claim 11, the concrete composition having a better optimized ratio of raw materials compared to concrete compositions made using the pre-existing concrete mix design so as to have the specific minimum strength at a given slump and at lower cost compared to concrete compositions made using the pre-existing concrete mix design.

14. In an existing concrete manufacturing plant that manufactures a plurality of different concrete compositions having different design strengths, a method of manufacturing concrete compositions that have actual strengths that more closely correlate with their respective design strengths, the method comprising:

identifying a plurality of pre-existing concrete mix designs of the concrete manufacturing plant in need of better optimization, wherein at least two of the mix designs have differing design strengths;

obtaining a pluraility of new or revised concrete mix designs having new or revised ratios of components compared to the pre-existing concrete mix designs, the new or revised concrete mix designs being prepared at least in part by:

selecting a plurality of different design K factors for use in designing better optimized concrete mix designs, wherein the different K factors correlate with and vary based on differing selected design strengths; and designing, using the plurality of different design K factors, the plurality of new or revised concrete mix designs; and manufacturing, based on the new or revised concrete mix designs or corrected variations thereof, revised concrete compositions having actual strengths that more closely correlate with their respective design strengths compared to pre-existing concrete compositions previously manufactured using the pre-existing mix designs, wherein the revised concrete compositions each have an actual strength at a given slump that more closely correlates to its respective design strength compared to the pre-existing concrete compositions.

15. A method as defined in claim 14, further comprising making slump adjustments to one or more of the revised concrete compositions by adding or altering an amount of an admixture within the one or more concrete compositions.

16. A method as defined in claim 14, further comprising upgrading and/or adjusting production equipment utilized by the manufacturing plant so that each component is weighed or otherwise measured with an accuracy of about ±2.0%.

17. A method as defined in claim 14, further comprising monitoring moisture content of solid components and altering measured amounts of solid components and added batch water used to manufacture a concrete composition based on detected changes in the moisture content of the solid components.

18. A method as defined in claim 14, further comprising delivering a concrete composition using a concrete mixing truck that includes a vessel containing an admixture that alters slump and metering a selected amount of the admixture into a mixing drum carrying the concrete composition in order to alter slump in a desired manner.

19. In a concrete manufacturing plant having a given set of raw material components, a method of manufacturing concrete compositions having actual strengths that more closely reflect their predicted or design strengths compared to less optimized concrete compositions made from the given set of raw material components, the method comprising:
    obtaining a plurality of optimized concrete mix designs having different design strengths that were designed using different design K factors, wherein each different design K factor was selected at least in part based on its respective design strength; and
    manufacturing a plurality of optimized concrete compositions based on the optimized concrete mix designs or corrected variations thereof, each optimized concrete composition having an optimized ratio of components so as to have an actual strength that more closely reflects its predicted or design strength compared to a less optimized concrete composition made from the given set of raw material components.

20. A method as defined in claim 19, further comprising making slump adjustments to one or more of the optimized concrete compositions by adding or altering an amount of an admixture within the one or more concrete compositions.

21. A method as defined in claim 19, further comprising weighing or otherwise measuring the components of each concrete composition with an accuracy of about ±2.0%.

22. A method as defined in claim 19, further comprising monitoring moisture content of solid components and altering a measured amount of solid components and added batch water used to manufacture a concrete composition based on detected changes in the moisture content of the solid components.

23. A method as defined in claim 19, further comprising mixing one or more of the optimized concrete compositions using a concrete mixing truck that includes a vessel containing an admixture for adjusting slump and metering a selected amount of the admixture into a mixing drum carrying the concrete composition in order to alter slump in a desired manner.

24. A method of manufacturing a concrete composition that is better optimized compared to an existing concrete composition having a given design strength and ratio of components and that is overdesigned without having to (i) prepare a concrete test sample, (ii) allow it to harden, (iii) test its actual strength, and (iv) compare the actual strength of the test sample with the given design strength, the method comprising:
    obtaining a revised concrete mix design for use in manufacturing a concrete composition that is better optimized compared to the existing concrete composition, the revised concrete mix design being prepared at least in part by:
        determining an apparent design K factor for the existing concrete composition based on the given design strength of the concrete composition and the given ratio of components within the concrete composition;
        comparing the apparent design K factor with a more optimal K factor that corresponds to the given design strength and which is selected from among a plurality of different K factors that vary with varying concrete strength;
    redesigning the existing concrete composition to yield the revised concrete mix design by means of an optimization procedure that utilizes a revised design K factor that more closely correlates with an optimal K factor for the given design strength, wherein the revised concrete mix design from the optimization procedure yields a revised concrete composition having an actual strength that more closely correlates with the design strength compared to the existing concrete composition; and
    manufacturing a concrete composition based on the revised concrete mix design or a corrected variation thereof.

25. A method as defined in claim 24, further comprising modifying the revised concrete mix design to yield a modified concrete mix design and manufacturing a modified concrete composition according to the modified concrete mix design.

* * * * *